US 6,564,722 B1

(12) United States Patent
Kurosawa et al.

(10) Patent No.: US 6,564,722 B1
(45) Date of Patent: May 20, 2003

(54) TRANSFER SYSTEM

(75) Inventors: Kanji Kurosawa, Tokyo (JP); Bunichiro Koga, Miyagi (JP); Hideki Ito, Miyagi (JP); Shigeru Kiriyama, Miyagi (JP); Shizuo Higuchi, Kanagawa (JP)

(73) Assignee: Nippon Shooter Ltd., Tokyo (JP)

( * ) Notice: Subject to any disclaimer, the term of this patent is extended or adjusted under 35 U.S.C. 154(b) by 0 days.

(21) Appl. No.: 09/720,130

(22) PCT Filed: Apr. 21, 1999

(86) PCT No.: PCT/JP99/02128
§ 371 (c)(1),
(2), (4) Date: Mar. 9, 2001

(87) PCT Pub. No.: WO00/64720
PCT Pub. Date: Nov. 2, 2000

(51) Int. Cl.[7] .............................................. E01B 25/00
(52) U.S. Cl. ........................ 104/155; 104/106; 104/107; 104/130.03
(58) Field of Search ................................. 104/106, 107, 104/138.1, 155, 130.01, 130.03, 38

(56) References Cited

U.S. PATENT DOCUMENTS

| | | | | |
|---|---|---|---|---|
| 1,068,807 A | * | 7/1913 | Murray | 104/38 |
| 1,800,722 A | * | 4/1931 | Edson | 104/38 |
| 3,318,262 A | * | 5/1967 | Ganzinotti | 104/155 |
| 3,635,166 A | * | 1/1972 | Peterson | 104/130.04 |
| 3,805,705 A | * | 4/1974 | Zeldman et al. | 104/155 |
| 5,553,947 A | * | 9/1996 | Scheib et al. | 104/107 |
| 5,601,026 A | * | 2/1997 | Rothemeyer et al. | 104/106 |
| 5,735,214 A | * | 4/1998 | Tsuboi | 104/106 |

* cited by examiner

Primary Examiner—S. Joseph Morano
Assistant Examiner—Lars A. Olson
(74) Attorney, Agent, or Firm—Oblon, Spivak, McClelland, Maier & Neustadt, P.C.

(57) ABSTRACT

A transport system includes a traveling rail (1) which constitutes a transport route and a transport body (3) which is capable of traveling on the traveling rail in the longitudinal direction of the traveling rail. Flexible drive tubes (5) are arranged on the traveling rail in the longitudinal direction of the traveling rail. The transport body includes a traveling wheel (4) which is capable of rolling on the traveling rail and drive wheels (2) which are capable of rolling on the drive tubes upon receiving the rotational drive power generated by pressure of a pressure medium supplied to the drive tubes while depressing the drive tubes. The traveling rail includes a plurality of transport sections and the transport body is capable of receiving a rotational drive force from the drive tubes at every transport sections. If necessary, a transport route changeover switch which changes over the transport route can be provided between the transport sections.

22 Claims, 47 Drawing Sheets

FIG. 51
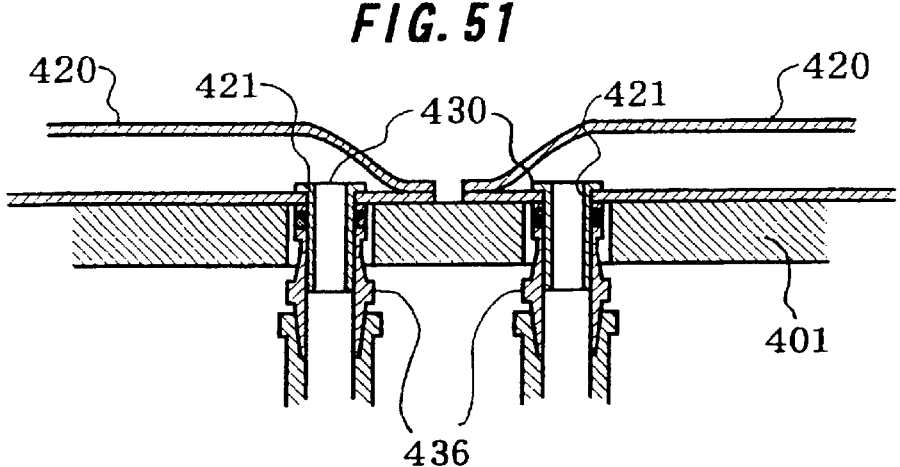
FIG. 52
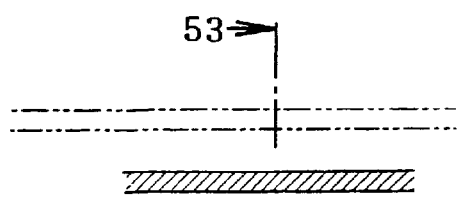
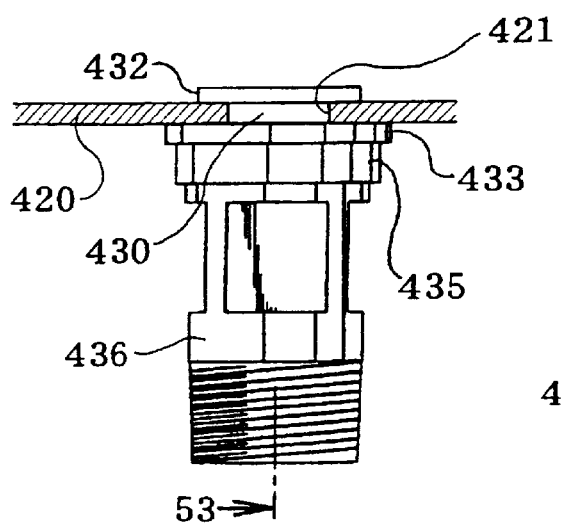
FIG. 53
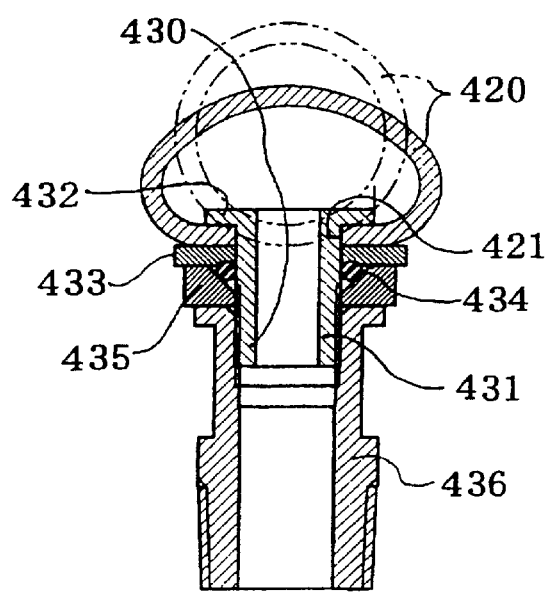

TRANSFER SYSTEM

FIELD OF THE INVENTION

The present invention relates to a transport system which performs a linear driving using a pressure medium such as gas, liquid or the like.

BACKGROUND OF THE INVENTION

Conventionally, in transporting documents or articles using air at hospitals, tower buildings, warehouses, plants or the like, a pneumatic tube facility where a delivery point and a destination are connected by means of a pneumatic tube and a pneumatic element which accommodates an article to be transported is inserted in the pneumatic tube and is transported with air has been widely used. Further, a transport system which mounts magnets to a pneumatic transport element and a transport body and moves the transport body outside the pneumatic transport tube corresponding to the movement of the pneumatic element has been disclosed in Japanese Patent Laid-open No. 81718/1989.

However, with respect to the pneumatic tube facility, since a document or an article is transported while being accommodated in the pneumatic tube, a restriction is imposed on the size and the shape of the article to be transported. Further, to transport the large article to be transported, the diameter of the pneumatic tube and the diameter of the pneumatic transport tube must be made large and hence, a pneumatic facility such as a blower or the like must become large-sized. Further, in the transport system which mounts the magnets to the pneumatic tube and the transport body and moves the transport body outside the pneumatic tube in response to the movement of the pneumatic tube, since a restriction may be imposed on the transportation weight depending on the intensity of the magnets or the transport body is slid on the pipe, the transport body cannot follow the pneumatic tube. Further, since the transport body is slid on the pipe by only making use of the attraction of the magnets, there exists a possibility that the transport body may fall at the time of the vertical traveling.

Accordingly, it is an object of the present invention to provide a transport system which can easily and rapidly transport a document, an article or the like to be transported even at a long distance without receiving a large restriction on the size, the weight and the shape of the document, article or the like to be transported.

It is another object of the present invention to provide a transport body for a transport system which can smoothly travel on a horizontally or vertically curved traveling rail.

It is still another object of the present invention to provide a transport system which can simultaneously make a plurality of transport bodies travel on a traveling rail.

It is a further object of the present invention to provide a rail device of a transport system which can simultaneously satisfy the hardness characteristics of drive tubes which ensures the easiness of mounting of drive tubes on a traveling rail and the removal of drive tubes and the hardness characteristics of the drive tubes which performs the travel drive of a transport body by making use of the pressure of a pressure medium and yet can be easily manufactured.

It is a still further object of the present invention to provide a drive tube mounting device of the transport system which is capable of mounting drive tubes on a traveling rail while moving on the traveling rail.

It is an additional further object of the present invention to provide a traveling route changeover switch of a transport system which can diverge or converge traveling routes of a transport body in a transport system.

DISCLOSURE OF THE INVENTION

According to the present invention, there is provided a transport system which comprises a traveling rail which forms a transport route, flexible drive tubes which are mounted on side surfaces of the traveling rail along the traveling rail, drive wheels which are formed such that the drive wheels depress the drive tubes and travel on the drive tubes due to the pressure of pressurized air supplied to the drive tubes, traveling wheels which are mounted such that the traveling wheels are engaged with protruding portions formed on the side surfaces of the traveling rail, and a transport body which is supported by shaft bodies of the drive wheels and the traveling wheels.

In the transport system having the above-mentioned constitution, with air supplied to the inside of the drive tubes mounted on the traveling rails and further by making use of the pressure difference between front and rear drive wheels, the drive wheels move on the drive tubes while rotating. Here, the transport body connected to the drive wheels moves on the rails. The transport body which carries a material to be transported travels on the traveling rails due to the traveling wheels mounted on the transport body. Depending on the shape of the traveling rails, the transport body is capable of moving along curves or in the vertical direction and hence is capable of moving to any sites led by the traveling rails.

In the above-mentioned constitution, the traveling rail is preferably comprised of a plurality of rail bodies which are contiguously connected in the longitudinal direction. The drive tube is mounted on the side surface of each rail body at every section and flexible transfer drive tubes are mounted on the side surfaces of neighboring rail bodies in the vicinity of end portions of the rail bodies. The transport body is further provided with transfer drive wheels which travel on the transfer drive tubes by making use of the pressure of pressurized air supplied to the transfer drive tubes.

In the transport system having the above-mentioned constitution, when the transport body moves on respective rail bodies by transferring, although the drive wheels are once removed from the drive tubes at the end portion of the rail body, the transfer drive wheels move on while rotating by making use of the pressure inside the transfer tubes. Accordingly, even when the drive wheels are moved away from the drive tube at the end portion of the rail body, it becomes possible to relay the transport body to the next rail body without hindrance.

In the above-mentioned constitution, a hollow portion which is communicated with the drive tube or the transfer drive tube is preferably formed in the rail body of the traveling rail.

Due to such a constitution, a pressurized air supply route which supplies pressurized air to the drive tube or the transfer drive tube can be established making use of the rail body and hence, the number of parts can be reduced.

Further, according to the present invention, there is provided a transport system which is characterized by comprising a traveling rail, a transport body having traveling wheels which travel on the traveling rails, flexible drive tubes arranged on the traveling rail, and drive wheels which are mounted on the transport body such that the drive wheels depress the drive tubes and travel on the drive tubes by making use of the pressure of a pressurized fluid supplied to the drive tubes.

In the transport system having the above-mentioned constitution, drive wheels are mounted on the transport body which has traveling wheels which travel on the traveling rails and these drive wheels depress the flexible drive tubes which are arranged on the traveling rails and hence, by selectively supplying a pressurized fluid into the inside of the drive tubes in front of or behind the drive wheels, it becomes possible to generate the pressure difference in the inside of the drive tubes in front of or behind the drive wheels. Accordingly, by making use of this pressure difference, the drive wheels are rotated so that the drive wheels are moved on the drive tubes together with the transport body.

It is preferable that the traveling rail includes main wall surfaces which extend horizontally in a horizontal transporting and side wall surfaces which extend vertically in a horizontal transporting and the drive tubes are arranged on the main wall surfaces of the traveling rail.

As modes for arranging the traveling rails, the horizontal arrangement which performs only the horizontal transporting, the vertical arrangement which performs only the vertical transporting and the stereoscopic arrangement which performs the horizontal transporting and the vertical transporting and the like are available.

Further, it is preferable that a plurality of drive tubes are arranged in parallel on the traveling rail. In this case, with the increase of the number of the drive tubes, the thrust of the transport body can be increased and hence, the movement of the transport body when the material to be transported having a high weight is loaded or the movement of the transport body in the vertical direction can be performed without hindrance.

Further, it is preferable that on the main wall surfaces or the side wall surfaces of the traveling rail, the convex portions which are engaged with the traveling wheels are formed along the traveling direction of the traveling wheels. In this case, the traveling wheels travel on the convex portions formed on the main wall surfaces or the side wall surfaces of the traveling rail in the state that the traveling wheels are engaged with the convex portions.

Further, it is preferable that a plurality of above-mentioned traveling rails are contiguously connected in the longitudinal direction, the drive tubes are mounted on the main wall surfaces for each traveling rail, and flexible transfer drive tubes are mounted on the main wall surfaces of neighboring traveling rails in the vicinity of end portions of the traveling rails. The transport body is further provided with transfer drive wheels which travel on the transfer tubes by making use of the pressure of pressurized fluid supplied to the transfer drive tubes.

In the above-mentioned constitution, when the transport body moves along a plurality of traveling rails by transferring, although the drive wheels are once removed from the drive tubes at the end portion of each traveling rail, the transfer drive wheels move on while rotating making use of the pressure inside the transfer tubes during that period. Accordingly, even when the drive wheels are removed from the drive tubes at the end portion of the traveling rails it becomes possible to relay the transport body to the next traveling rail without hindrance.

Further, it is preferable that a plurality of drive tubes are arranged on the traveling rails alternately in a staggered pattern. Due to such a constitution, when the traveling rails are elongated in the longitudinal direction or when it is necessary to partition each drive tube into drive tubes of a short length in the longitudinal direction, since the drive tubes are alternately mounted on the traveling rail, it is unnecessary to mount transfer drive rails to the traveling rails and the transfer of the drive tubes becomes possible on the traveling rails. Accordingly, the transfer mechanism is unnecessary and hence, the number of parts can be reduced.

Further, it is preferable that a hollow passage is formed in the traveling rail and the drive tube is connected to this hollow passage. Due to such a constitution, a pressurized fluid supply route to the drive tube can be established by making use of the traveling rail per se and hence, the number of parts can be reduced.

Further, it is preferable that a fluid present in the inside of the drive tube at the downstream of the drive wheel which is depressed by the drive wheel can be discharged through the hollow passage.

Further, it is preferable that concave grooves are formed in the traveling rail and the convex ridge portions which are fitted into the concave grooves are formed on the drive tube. By the fitting engagement between the concave grooves and the convex ridge portions, the drive tube can be mounted on the traveling rail.

Further, it is preferable that the traveling rail and the drive wheels are formed such that bent end portions of the drive tube are protruded at both ends of a section of the drive tube in which the drive tube is depressed by the drive wheel.

Further, according to the present invention, in a transport body which travels on traveling rails, includes a chassis and drives wheels which are mounted on the chassis and are capable of rolling in the longitudinal direction of the traveling rails while depressing drive tubes arranged on the traveling rails, wherein the drive wheels receive a rotational drive force from a pressure medium in a gaseous or liquid form supplied to the drive tubes, the improvement is characterized in that a pair of traveling wheel support frames are respectively mounted on the chassis by way of universal joints in front of and behind the drive wheels, and a plurality of traveling wheels which roll on the traveling rails while sandwiching the traveling rails are mounted on respective traveling wheel support frames.

According to the transport body having the above-mentioned constitution, it becomes possible to make the transport body travel on the traveling rails in the state that the traveling rails are sandwiched by the traveling wheels and hence, the transport body is capable of performing not only the horizontal traveling but also the vertical traveling, the up-side-down inverted traveling and the like. Further, a pair of traveling wheel support frames are respectively mounted on the chassis by way of universal joints in front of and behind the drive wheels and the traveling wheels which can roll on the traveling rails are mounted on these front and rear traveling wheel supporting frames. Accordingly, when the traveling rails are curved in the horizontal direction or bent in the vertical direction, during a period that the chassis pass a curved section or a bent section, it becomes possible to align the direction of both traveling wheel support frames with the curving direction or the bending direction of the traveling rails. Accordingly, the direction of the traveling wheels can be also aligned with the curving direction or the bending direction of the traveling rails and hence, it becomes possible to make the transport body smoothly pass the curved section or the bent section of the traveling rails by minimizing the frictional resistance between the traveling wheels and the traveling rails and without any play. As a result, the lifetime of the traveling wheels can be prolonged and the stable traveling of the transport body can be ensured while preventing the stall of the transport body in the curved section or the bent section of the traveling rails.

In the transport body having the above-mentioned constitution, it is preferable that the traveling wheels are arranged on both sides of respective traveling wheel support frames such that the traveling wheels are capable of rolling on the traveling rails while sandwiching the both sides of the traveling rails with an acute angle.

Due to such a constitution, with the least number of traveling wheels, a transport body which is capable of performing the horizontal traveling, the vertical traveling and the up-side-down inverted traveling can be provided.

Further, in the transport body having the above-mentioned constitution, it is preferable that the drive wheels are provided such that the drive wheels are displaceable relative to the chassis and are biased in the direction to depress the drive tubes by means of a spring.

Due to such a constitution, a press force of the drive wheels applied to the drive tubes during traveling on the traveling rails can be always held at an approximately fixed value and hence, the rotational drive force given to the drive wheels by a pressure medium supplied to the inside of the drive tubes, that is, the thrust given to the transport body can be held at an approximately fixed value.

In the above-mentioned transport body, it is further preferable that the universal joint includes a spherical shaft which is mounted on one of the chassis and the traveling wheel support frame and has a spherical side surface, a spherical seat which is mounted on the other one of the chassis and the traveling wheel support frame and slidably embraces the spherical portion of the spherical shaft, and a spring which is mounted on the other one of the chassis and the traveling wheel support frame and presses the distal end surface of the spherical shaft.

Due to such a constitution, the universal joint arranged between the chassis and the traveling wheel support frame can be made of the least number of parts and the traveling wheel support frame can be returned to the neutral position with respect to the chassis due to the biasing force of the spring.

Further, according to the present invention, in a transport system which includes a traveling rail having a plurality of transport sections of the traveling rail, a plurality of drive tubes arranged at respective transport sections of the traveling rail, and a pressure medium supply apparatus which is capable of selectively supplying pressure medium in a gaseous or liquid form into the inside of respective drive tubes or discharging the pressure medium from the inside of respective drive tubes through one ends or the other ends of these drive tubes, wherein drive wheels which are mounted on a transport body capable of traveling on the traveling rail receive the thrust from the pressure medium supplied to the inside of the drive tubes and roll on the drive tubes while depressing the drive tubes, the improvement is characterized in that into the end portions of the drive tube which are positioned in front of and behind each boundary portion of the transport sections, one ends of transfer pipes are respectively inserted, the pressure medium is selectively supplied into or discharged from the inside of the drive tubes by way of the transfer pipes, the transfer pipes are rotatably mounted on the traveling rail such that one ends thereof are capable of sinking in the inside of the traveling rail, the transfer pipes are connected each other by way of links in an interlocking manner, and the links are formed such that the links are capable of guiding the drive wheels between the drive tubes in front of and behind a boundary portion of the transport sections when a pair of transfer pipes sink into the traveling rail.

In the transport system having the above-mentioned constitution, since the pressure medium can be individually supplied to or discharged from a plurality of drive tubes arranged at every transport sections of the traveling rail, the thrust necessary for making the transport body travel at every transport section of the traveling rail can be effectively obtained. Accordingly, it becomes possible to provide a transport system which can easily cope with the transport of a long distance and, if necessary, a plurality of transport bodies are made to travel. Further, at the boundary portion between the transport sections, one ends of a pair of transfer pipes are respectively inserted into end portions of the drive tubes positioned in front of and behind the boundary portion, and a pair of these transfer pipes are rotatably mounted on the traveling rail such that one ends of the transfer pipes can sink in the inside of the traveling rail, a pair of transfer pipes are connected with each other by way of links in an interlocking manner, and the links are arranged such that links can guide the drive wheels between drive tubes positioned in front of and behind the boundary portion between the transport sections when a pair of transfer pipes sink into the inside of the traveling rail. Accordingly, even when the distance between the drive tubes positioned in front of and behind the boundary portion between the transport sections of the traveling rail is remote, it becomes possible to make the drive wheels of the transport body pass the distance without hindrance.

Further, according to the present invention, there is provided a transport system including a traveling rail having a plurality of transport sections, a plurality of drive tubes arranged for every transport sections of the traveling rail and a pressure medium supply device capable of selectively supplying a pressure medium in a gaseous or liquid form into or discharging the pressure medium from one ends or the other ends of respective drive tubes, wherein drive wheels mounted on a transport body capable of traveling on the traveling rail are constituted such that the drive wheels are capable of rolling while depressing the drive tubes upon receiving a thrust from the pressure medium supplied to the inside of the drive tubes, the improvement being characterized in that end portions of each drive tube are sealed in the state that it is depressed and a connecting tube is mounted to a portion in the vicinity of end portion of each drive tube.

In the transport system having the above-mentioned constitution, since the pressure medium can be individually supplied to or discharged from a plurality of drive tubes arranged at every transport sections of the traveling rail, the thrust necessary for making the transport body travel at every transport section of the traveling rail can be effectively obtained. Accordingly, it becomes possible to provide a transport system which can easily cope with the transport of a long distance and, if necessary, a plurality of transport bodies are made to travel. Further, in the boundary portion between the transport sections, the end portions of the drive tubes positioned in front of and behind the boundary portion between the transport sections are sealed in the depressed condition, and the connecting tubes are mounted in the vicinity of the end portions of the drive tubes and hence, the supply and the discharge of the pressure medium can be performed by way of these connecting tubes and it becomes possible to make the drive wheels of the transport body pass without hindrance.

Further, according to the present invention, there is provided a rail device for a transport system comprising a traveling rail provided for making a transport body having drive wheels travel thereon and drive tubes being mounted on a drive tube mounting surface of the traveling rail and being depressed by the drive wheels of the transport body and giving a rotational drive force to the drive wheels by making use of pressure of a pressure medium supplied to the inside thereof, the improvement being characterized in that grooves are formed in the traveling rail wherein the width of an opening portions of the grooves which opens at the drive tube mounting surface is smaller than the width of the inside of the grooves, and the drive tubes are formed by joining main tubes for giving power to the drive wheels of the transport body and mounting tubes for mounting the drive tubes by embedding the mounting tubes in the inside of the grooves through the opening portions of the grooves.

In the rail device having the above-mentioned constitution, the main tube is required to have the hardness suitable for performing the travel drive of the transport body while the mounting tube is required to have an appropriate hardness to facilitate mounting of the tube into the inside of the groove and to prevent the easy removal of the tube from the groove. According to the rail device of the present invention, since the drive tube is formed by joining the main tube and the mounting tube, it becomes possible to manufacture tubes having hardness which satisfies the respective required performances and the drive tube can be easily manufactured by joining them together.

Further, according to the present invention, there is provided a drive tube mounting device for a transport system capable of moving on a traveling rail while embedding mounting tubes provided to drive tubes into tube mounting grooves formed in the traveling rail, the improvement being characterized in that the drive tube mounting device includes a truck movable on the traveling rail, a pair of guide rollers which are mounted on the truck and sandwich the drive tubes from left and right above the grooves formed in the traveling rail, and mounting rollers which are mounted on the truck behind the guide rollers and press the drive tubes toward the grooves.

In the drive tube mounting device having the above-mentioned constitution, it becomes possible to easily mount the drive tube to the traveling rail while moving on the traveling rail. Accordingly, by supplying the pressure medium into the inside of the drive tubes from behind the drive tube mounting device, by making use of the pressure of the pressure medium, the drive tube mounting operation can be automatically performed while making the drive tube mounting device travel by making use of the pressure of a pressure medium.

Further, according to the present invention, there is provided a traveling route changeover switch for a transport system comprising a rotary body disposed between at least one traveling rail at one side and a plurality of traveling rails at the other side and a plurality of connecting traveling rails mounted on the rotary body, wherein the connecting traveling rails have one ends thereof selectively connected with the traveling rail at one side due to the rotation of the rotary body and the other ends thereof selectively connected to one of the traveling rails at the other side.

In the traveling route changeover switch having the above-mentioned constitution, by rotating the rotary body, the traveling rail at one side and the traveling rail at the other side can be selectively connected by way of the connecting traveling rail. Accordingly, it is unnecessary to stop the transport body on the connecting traveling rail so that it becomes possible to make the transport body pass the connecting traveling rail and perform the continuous traveling on the traveling rail at one side and the traveling rail at the other side.

BRIEF EXPLANATION OF THE DRAWINGS

FIG. 51 is a schematic cross-sectional view of the transport system in the vicinity of an end portion of the drive tube for showing another embodiment of a structure for supplying pressure medium into the drive tube used in the transport system.

FIG. 52 is a side view of a connecting tube shown in FIG. 51.

FIG. 53 is a cross-sectional view of the connecting tube shown in FIG. 51 taken along a line 53—53 of FIG. 52.

BEST MODE FOR CARRYING OUT THE INVENTION

Embodiments of the present invention are explained hereinafter in conjunction with drawings.

Figure 1:
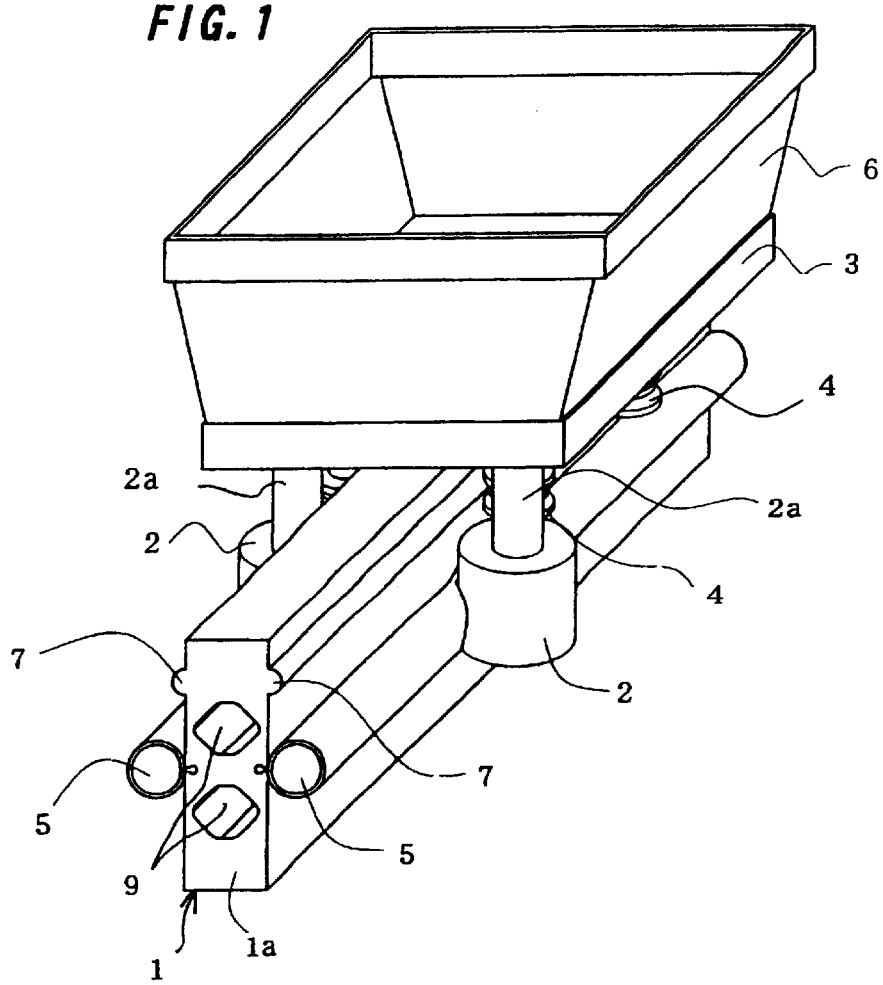
FIG. 1 is a perspective view showing the relationship among a traveling rail, a transport body and a container of a transport system according to the first embodiment of the present invention.
Figure 2:
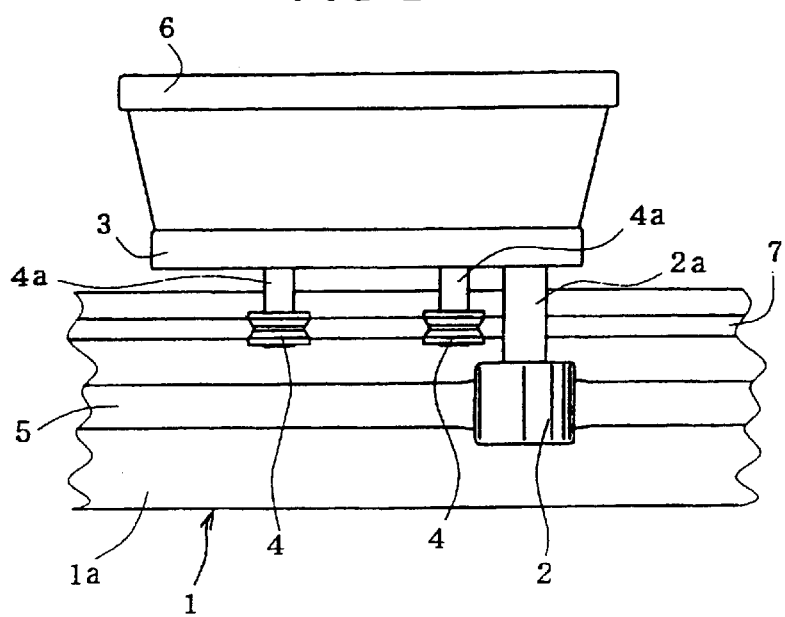
FIG. 2 is a side view of the transport system shown in FIG. 1.
Figure 3:
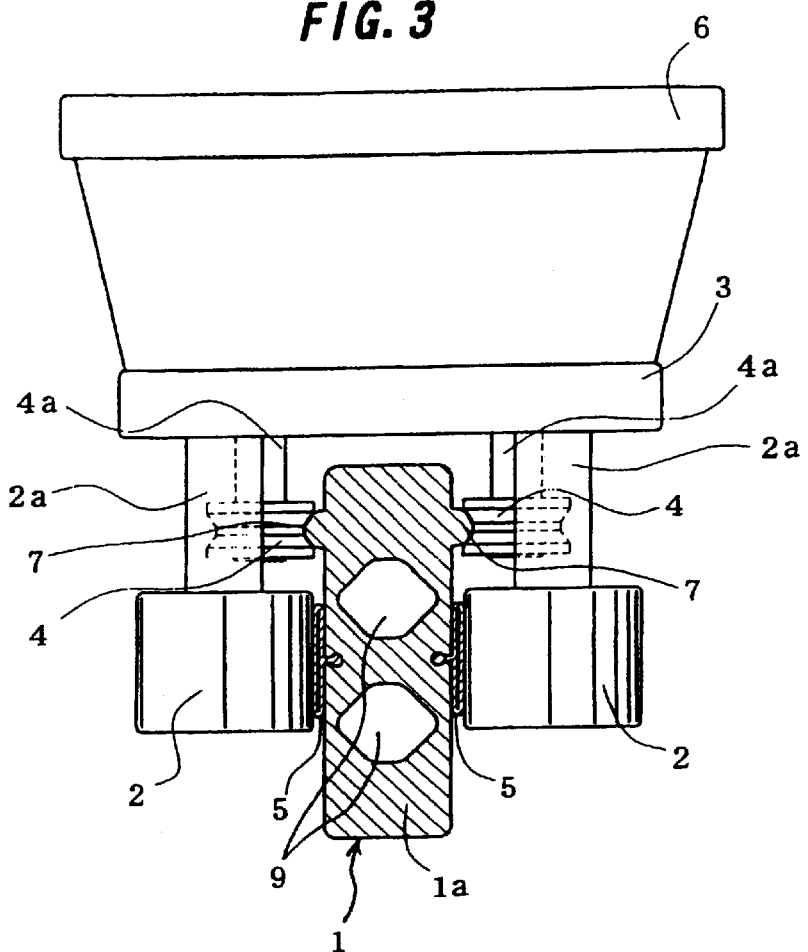
FIG. 3 is a cross-sectional view of the transport system shown in FIG. 1.

FIG. 1 to FIG. 4 show the first embodiment of the present invention. FIG. 1 is a perspective view showing the state that a transport body and a container are mounted on a traveling rail. FIG. 2 is a side view showing that state. FIG. 3 is a cross-sectional view showing that state. Further, FIG. 4A and FIG. 4B are views showing the method for supplying pressurized air into the inside of drive tubes.

In FIG. 1 to FIG. 3, numeral 1 indicates a traveling rail which is installed as a transport route in a hospital, a tower building, a warehouse, a plant or the like and is comprised of a rail body 1a. On both side surfaces of the rail body 1a of the traveling rail 1, drive tubes 5 are disposed along the longitudinal direction of the traveling rail 1, wherein one drive tube 5 is arranged for each side surface. Further, on both surfaces of the rail body 1a of the traveling rail 1, protruding portions 7 are formed and extend in the longitudinal direction of the traveling rail 1. Four traveling wheels 4 having a hand-drum shape are respectively engaged with these protruding portions 7. Further, drive wheels 2 are mounted on both sides of the traveling rail 1 such that the drive wheels 2 depress the drive tubes 5.

Shaft bodies 2a of respective drive wheels 2 and shaft bodies 4a of the traveling wheels 4 are respectively fixedly secured to a bottom surface of a transport body 3 which transports a material to be transported placed thereon. On this transport body 3, a container 6 which accommodates the material to be transported is fixedly placed.

The drive wheels 2 have a cylindrical shape and the shaft bodies 2a are mounted in the center thereof by way of bearings. The drive wheels 2 depress the drive tubes 5 with their side surfaces of the traveling rail 1. On the other hand, the traveling wheels 4 have the barrel shape and shaft bodies 4a are mounted in the center thereof by way of bearings. Since the transport body 3 and the container 6 are supported by the shaft bodies 4a of these traveling wheels 4, the weight of the material to be transported is naturally supported at positions of these traveling wheels 4. In this embodiment, although four traveling wheels 4 are provided, the number of the traveling wheels 4 can be increased depending on the weight of the material to be transported. Further, the protruding portions 7 formed on the traveling rail 1 which are engaged with the traveling wheels 4 preferably have a spherical shape.

The rail body 1a of the traveling rail 1 has a longitudinal rectangular cross section and is made of aluminum or the like by a die casting. However, the rail body 1a may be made of other section material. The drive tubes 5 are flexible tubes having a hollow circular cross section which are mounted on and along the rail body 1a of the traveling rail 1. The drive tubes 5 are made of plastic or rubber tubes such that the drive tubes 5 can restore their original shape after being depressed by the drive wheels 2.

Figure 4A:
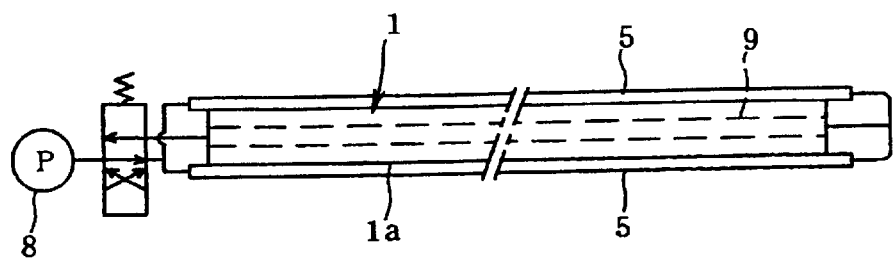
FIG. 4A and FIG. 4B are respectively schematic plan views of an essential part of the transport system showing the method for supplying the pressurized air into drive tubes mounted on the traveling rail.

In this embodiment, as shown in FIG. 1 and FIG. 3, hollow passages 9 which extend in the lengthwise direction are formed in the inside of the rail body 1a. Here, as shown in FIG. 4A, one ends of the drive tubes 5 which are arranged at both sides of the rail body 1a of the traveling rail 1 are directly connected to a port of a changeover valve 10, while the other ends of the drive tubes 5 are respectively connected to a port of the changeover valve 10 by way of the hollow passages 9 formed in the inside of the rail body 1a. When one ends of the drive tubes 5 are connected with an air source device 8 by way of the changeover valve 10 due to the changeover operation of an inner plunger (not shown in the drawing) of the changeover valve 10, the other ends of the drive tubes 5 are opened to the atmosphere. On the other hand, when the other ends of the drive tubes 5 are connected with the air source device 8, one ends of the drive tubes 5 are opened to the atmosphere. Due to such an operation, the pressure difference is generated in the inside of each drive tube 5 in front of and behind the drive wheels 2 and hence, it becomes possible to rotate the drive wheel 2 making use of this pressure difference as power and to move the drive wheel 2 back and forth on the drive tube 5.

Figure 4B:
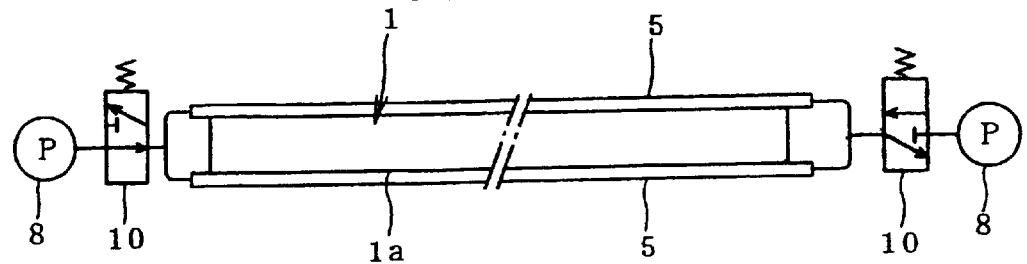

A constitution shown in FIG. 4B may be adopted. That is, both ends of each drive tube 5 arranged at both sides of the rail body 1a of the traveling rail 1 may be respectively connected to air source devices 8 by way of changeover valves 10. By selectively operating two air source devices 8 and performing the changeover operation of the changeover valves 10, when pressurized air of a given pressure is supplied to the drive tube 5 from one end (or the other end) thereof, the other end (or one end) thereof can be opened to the atmosphere. Further, as an additional modification of the constitutional examples shown in FIG. 4B, only one air source device 8 is used and a pipe connected to an air outlet of the air source device 8 is bifurcated and connected to respective solenoid changeover valves 10, 10 and one end and the other end of the drive tube 5 are respectively connected to both changeover valves 10, 10.

When it is unnecessary to move the transport body 3 back and forth, one end of the drive tube 5 may be simply connected to the air source device 8 and the other end of the drive tube 5 may be simply opened to the atmosphere.

Although the drive tubes 5 are mounted on both sides of the traveling rail 1 such that one drive tube 5 is provided for each side in the embodiment shown in FIG. 1 to FIG. 4, depending on the weight of the material to be transported or the transport speed, one drive tube may be mounted only on one side of the traveling rail 1, two drive tubes may be mounted only on one side, or equal to or more than three drive tubes may be mounted on both sides of the traveling rail.

Figure 5:
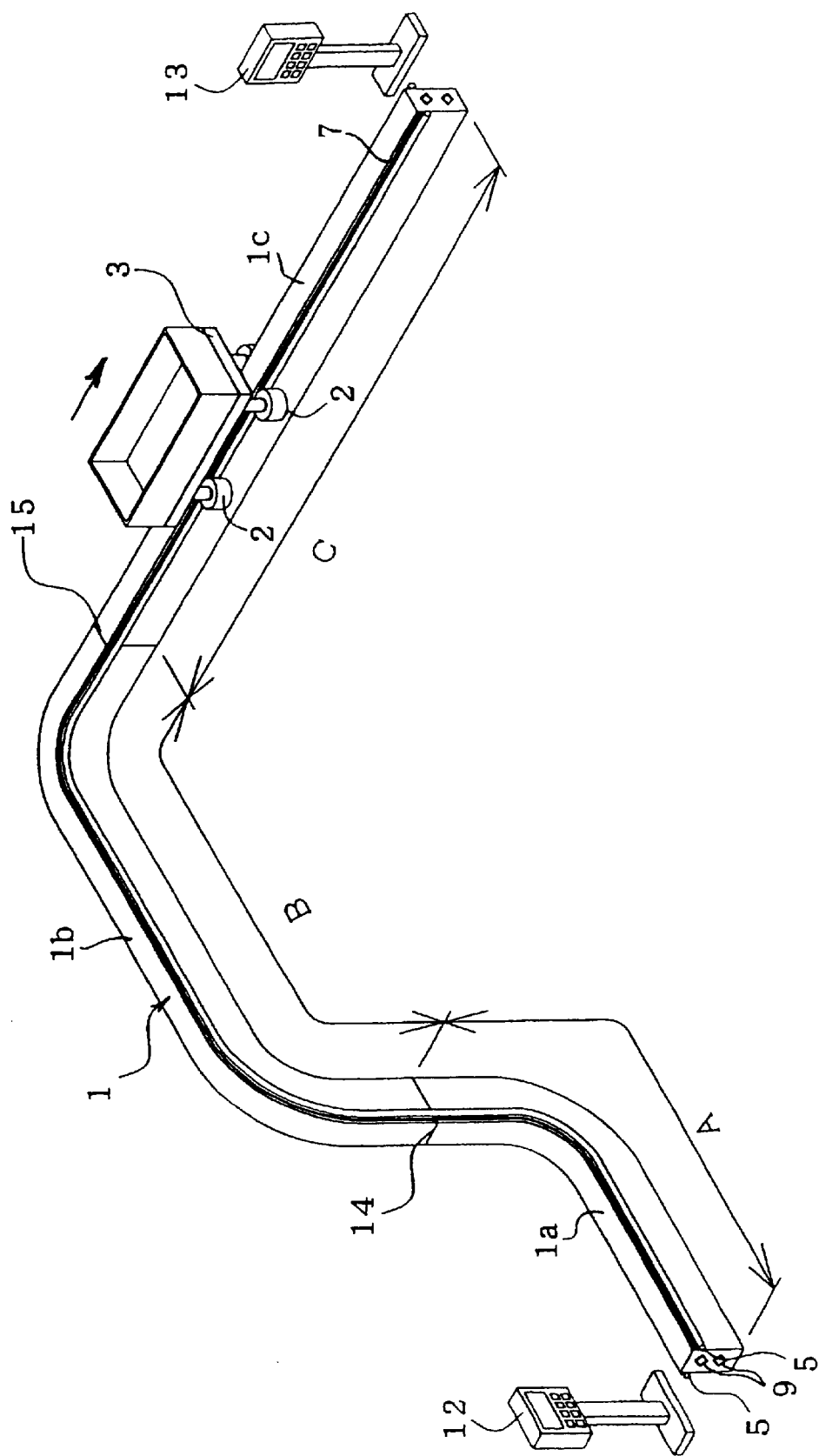
FIG. 5 is a perspective view showing the second embodiment of the present invention which shows a traveling rail as a transport route in the stereoscopic manner.

Then, the second embodiment of the present invention is explained. FIG. 5 is a schematic perspective view of a transport system which arranges a traveling rail in the three-dimensional manner. Here, the traveling rail 1 is separated in three sections, that is, a section A, a section B and a section C and they are comprised of three rail bodies 1a, 1b, 1c. At boundary portions of respective sections, transfer portions 14, 15 are provided. The transfer system is constituted such that the transport body 3 is transported from a delivery station 12 to a destination station 13 sequentially through the section A, the section B and the section C of the traveling rail 1. In the embodiment shown in FIG. 5, the drive tubes 5 arranged at both sides of the traveling rail 1 respectively contiguously extend throughout the whole sections of the traveling rail 1.

Subsequently, the third embodiment of the present invention is explained hereinafter.

Figure 6:
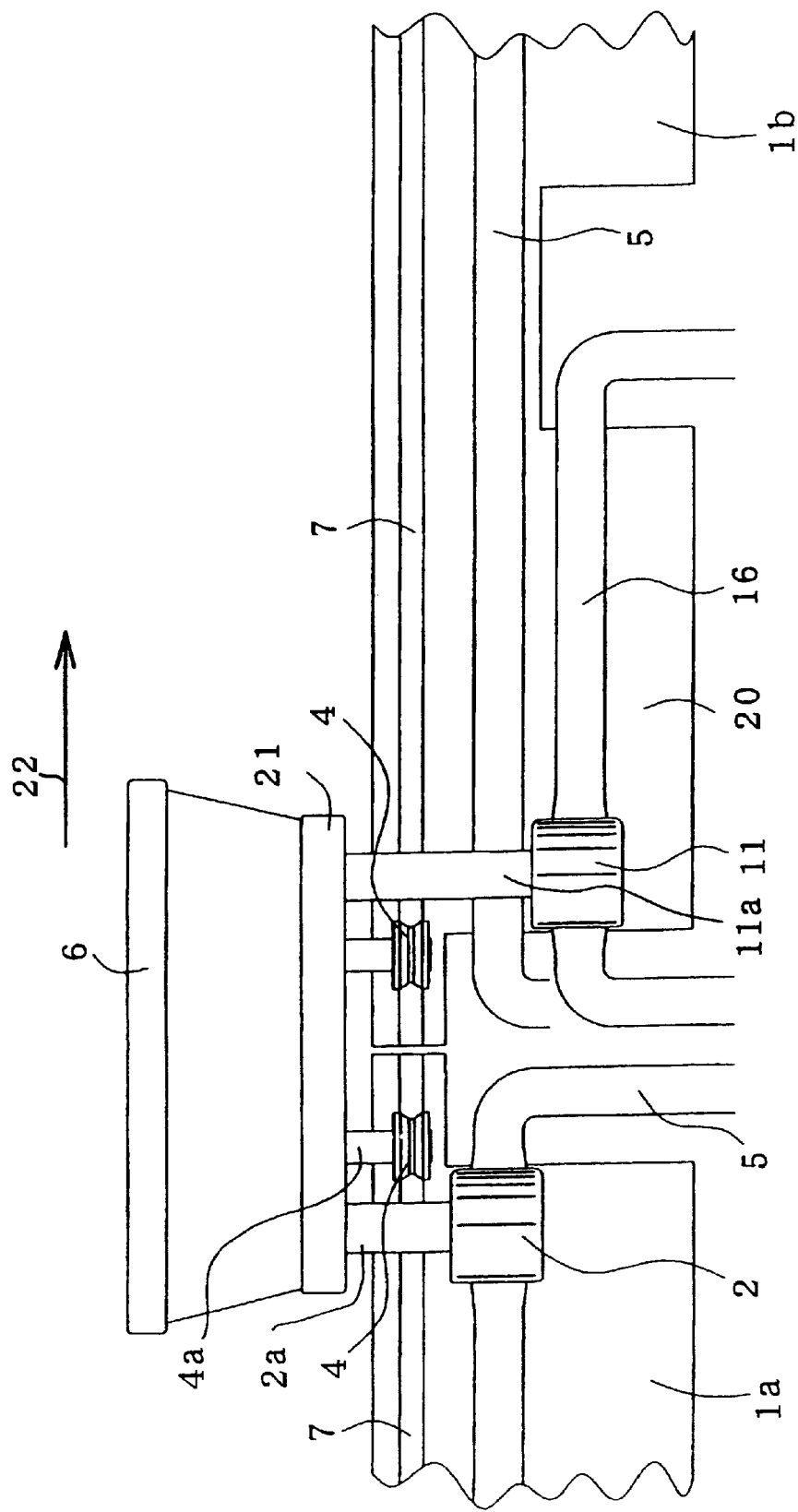
FIG. 6 is a side view showing the third embodiment of the present invention having a transfer mechanism.
Figure 7:
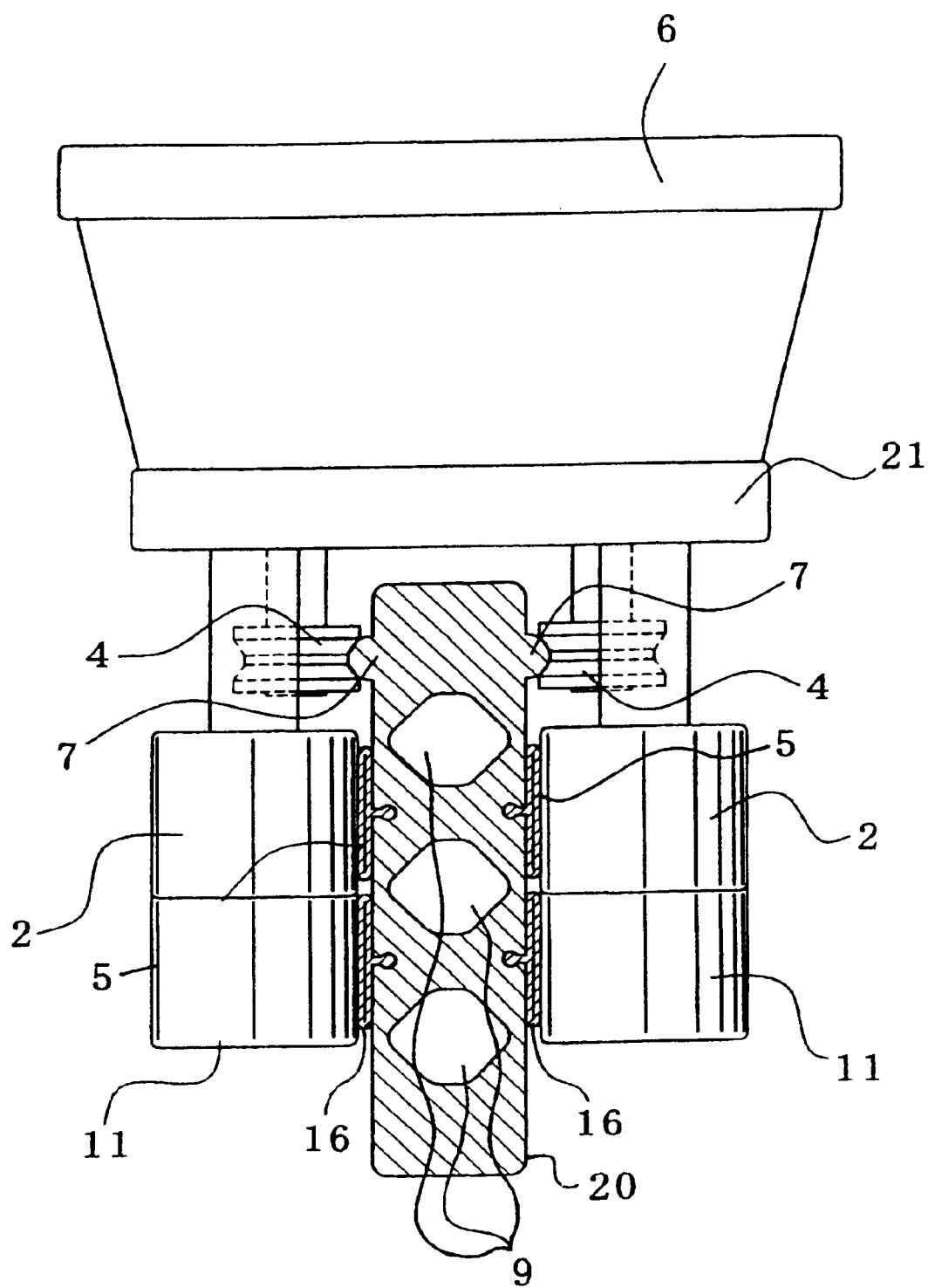
FIG. 7 is a cross-sectional view of the transfer mechanism shown in FIG. 6.

FIG. 6 is a side view of the transfer mechanism when the transport body transfers between the traveling rails and FIG. 7 is a cross-sectional view of the transfer mechanism.

In the embodiment shown in FIG. 6 and FIG. 7, a traveling rail 1 is, as a transport route, comprised of first to third rail bodies 1a, 1b, 1c in the same manner as the second embodiment. The transfer mechanism includes a transfer rail 20 which is provided to a portion of the second rail body 1b, drive tubes 5 mounted on the first and second rail bodies 1a, 1b, transfer tubes 16 mounted on the transfer rail 20, traveling wheels 4 arranged such that they are engaged with protruding portions 7 of the first and second rail bodies 1a, 1*b*, drive wheels 2 arranged such that they depress the drive tubes 5, transfer drive wheels 11 arranged such that they depress the transfer tubes 16, a transport body 21 connected to the drive wheels 2, 11 and the traveling wheels 4, a container 6 mounted on the transport body 21 for accommodating a material to be transported, and an air source not shown in the drawing for supplying air of a given pressure to the drive tubes 5 and the transfer tubes 16.

The transfer rails 20 are provided for a case in which the traveling rail 1 extends a long distance, a case in which the transport system includes a fireproof door, a dispersing/converging device or the like. That is, the transfer rail 20 is a rail provided for transferring between the first to third rail bodies 1*a*–1*c*. The transfer rails 20 are mounted on both side surfaces of the second rail body 1*b* such that one transfer rail 20 is provided to each side surface of the second rail body 1*b*. Further, a similar transfer rails are provided to the third rail body 1*c*.

The transfer tubes 16 are flexible tubes which are mounted on the transfer rail 20 and have a hollow circular cross-section which is identical with that of the drive tubes 5. The transfer tubes 16 are provided for giving power to transfer drive wheels 11 based on the same principle as that of the drive tubes 5. That is, due to the pressure of air supplied to the inside of the transfer tubes 16, the transfer drive wheels 11 are rotated and travel on the transfer tubes 16.

The traveling wheels 4 are traveling wheels which are mounted such that the traveling wheels 4 are engaged with protruding portions 7 formed on the rail bodies 1*a*–1*c* of the traveling rail 1. Due to such traveling wheels 4, a transport body 21 is capable of moving on the traveling rail 1. Further, since the transport body 21 and the container 6 are supported by the traveling wheels 4, the weight of the material to be transported is supported by these portions.

Then, the transferring operation is explained in conjunction with FIG. 6.

When the drive wheels 2 obtain the power from the drive tubes 5 on the first rail body 1*a*, the transport body 21 moves in the direction shown by an arrow 22. When the drive wheels 2 of the transport body 21 are about to reach the joining portion between the first and second rail bodies 1*a*, 1*b*, since the drive tubes 5 on the first rail body 1*a* and the drive tubes 5 on the second rail body 1*b* are spaced apart from each other, the drive wheel 2 cannot obtain the power for transferring between both drive tubes 5,5. However, when the transport body 21 starts to move on the transfer rail 20, first of all, the transfer drive wheels 11 reach the transfer tube 16 and can obtain the power from these transfer tubes 16. Accordingly, during the period that the drive wheels 2 are positioned away from the drive tubes 5, 5, the transport body 21 can be moved by the transfer drive wheels 11 which obtain the power from the transfer tubes 16 and hence, the transport body 21 can be transferred onto the second rail body 1*b* without hindrance. Subsequently, after the drive wheels 2 are transferred onto the drive tubes 5 on the second rail body 1*b*, the drive wheels 2 receive the power from the drive tubes 5 so that the drive wheels 2 can move on the second rail body 1*b*.

Also, in the case that the transport body 21 moves in the direction opposite to the above-explained direction, that is, from the second rail body 1*b* to the first rail body 1*a*, it becomes possible to ensure the power for transferring by means of the transfer drive tubes 16 and the transfer drive wheels 11 when the power to the drive wheels 2 is interrupted.

Figure 8:
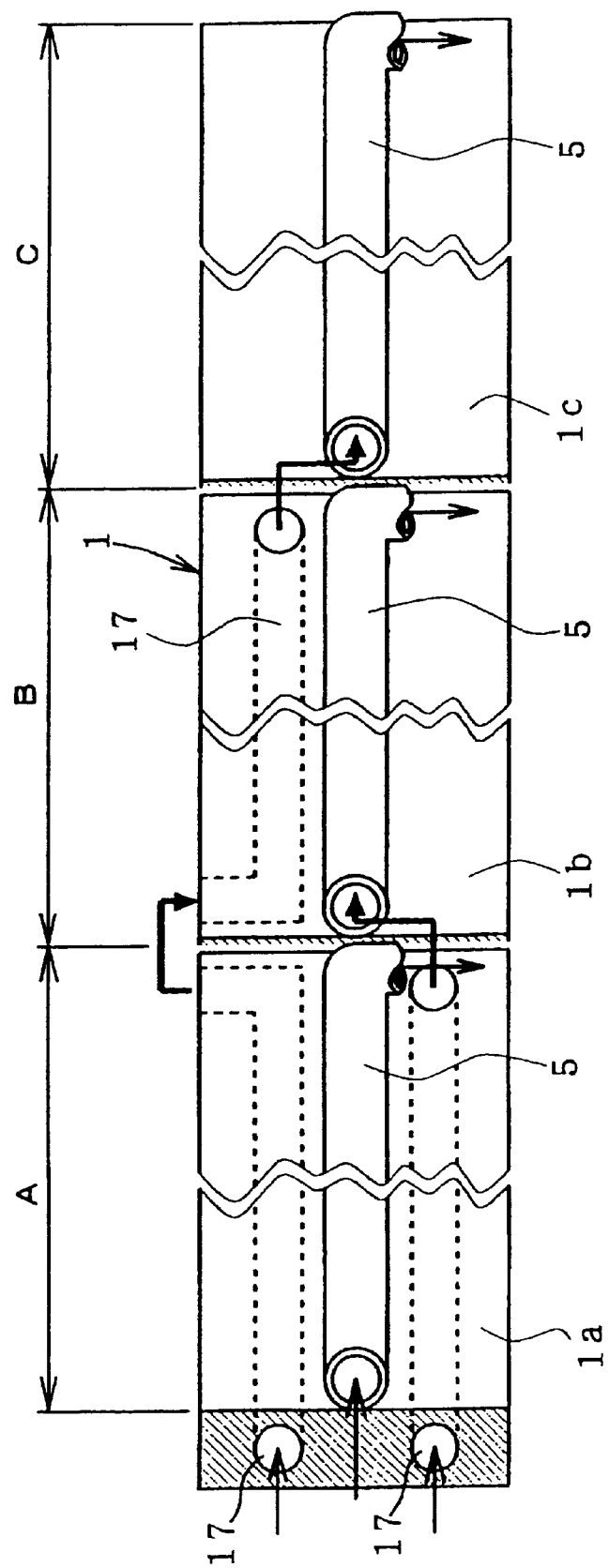
FIG. 8 is a schematic view showing an air supply system of a transport system according to the fourth embodiment of the present invention.

Then, the fourth embodiment is explained in conjunction with FIG. 8.

FIG. 8 is a schematic view showing an air supply system formed in a traveling rail. In the case that the transport route is elongated and the traveling rail 1 is comprised of a plurality of rail bodies 1*a*–1*c*, this air supply system supplies air to be supplied to following drive tubes from hollow portions formed in desired rail bodies. In FIG. 8, pressurized air is supplied to the drive tubes 5 on three rail bodies 1*a*–1*c* of a section A, a section B and a section C of the traveling rail 1.

In the rail body 1*a* of the section A, two airtight hollow passages 17 which extend in the longitudinal direction of the traveling rail 1 are formed. Air is supplied to left ends of these hollow passages 17 from the air source device. One hollow passage 17 has a right end thereof connected with the drive tube 5 on the rail body 1*b* of the section B and the other hollow passage 17 is connected with the hollow passage 17 of the rail body 1*b* of the section B. The bore diameter of the hollow passage is determined based on the length of the traveling rail, the air pressure, the power necessary for driving drive wheels and the like. Further, the number of hollow passages is selected in response to the number of the rail bodies which constitute the traveling rail and the like.

Pressurized air is directly supplied to the drive tubes 5 on the rail body 1*a* of the section A from the air source device. On the other hand, a right end of the hollow passage 17 in the section B is connected with the drive tubes 5 on the rail body 1*c* in the section C. As a method for supplying pressurized air into both ends or one end of each drive tube 5, a constitutional example shown in FIG. 4B or the constitution which has been described as a modification of the constitution of FIG. 4B can be adopted, for example.

Due to such an air supply system having such constitutions, it is unnecessary to separately install air supply pipes on the traveling rail. Further, although not shown in the drawing, pressurized air can be supplied to the transfer drive tubes 16 through the hollow passages formed in the insides of the rail bodies.

In the transport systems of the above-mentioned respective embodiments, the transport body which moves while placing a document or an article to be transported thereon is provided outside the transport tube and moves on the traveling rail. Accordingly, the document or the article to be transported can be transported without imposing any restriction on the shape of the document or the article to be transported. Further, since the drive wheels, the traveling wheels and the transport body are integrally constituted and hence, there is no possibility that the transport body does not follow the drive wheels or the traveling wheels so that the document or the article can be transported a long distance at a high speed.

Figure 9:
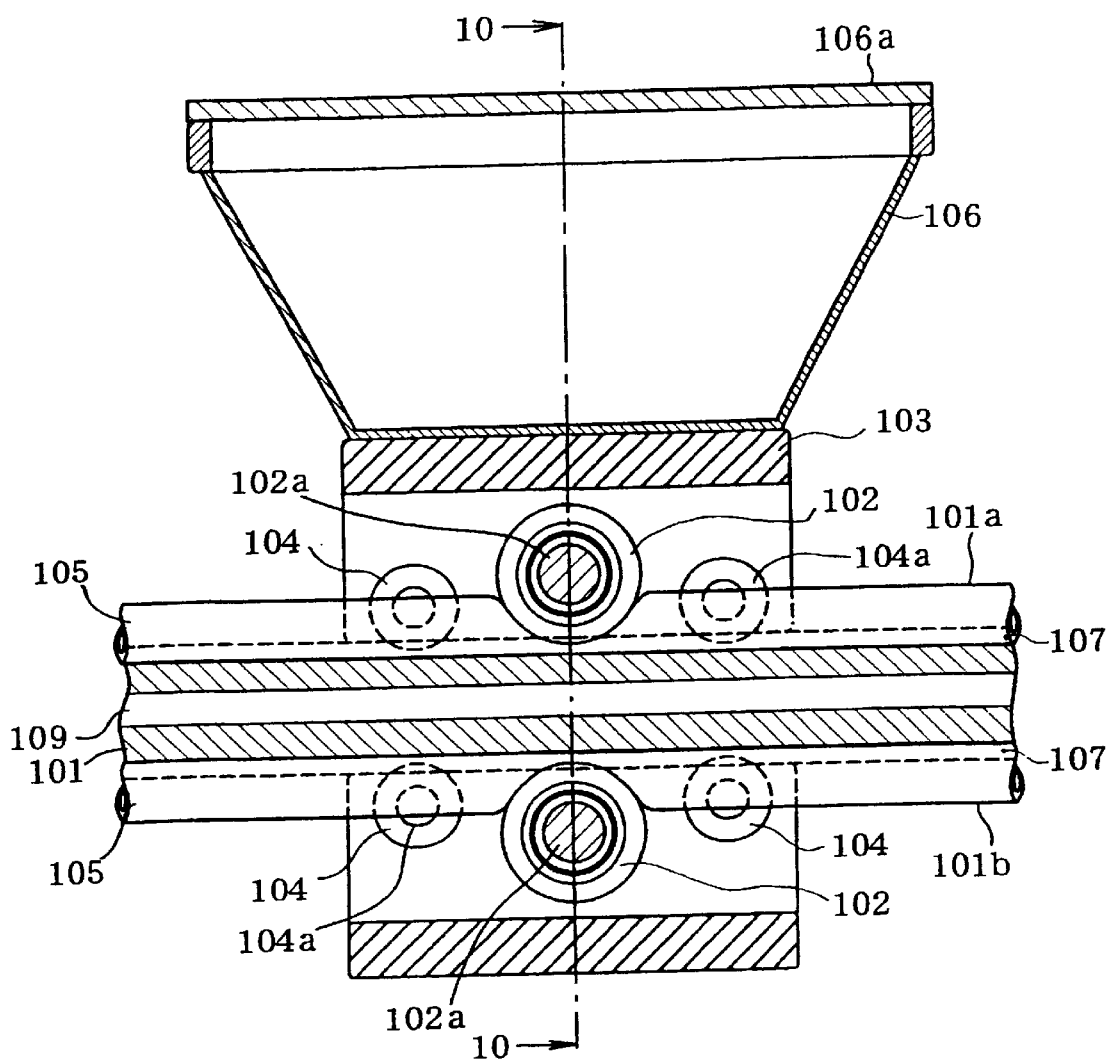
FIG. 9 is a cross-sectional view of a transport system according to the fifth embodiment of the present invention taken along a line 9—9 in FIG. 10.
Figure 10:
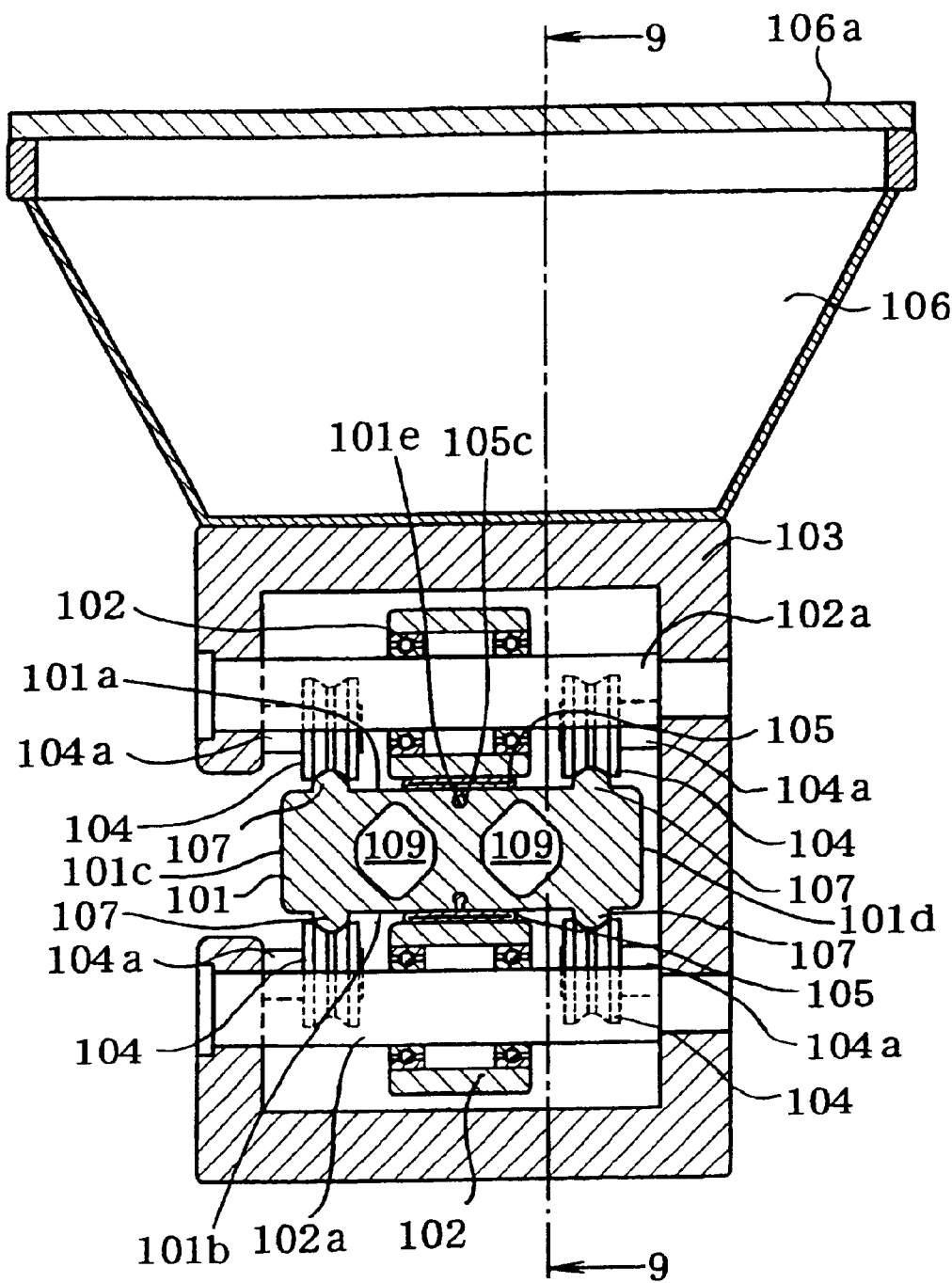
FIG. 10 is a cross-sectional view of the transport system shown in FIG. 9 taken along a line 10—10 in FIG. 9.

FIG. 9 and FIG. 10 show the fifth embodiment of the present invention. FIG. 9 is a cross-sectional view taken along a line 9—9 of FIG. 10 showing the state that a transport body and a container are mounted on the traveling rail, while FIG. 10 is a cross-sectional view of a transport system shown in FIG. 9 taken along a line 10—10 of FIG. 9.

In FIG. 9 and FIG. 10, a traveling rail 101 is installed in a hospital, a tower building, a warehouse, a plant or the like and forms a transport route. The traveling rail 101 has main wall surfaces which extend horizontally in the horizontal transport, that is, an upper surface 101*a* and a lower surface 101*b* in FIG. 9 and FIG. 10 and side wall surfaces 101*c*, 101*d* which extend vertically in the horizontal transport. On the main wall surfaces 101a, 101b of the traveling rail 101, drive tubes 105 are mounted along the longitudinal direction of the traveling rail 101 such that one drive tube 105 is mounted on each main wall surface 101a, 101b. Concave grooves 101e are formed in the main wall surfaces 101a, 101b of the traveling rail 101, while convex ridge portions 105c which are fitted into the concave grooves 101e are formed on drive tubes 105. Due to the fitting engagement between the concave grooves 101e and the convex ridge portions 105c, the drive tubes 105 are mounted on the traveling rail 101. Further, on the main wall surfaces 101a, 101b of the traveling rail 101, convex portions 107 which extend in the longitudinal direction of the traveling rail 101 are formed. These convex portions 107 are engaged with four hand-drum shaped traveling wheels 104. Further, drive wheels 102 are respectively arranged on the main wall surfaces 101a, 101b of the traveling rail 101 such that these drive wheels 102 depress the drive tubes 105.

Shaft bodies 102a of respective drive wheels 102 and shaft bodies 104a of respective traveling wheels 104 are fixedly secured to a transport body 3 which transports a material to be transported while placing the material thereon. A container 106 which accommodates the material to be transported is fixedly secured onto the transport body 3. The container 106 includes a lid 106a which can be opened or closed.

The drive wheels 102 have a cylindrical shape and the shaft bodies 102a are mounted in the center thereof by way of bearings. The drive wheels 102 depress the drive tubes 105 on the main wall surfaces 101a, 101b of the traveling rail 101.

On the other hand, the traveling wheels 104 have the hand-drum shape and shaft bodies 104a are mounted in the center thereof by way of bearings. Since the transport body 103 and the container 106 are supported by the shaft bodies 104a of these traveling wheels 104, the weight of the material to be transported is naturally supported at positions of these traveling wheels 104. In this embodiment, although four traveling wheels are provided, the number of the traveling wheels 104 can be increased depending on the weight of the material to be transported. Further, the convex portions 107 formed on the traveling rail 101 which are engaged with the traveling wheels 104 preferably have a spherical shape.

The traveling rail 101 has a laterally-elongated rectangular cross section and is made of aluminum or the like by a die casting. However, the traveling rail 101 may be made of a section material or the like. The drive tubes 105 are flexible tubes having a hollow circular cross section which are mounted on and along the traveling rail 101. The drive tubes 105 are made of plastic or rubber tubes and can restore their original shape after being depressed by the drive wheels 102.

Figure 11A:
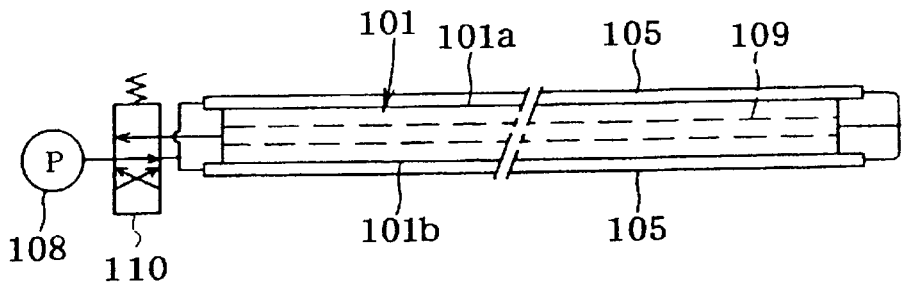
FIG. 11A, FIG. 11B, FIG. 11C and FIG. 11D are respectively schematic side views of an essential part of the transport system showing the method for supplying pressurized air into drive tubes.

As shown in FIG. 9 and FIG. 10, in this embodiment, hollow passages 9 which extend in the lengthwise direction are formed in the inside of the traveling rail 101. Here, as shown in FIG. 11A, one ends of the drive tubes 105 which are mounted on the main wall surfaces 101a, 101b of the traveling rail 101 are directly connected to a port of a changeover valve 110, while the other ends of the drive tubes 105 are respectively connected to a port of the changeover valve 110 by way of the hollow passages 9 formed in the inside of the traveling rail 101. When one ends of the drive tubes 105 are connected with a pressurized air supply device 108 which constitutes a pressurized fluid supply device by way of the changeover valve 110 due to the changeover operation of an inner plunger (not shown in the drawing) of the changeover valve 110, the other ends of the drive tubes 105 are opened to the atmosphere. On the other hand, when the other ends of the drive tubes 105 are connected with the pressurized air supply device 108, one ends of the drive tubes 105 are opened to the atmosphere. Due to such an operation, the pressure difference is generated in the inside of each drive tube 105 in front of and behind the drive wheel 102 and hence, it becomes possible to rotate the drive wheel 102 making use of this pressure difference as power and to move the drive wheel 102 back and forth on the drive tube 105.

Figure 11B:
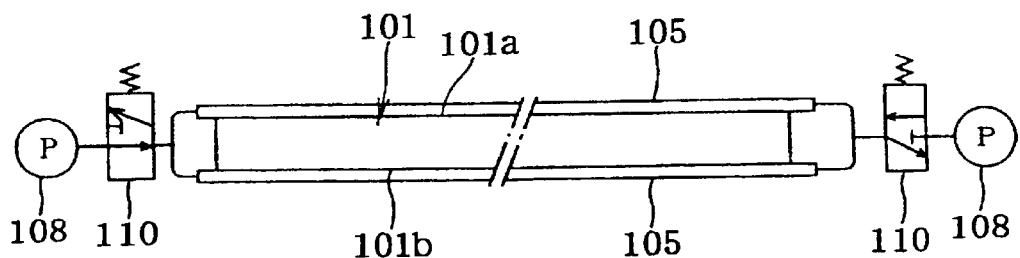

A constitution shown in FIG. 11B may be adopted. That is, both ends of each drive tube 105 mounted on the main wall surfaces of the rail body 101a of the traveling rail 101 may be respectively connected to pressurized air supply devices 108 by way of changeover valves 110. By selectively operating two pressurized air supply devices 108 and performing the changeover operation of the changeover valves 110, when pressurized air of a given pressure is supplied to the drive tube 105 from one end (or the other end) of the drive tube 105, the other end (or one end) of the drive tube 105 is opened to the atmosphere. Further, as an additional modification of the constitutional examples shown in FIG. 11B, only one pressurized air supply device 108 is used and a pipe connected to an air outlet of the pressurized air supply device 108 is bifurcated and connected to respective changeover valves 110, 110 and one end and the other end of the drive tube 105 may be respectively connected to both changeover valves 110, 110.

Figure 11C:
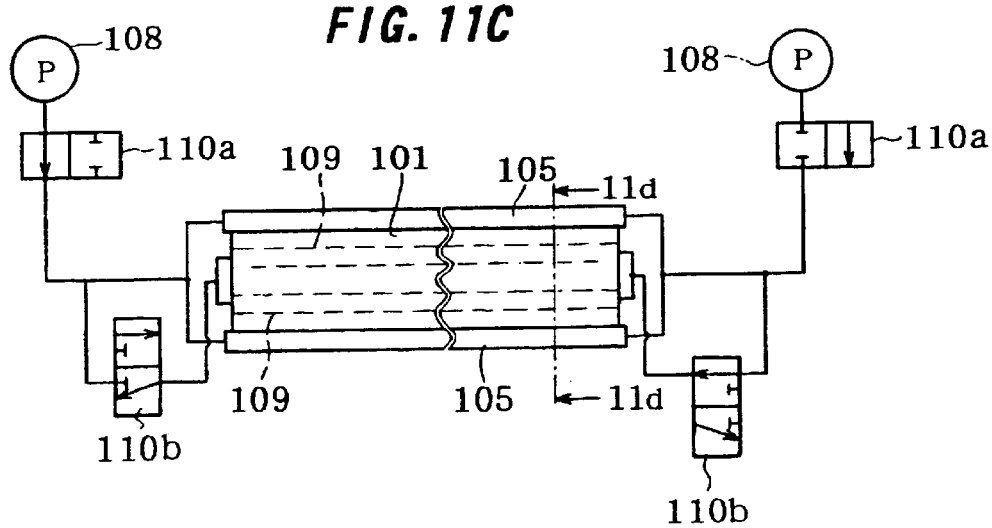
Figure 11D:
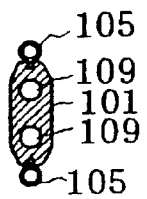

Further, as shown in FIG. 11C and FIG. 11D, both ends of the drive tubes 105 which are formed on the main wall surfaces 101a, 101b of the traveling rail 101 are respectively connected with first changeover valves 110a and second changeover valves 110b, the first changeover valves 110a are connected with pressurized air supply devices 108, and one second changeover valve 110b is connected with the other second changeover valve 110b by way of hollow passages 109 in the inside of the traveling rail 101. In this constitutional example, by selectively operating two pressurized air supply devices 108 and performing the changeover operation of the first changeover valve 110a and the second changeover valve 110b respectively, when pressurized air of a given pressure is supplied from one ends (or the other ends) of the drive tubes 105, the other ends (or one ends) may be opened to the atmosphere through the hollow passages 109. In such a constitution which exhausts air through the hollow passages 109, compared to a case that the drive tubes 105 are directly opened to the atmosphere, the exhaust noise can be largely suppressed in the inside of the hollow passages 109. Accordingly, the number of constituent components of a muffler such as a silencer for reducing the exhaust noise can be reduced thereby a space necessary for installation of the transport system can be reduced.

When it is unnecessary to move the transport body 103 back and forth, one ends of the drive tubes 105 are simply connected to the pressurized air supply device 108 and the other ends are simply opened to the atmosphere.

Further, when the transport body 103 is transported vertically or is transported in an inclined section having a vertical lift, by supplying pressurized air into the inside of the drive tubes 105 at a position in front of the drive wheels 102 in the advancing direction of the drive wheels 102 at the time that the transport body 103 moves downwardly, the pressure difference in the inside of the drive tubes 105 between the positions in front of and behind the drive wheel 102 is controlled so that the descending speed of the transport body 103 can be adjusted or the transport body 103 can be stopped in the midst of the movement.

Figure 12:
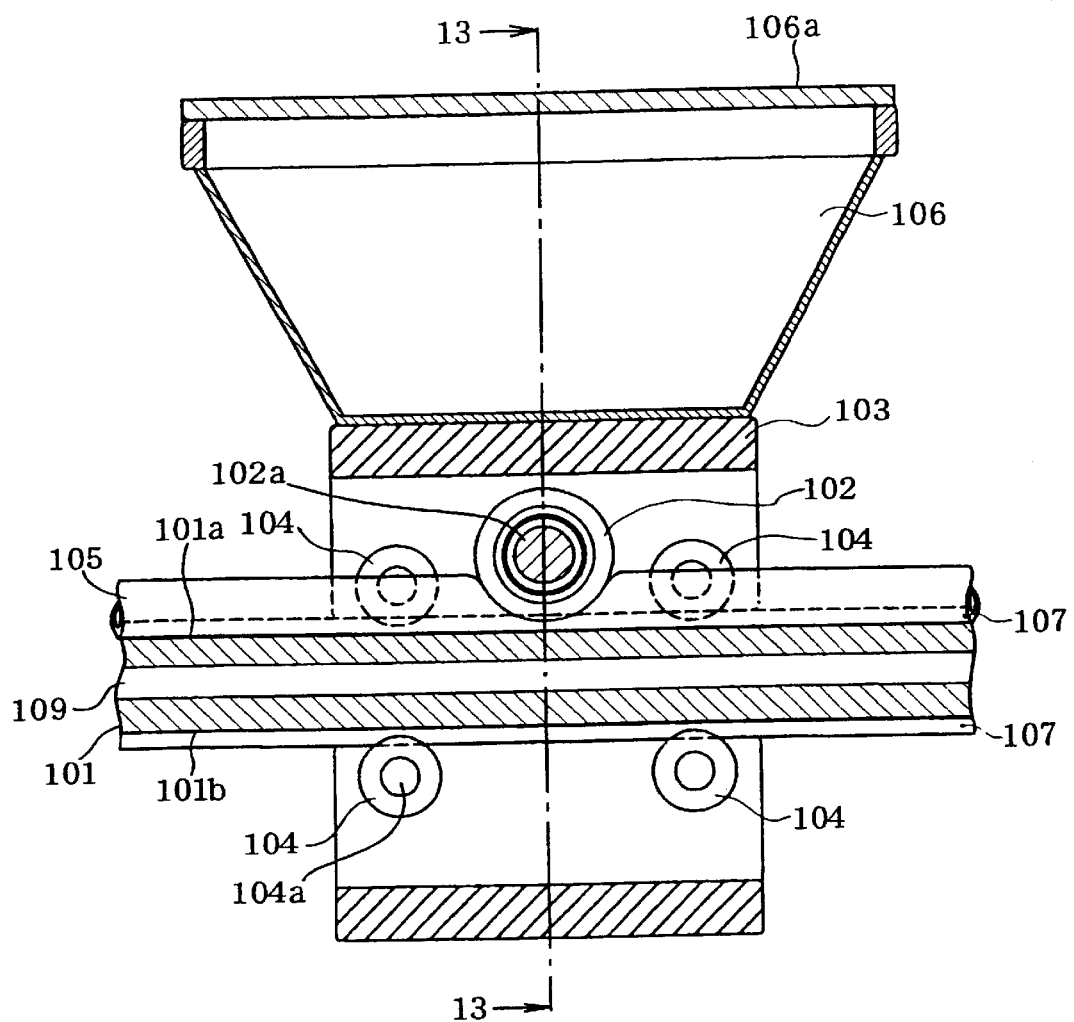
FIG. 12 is a cross-sectional view of a transport system of the sixth embodiment of the present invention taken along a line 12—12 of FIG. 13.
Figure 13:
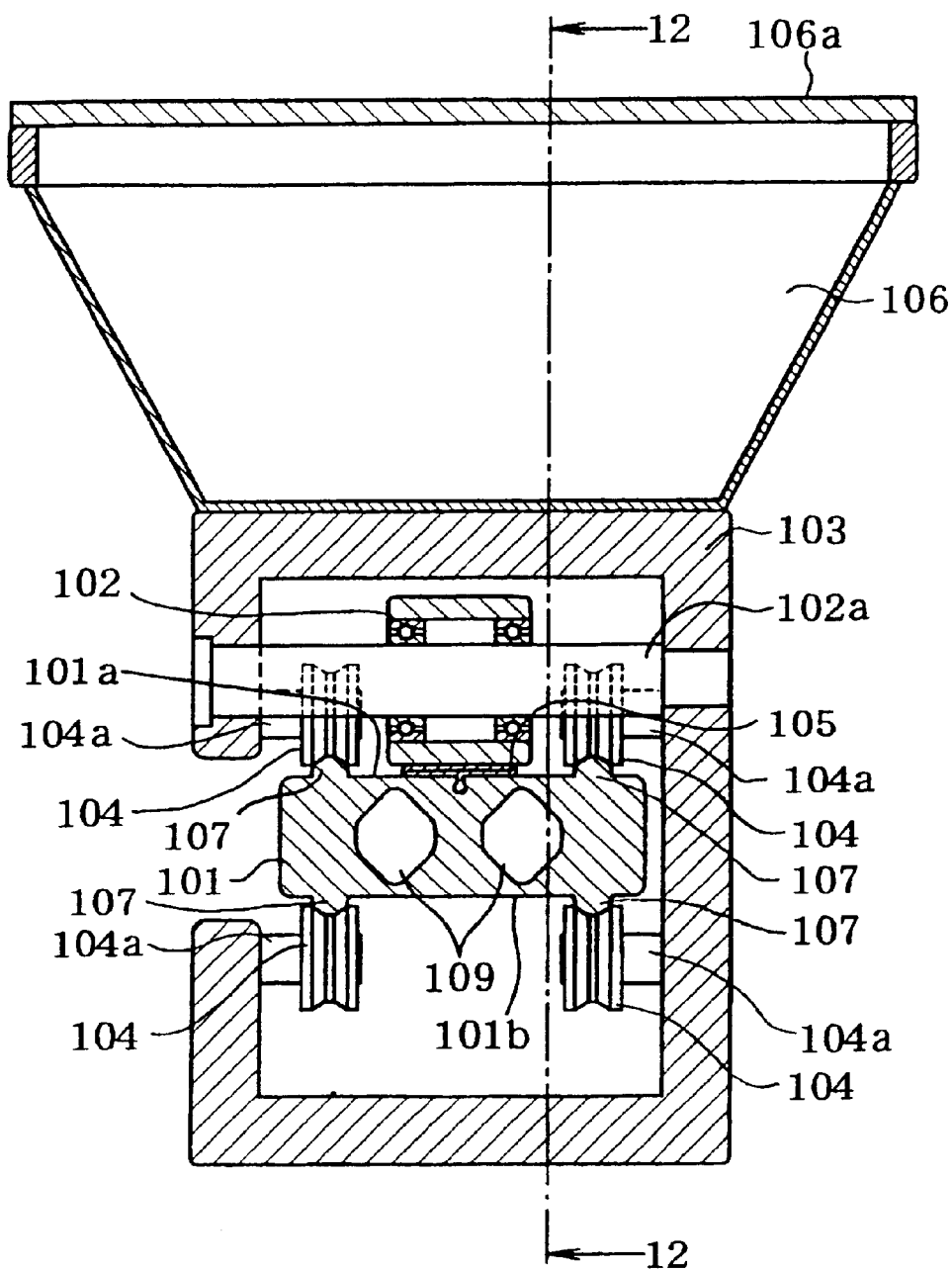
FIG. 13 is a cross-sectional view of the transport system shown in FIG. 12 taken along a line 13—13 of FIG. 12.

Subsequently, the sixth embodiment of the present invention is explained in conjunction with FIG. 12 and FIG. 13. FIG. 12 is a cross-sectional view taken along a line 12—12 of FIG. 13 showing the state that a transport body and a container are mounted on a traveling rail. FIG. 13 is a cross-sectional view of a transport system shown in FIG. 12 taken along a line 13—13 of FIG. 12.

In the fifth embodiment, drive tubes 105 are respectively mounted on an upper surface 101a and a lower surface 101b which constitute main wall surfaces (wall surfaces extending in the horizontal direction in a horizontal transport) of a traveling rail 101 (in the longitudinal direction of the traveling rail 101) such that one drive tube 105 is mounted on each surface 101a, 101b. To the contrary, in the sixth embodiment, one drive tube 105 is mounted only on an upper surface 101a of the traveling rail 101 in the longitudinal direction of the traveling rail 101. Accordingly, a drive wheel 102 is also arranged on the upper surface of the traveling rail 101 such that the drive wheel 102 depresses the drive tube 105. Although the drive tube 105 and the drive wheel 102 are mounted on the upper surface of the traveling rail 101, they may be mounted on a lower surface of the traveling rail 101.

Figure 14:
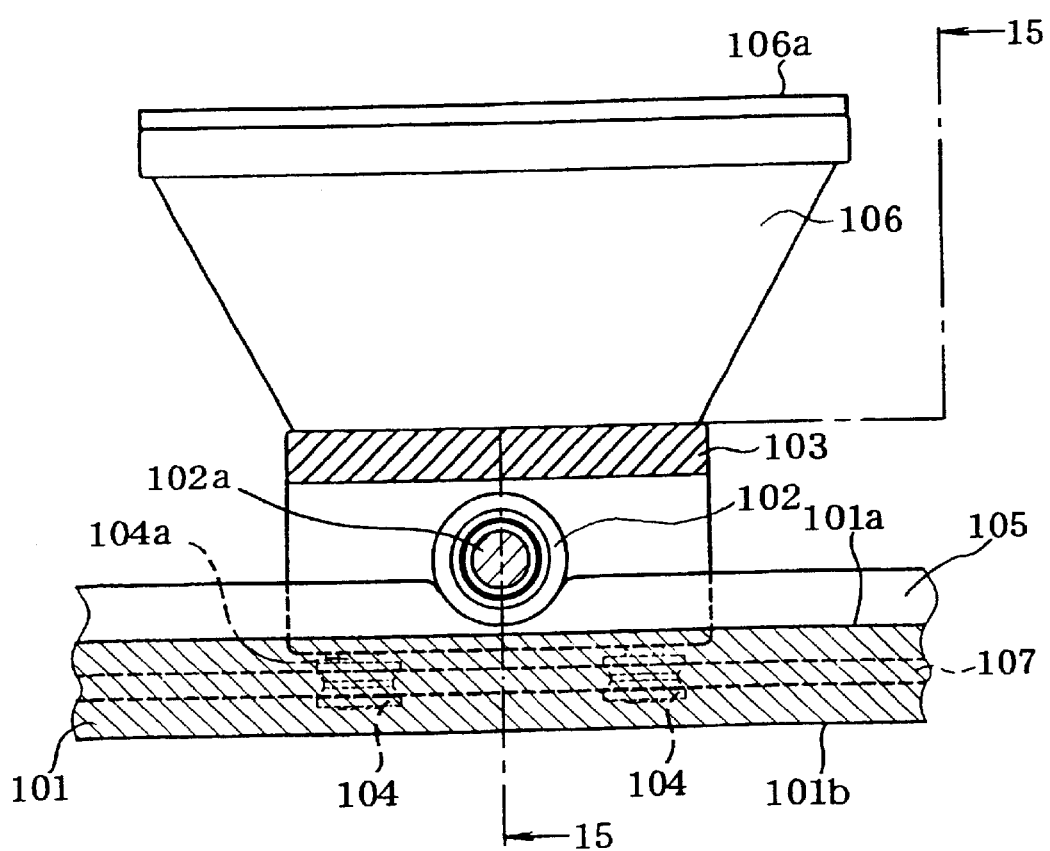
FIG. 14 is a cross-sectional view of a transport system of the seventh embodiment of the present invention taken along a line 14—14 of FIG. 15.
Figure 15:
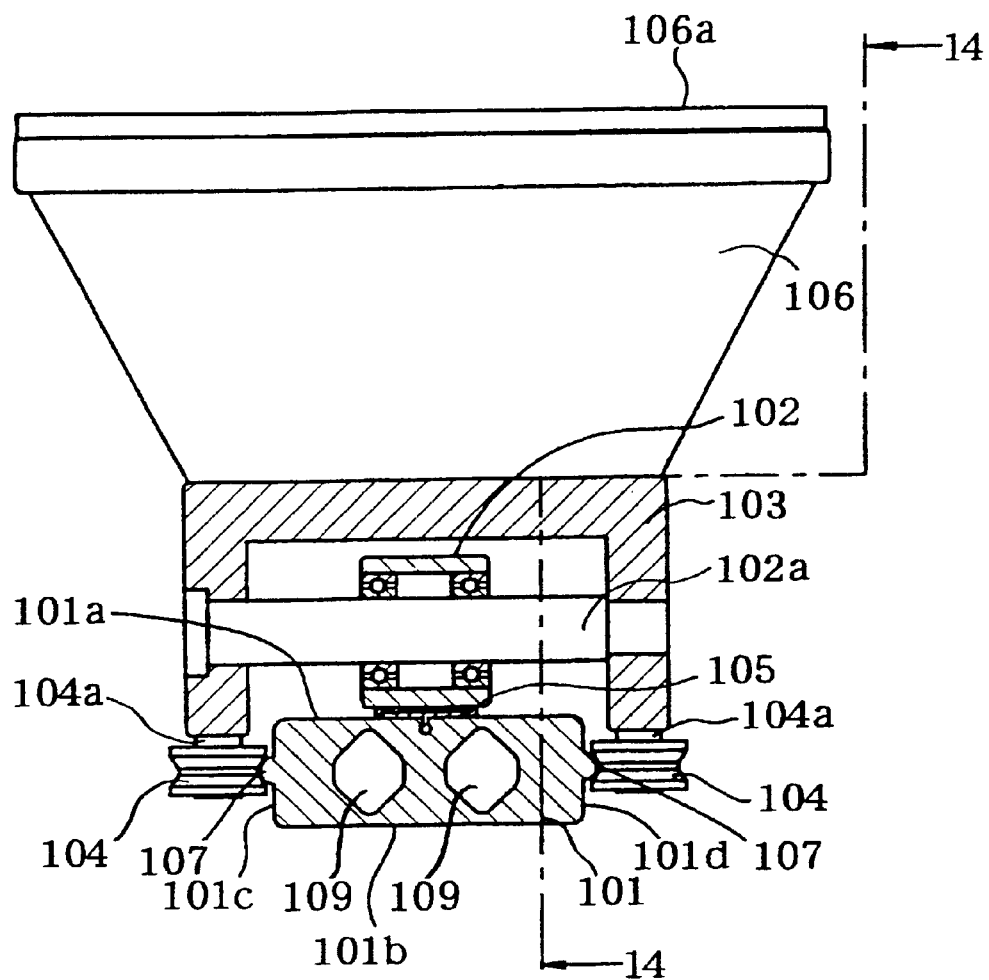
FIG. 15 is a cross-sectional view of the transport system shown in FIG. 14 taken along a line 15—15 of FIG. 14.

Subsequently, the seventh embodiment of the present invention is explained in conjunction with FIG. 14 and FIG. 15. FIG. 14 is a cross-sectional view taken along a line 14—14 of FIG. 15 showing the state that a transport body and a container are mounted on a traveling rail. FIG. 15 is a cross-sectional view of a transport system shown in FIG. 14 taken along a line 15—15 of FIG. 14.

In the sixth embodiment of the present invention, the convex portions 107 are formed on the upper surface 101a of the traveling rail 101 along the longitudinal direction of the traveling rail 101 and four hand-drum shaped traveling wheels 104 are engaged with these convex portions 107. To the contrary, in this seventh embodiment, convex portions 107 are formed on side surfaces 101c, 101d of the traveling rail 101 along the longitudinal direction of the traveling rail 101 and hand-drum like traveling wheels 104 are engaged with these convex portions 107.

Although four traveling wheels 104 are provided in this embodiment, the number of the traveling wheels 104 is increased or decreased depending on the weight of a material to be transported. Further, the drive wheel 102 and the drive tube 105 are mounted on the upper surface 101a of the traveling rail 101, they may be mounted on a lower surface 101b of the traveling rail 101.

Figure 16:
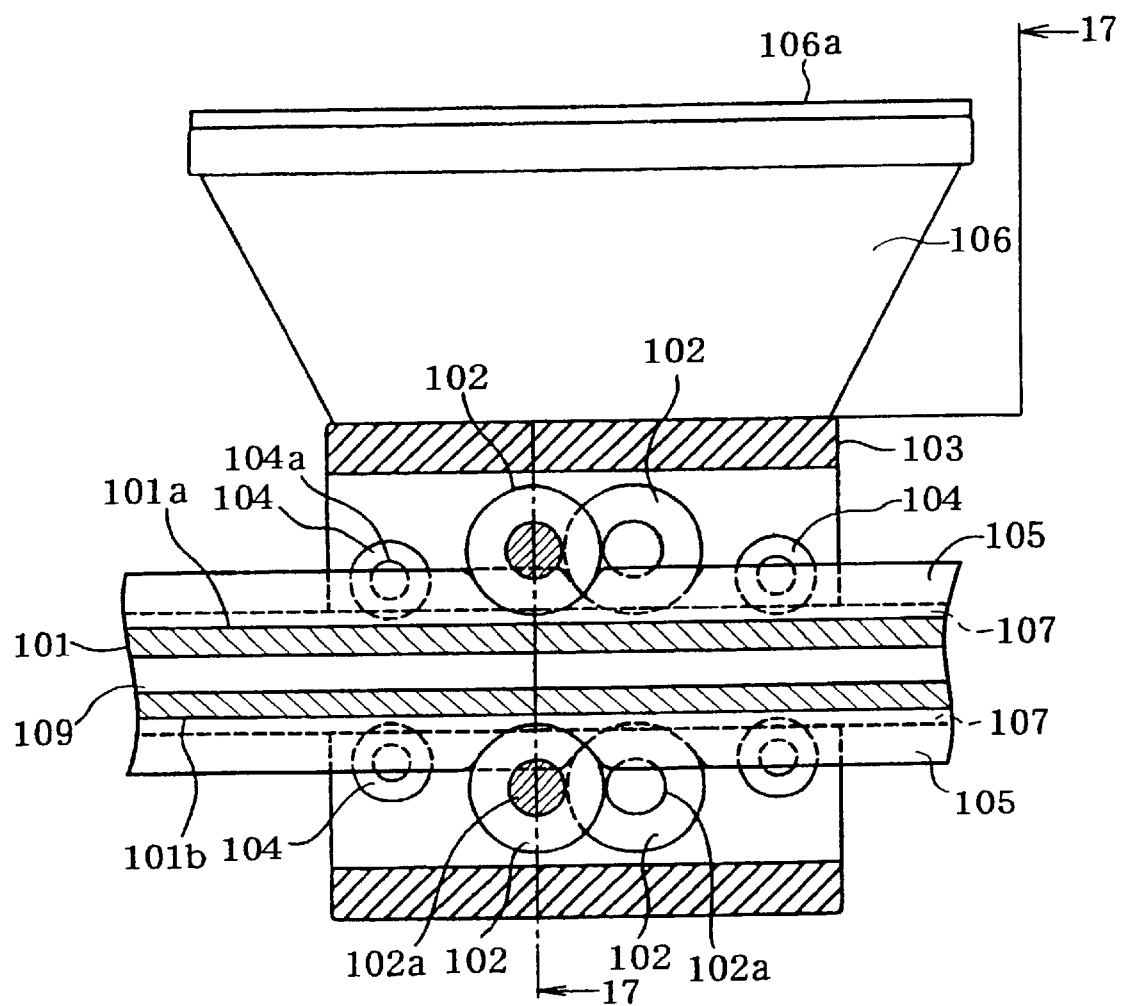
FIG. 16 is a cross-sectional view of a transport system of the eighth embodiment of the present invention taken along a line 16—16 of FIG. 17.
Figure 17:
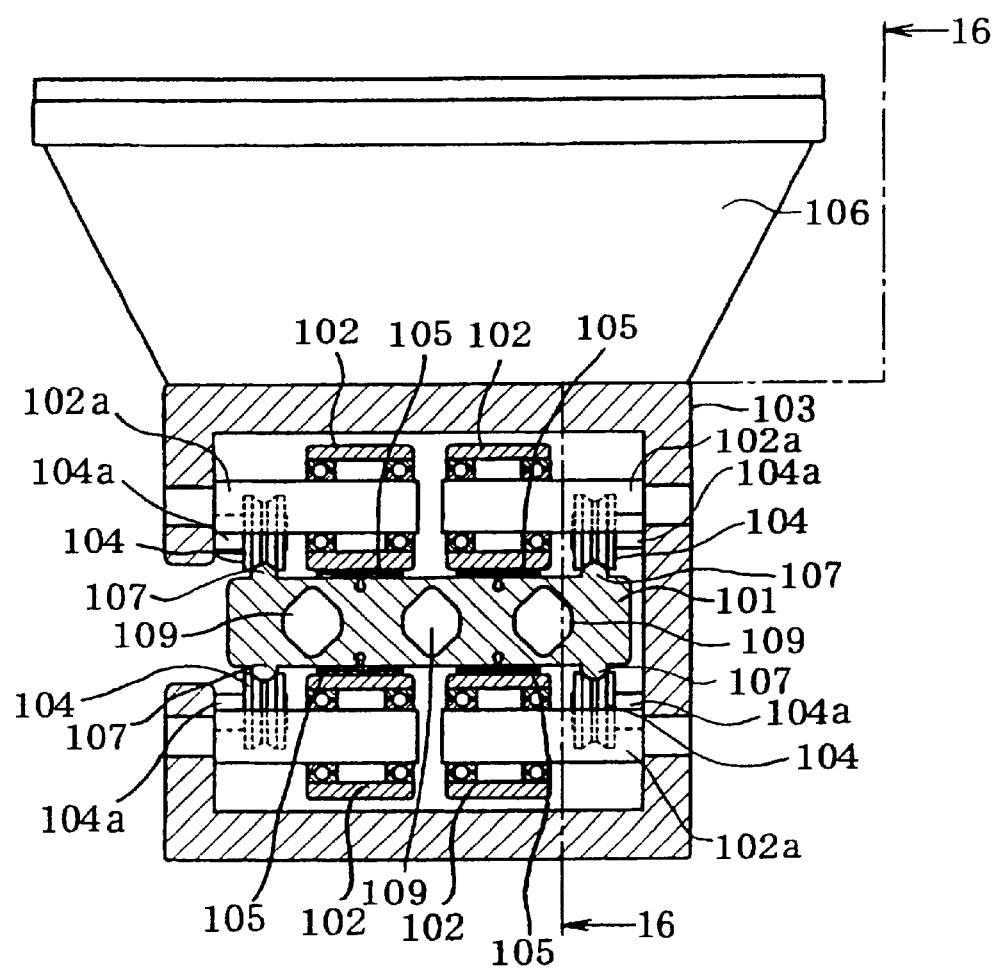
FIG. 17 is a cross-sectional view of the transport system shown in FIG. 16 taken along a line 17—17 of FIG. 16.

Subsequently, the eighth embodiment of the present invention is explained in conjunction with FIG. 16 and FIG. 17. FIG. 16 is a cross-sectional view taken along a line 16—16 of FIG. 17 showing the state that a transport body and a container are mounted on a traveling rail. FIG. 17 is a cross-sectional view of a transport system shown in FIG. 16 taken along a line 17—17 of FIG. 16.

In the first embodiment, one drive tube 105 is mounted on each of the upper surface 101a and the lower surface 101b which constitute the main wall surfaces of the traveling rail 101 along the longitudinal direction of the traveling rail 101. To the contrary, in the eighth embodiment, two drive tubes 105 are mounted on each of an upper surface 101a and a lower surface 101b which constitute main wall surfaces of a traveling rail 101 along the longitudinal direction of the traveling rail 101. Further, two drive wheels 102 are also mounted on each of the upper surface 101a and the lower surface 101b of the traveling rail 101 such that the drive wheels 102 depress the drive tubes 105.

In this embodiment, although two sets of the drive tube 105 and the drive wheel 102 are mounted on each wall surface 101a, 101b of the traveling rail 101, the number of sets may be increased to three sets or four sets depending on the weight of a material to be transported, or a plurality of drive tubes 105 are mounted only on the upper surface 101a or on the lower surface 101b, or the number of drive tubes 105 mounted on the upper surface 101a and the lower surface 101b may differ between these two surfaces.

Figure 18:
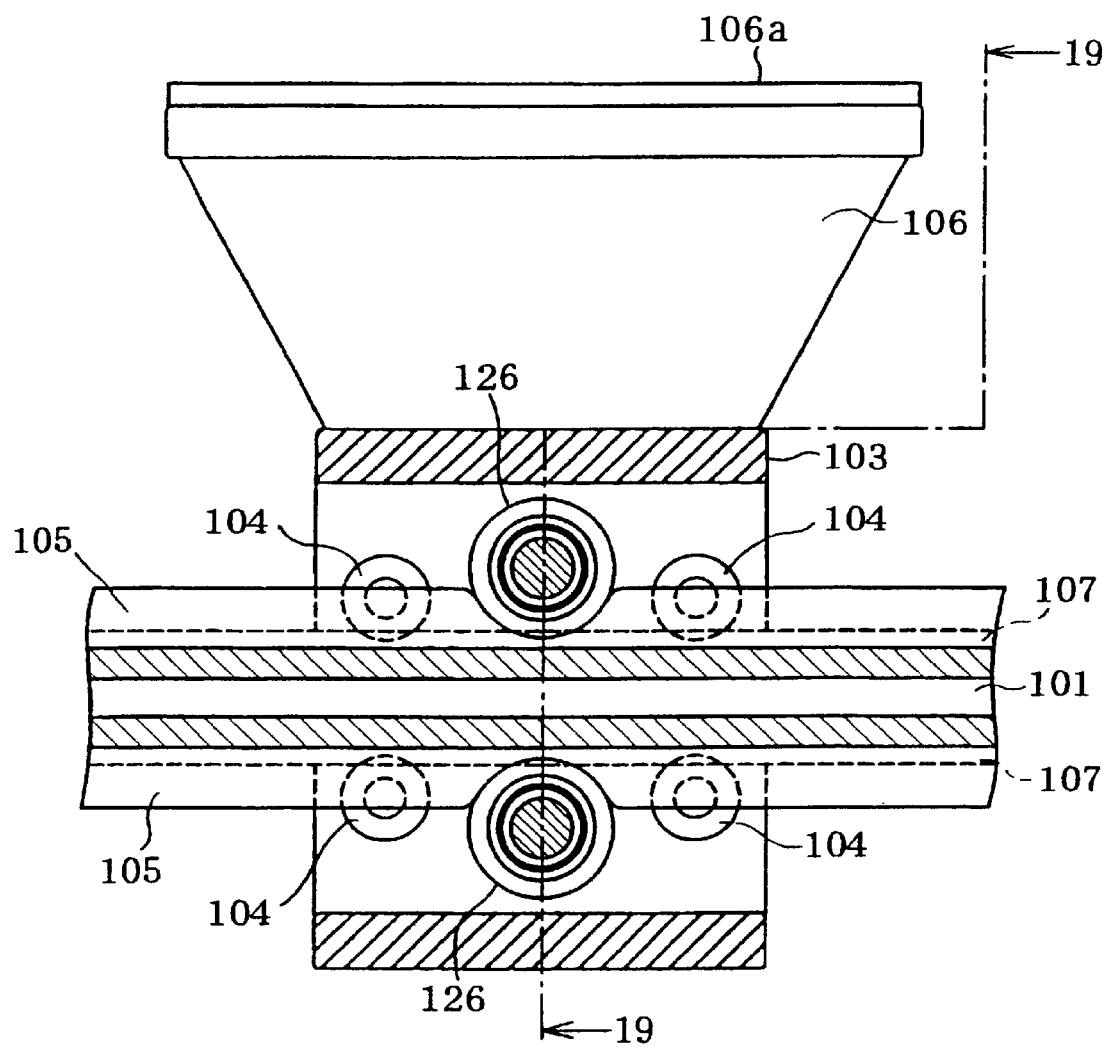
FIG. 18 is a cross-sectional view of a transport system of the ninth embodiment of the present invention taken along a line 18—18 of FIG. 19.
Figure 19:
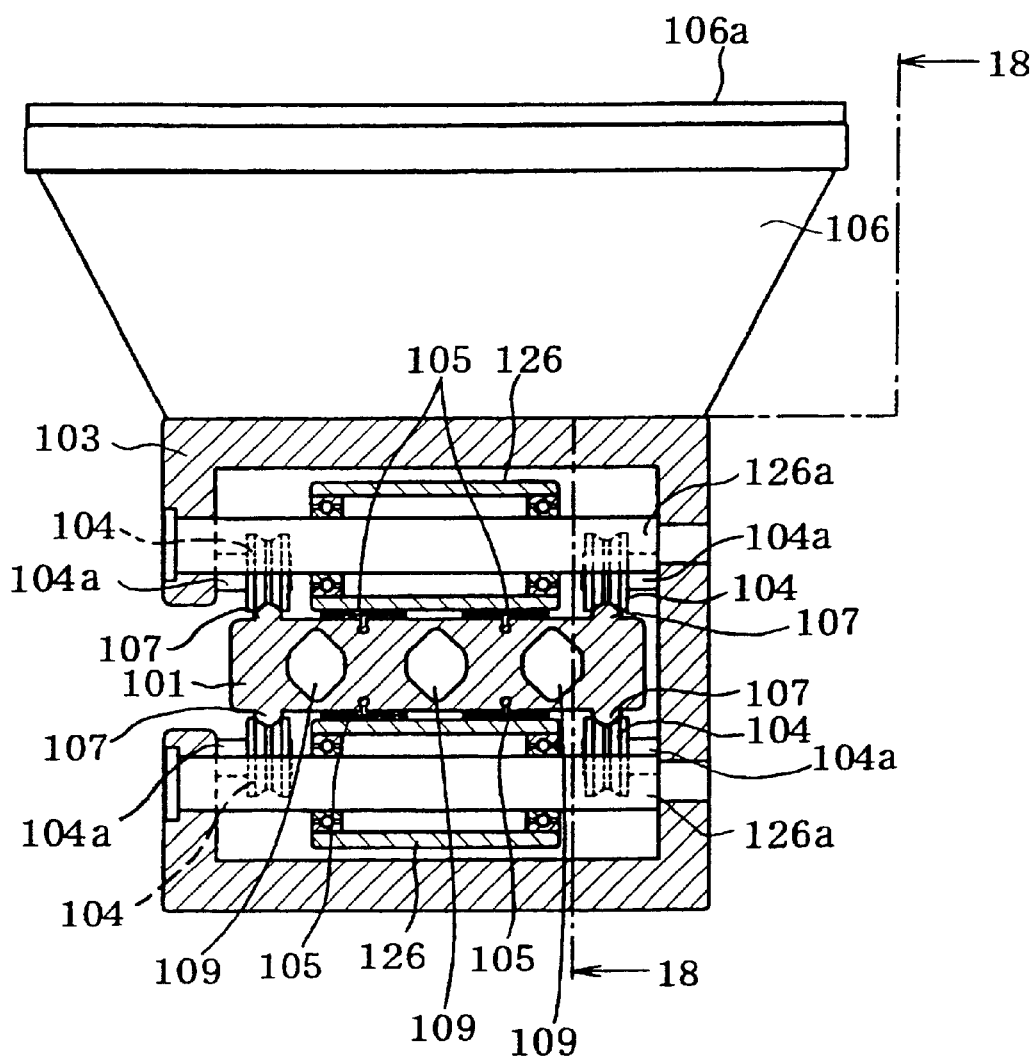
FIG. 19 is across-sectional view of the transport system shown in FIG. 18 taken along a line 19—19 of FIG. 18.

Subsequently, the ninth embodiment of the present invention is explained in conjunction with FIG. 18 and FIG. 19. FIG. 18 is a cross-sectional view taken along a line 18—18 of FIG. 19 showing the state that a transport body and a container are mounted on a traveling rail. FIG. 19 is a cross-sectional view of a transport system shown in FIG. 18 taken along a line 19—19 of FIG. 18.

In the eighth embodiment, two drive tubes 105 are mounted on each of main wall surfaces (wall surfaces extending horizontally in a horizontal transport) 101a, 101b of the traveling rail 101 along the longitudinal direction of the traveling rail 101 and two drive wheels 102 are also mounted on each main wall surface 101a, 101b of the traveling rail 101 so as to depress these drive tubes 105. To the contrary, in the ninth embodiment, two drive tubes 105 are mounted on each of main wall surfaces 101a, 101b of the traveling rail 101 along the longitudinal direction of the traveling rail 101 and one longitudinally elongated drive wheel 126 is mounted on each main wall surface 101a, 101b of the traveling rail 101 so as to depress these drive tubes 105.

Although two drive tubes 105 are mounted on each main wall surface 101a, 101b of the traveling rail 101 in this embodiment, the number of drive tubes 105 may be increased to three or four depending on the weight of a material to be transported.

Figure 20:
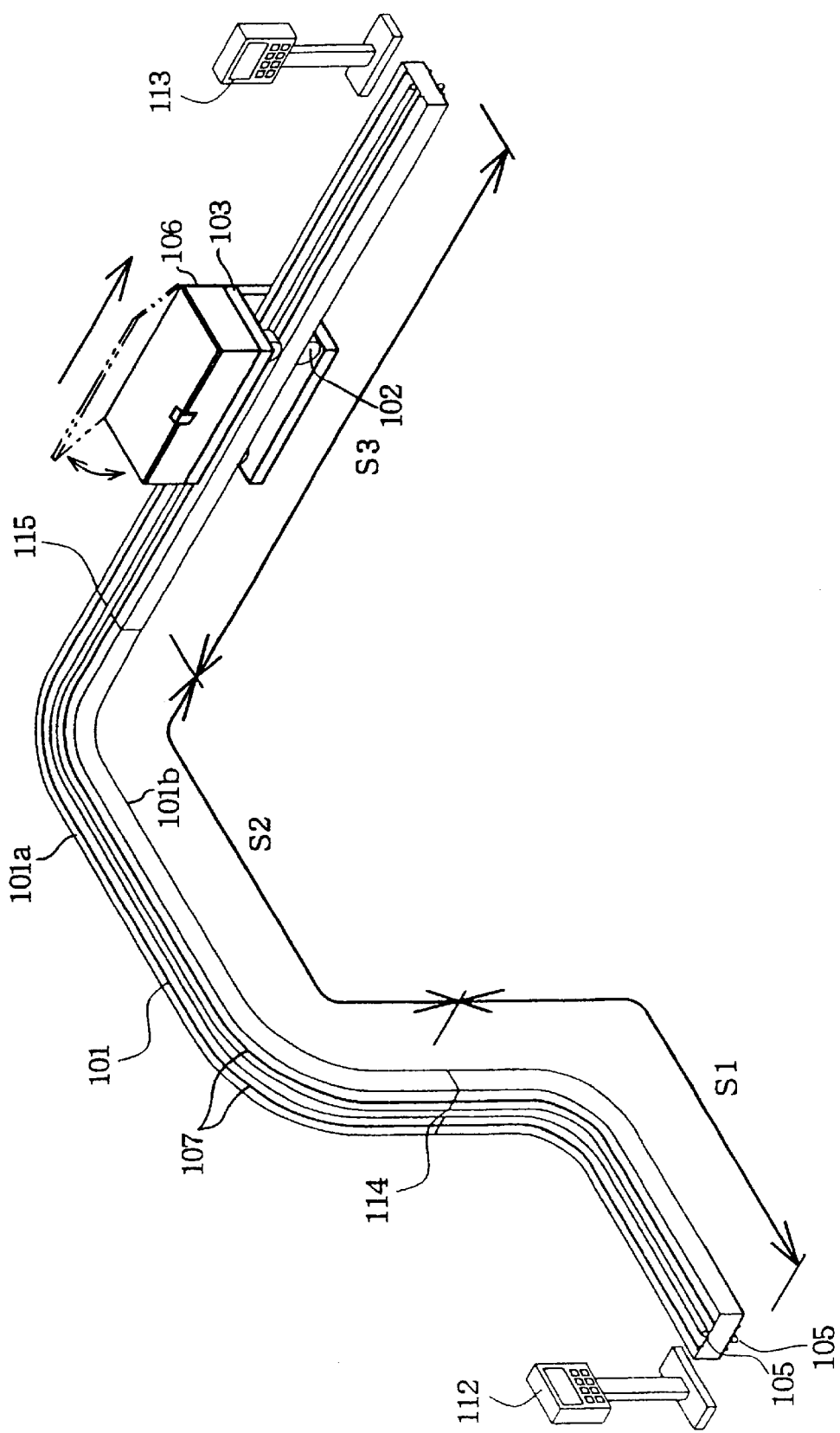
FIG. 20 is a perspective view showing the tenth embodiment of the present invention showing a traveling rail as a transport route in a stereoscopic manner.

Subsequently, the tenth embodiment of the present invention is explained in conjunction with FIG. 20. FIG. 20 is a schematic perspective view of a transport system showing the state in which a plurality of traveling rails are contiguously connected in a three-dimensionally manner. Here, the traveling rails 101 are respectively mounted in a first section S1, a second section S2 and a third section S3 of the transport route and transfer portions 114, 115 are mounted in discontinued portions between the sections. Further, a transport system is constituted such that a transport body 103 is transported from a delivery station 112 to a destination station 113 through the traveling rail 101 of the first to third sections S1–S3 sequentially. In this embodiment, the drive tubes 105 continuously extend over the entire sections of the traveling rail 101.

Figure 21:
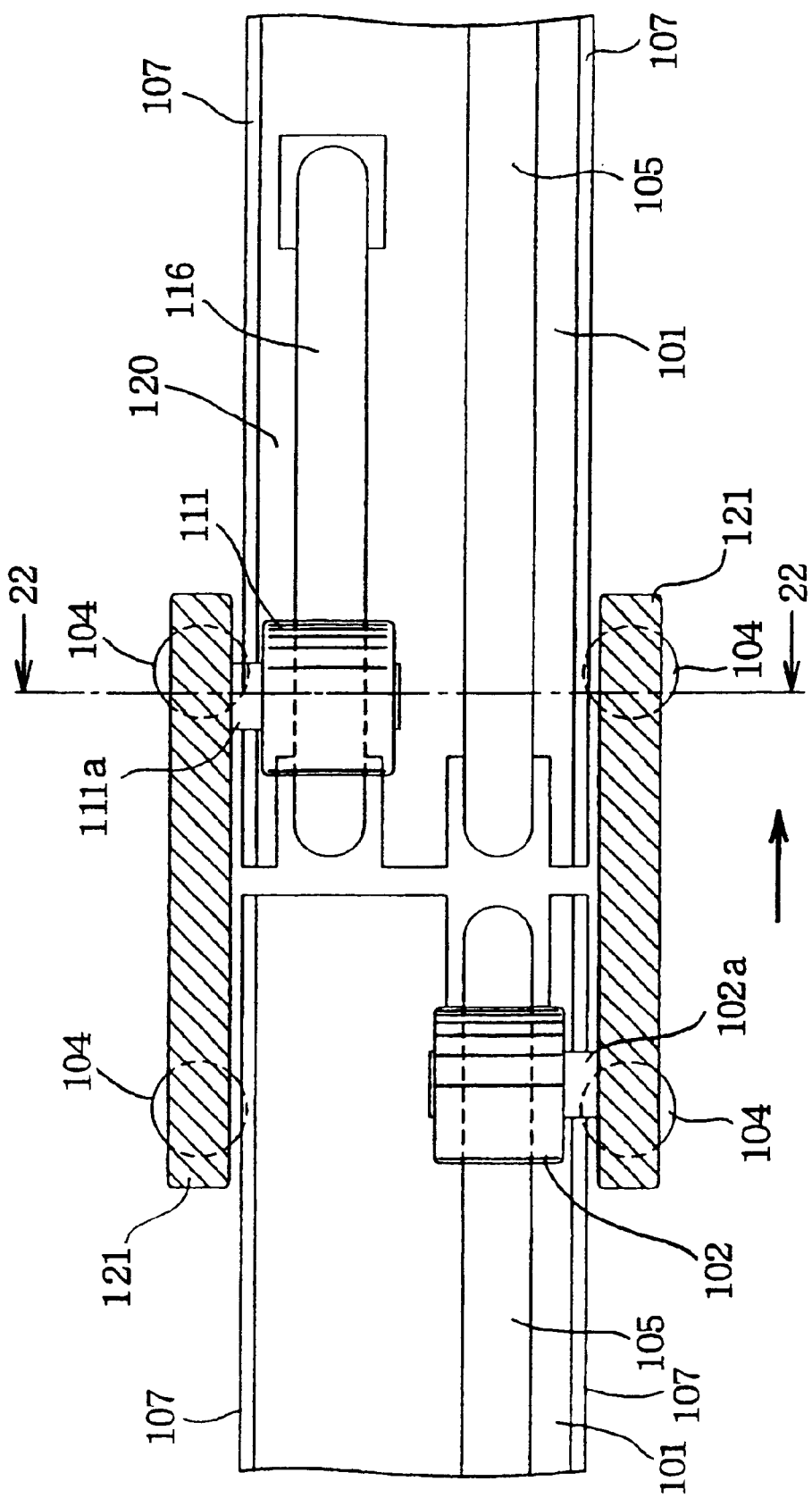
FIG. 21 is a plan view with a part broken away showing the eleventh embodiment of the present invention having a transfer mechanism.
Figure 22:
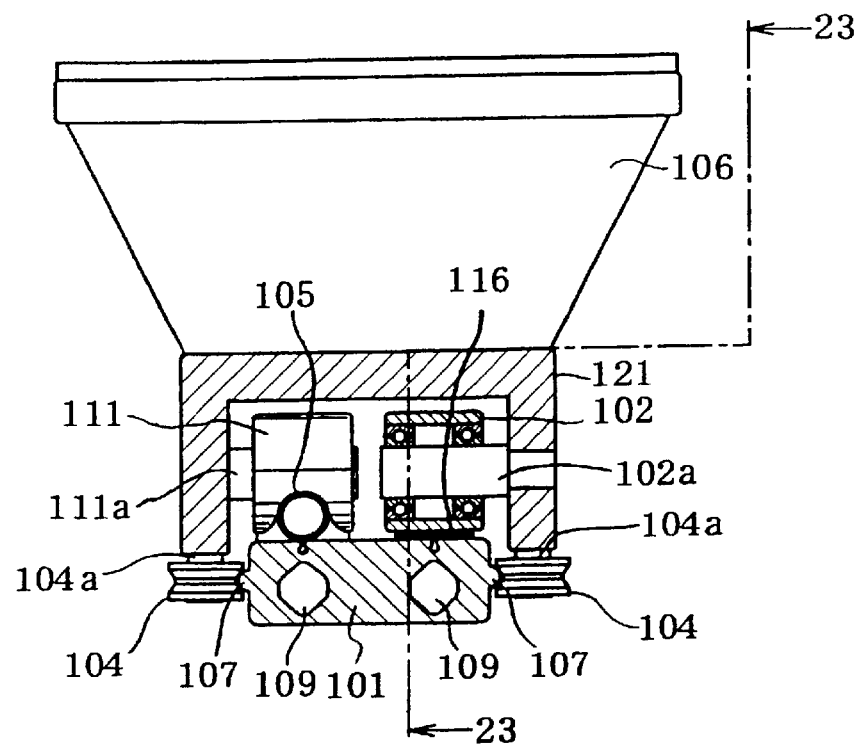
FIG. 22 is a cross-sectional view of a transport system shown in FIG. 21 taken along a line 22—22 of FIG. 21.
Figure 23:
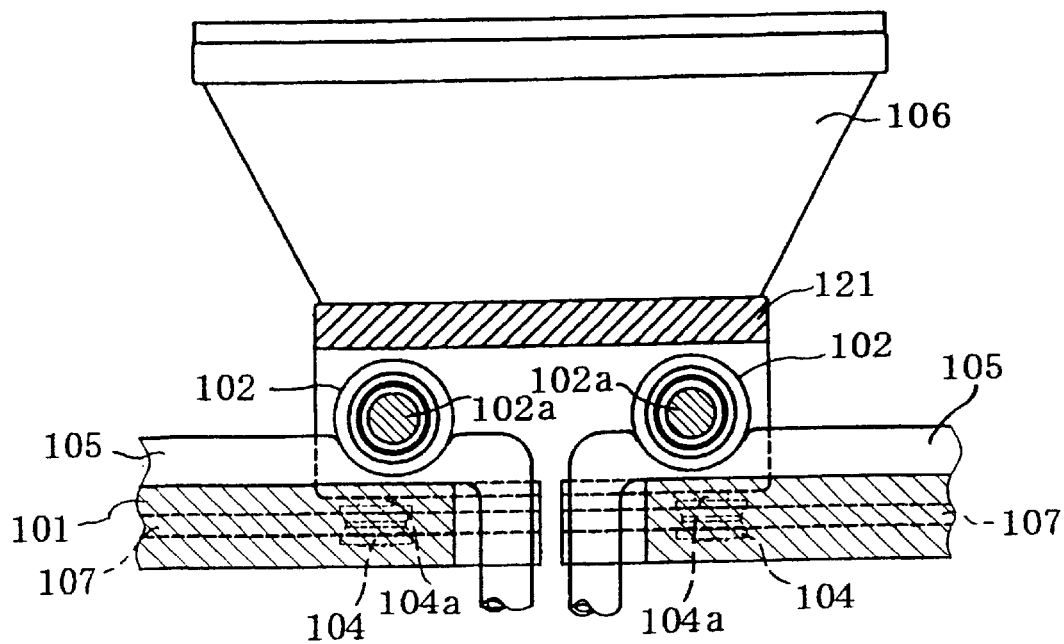
FIG. 23 is a cross-sectional view of the transport system shown in FIG. 21 taken along a line 23—23 of FIG. 22.

Subsequently, the eleventh embodiment of the present invention is explained in conjunction with FIG. 21 to FIG. 23. FIG. 21 is a plan view of a transfer mechanism for transferring a transport body between traveling rails, FIG. 22 is a cross-sectional view taken along a line 22—22 of FIG. 21 showing the transport system, and FIG. 23 is a cross-sectional view of the transport system shown in FIG. 22 taken along a line 21—21 of FIG. 22.

In the eleventh embodiment, as in the case of the tenth embodiment, a plurality of traveling rails 101 are arranged in first to third sections S1–S3 of a transport route and they are connected contiguously. The transfer mechanism includes a transfer rail 120 which is mounted on a traveling rail 101 of a second section S2, drive tubes 105 mounted on the traveling rail 101 of first and second sections S1,S2, transfer tubes 116 mounted on the transfer rail 120, traveling wheels 104 arranged such that they are engaged with convex portions 107 of the traveling rail 101 of the first and second sections S1, S2, drive wheels 102 arranged such that they depress the drive tubes 105, transfer drive wheels 111 which are arranged such that they depress the transfer tubes 116, a transport body 121 connected to the drive wheels 102, 111 and the traveling wheels 104, a container 106 mounted on the transport body 121 for accommodating a material to be transported, and an air source not shown in the drawing for supplying air of a given pressure to the drive tubes 105 and the transfer tubes 116.

The transfer tubes 116 are flexible tubes which are mounted on the transfer rail 120 and have a hollow circular cross-section which is identical with that of the drive tubes 105. The transfer tubes 116 are provided for giving power to transfer drive wheels 111 based on the same principle as that of the drive tubes 105. That is, due to the pressure of air supplied to the inside of the transfer tubes 116, the transfer drive wheels 111 are rotated and travel on the transfer tubes 116.

The traveling wheels 104 are mounted such that they are engaged with convex portions 107 formed on the main wall surfaces 101*a*, 101*b* of the traveling rail 101. Due to such traveling wheels 104, the transport body 121 is capable of moving on the traveling rail 101. Further, since the transport body 121 and the container 106 are supported by the traveling wheels 104, the weight of the material to be transported is supported by these portions.

Then, the transferring operation is explained in conjunction with FIG. 21.

When the drive wheels 102 obtain the power from the drive tubes 105 on the traveling rail 101 in the first section S1, the transport body 121 starts to move in the right direction. When the drive wheels 102 of the transport body 121 are about to reach the joining portion between the traveling rail 101 of the first section S1 and the traveling rail 101 of the second section S2, since the drive tubes 105 on the main wall surfaces 101*a*, 101*b* of the traveling rail 101 in the first section S1 and the drive tubes 105 on the main wall surfaces 101*a*, 101*b* of the traveling rail 101 in the second section S2 are spaced apart from each other, the drive wheel 102 cannot obtain the power for transferring between both drive tubes 105, 105. However, when the transport body 121 starts to move on the transfer rail 120, first of all, the transfer drive wheels 111 reach the transfer tube 116 and can obtain the power from these transfer tubes 116. Accordingly, during the period that the drive wheels 102 are positioned away from the drive tubes 105, 105, the transfer body 121 can be moved by the transfer drive wheels 111 which obtain the power from the transfer tubes 116 and hence, the transport body 121 can be transferred onto the main wall surfaces 101*a*, 101*b* of the traveling rail 101 in the second section S2 without hindrance. Subsequently, after the drive wheels 102 are transferred onto the drive tubes 105, the drive wheels 102 receive the power from the drive tubes 105 so that the drive wheels 102 can move on the traveling rail 101 in the second section S2.

Figure 24:
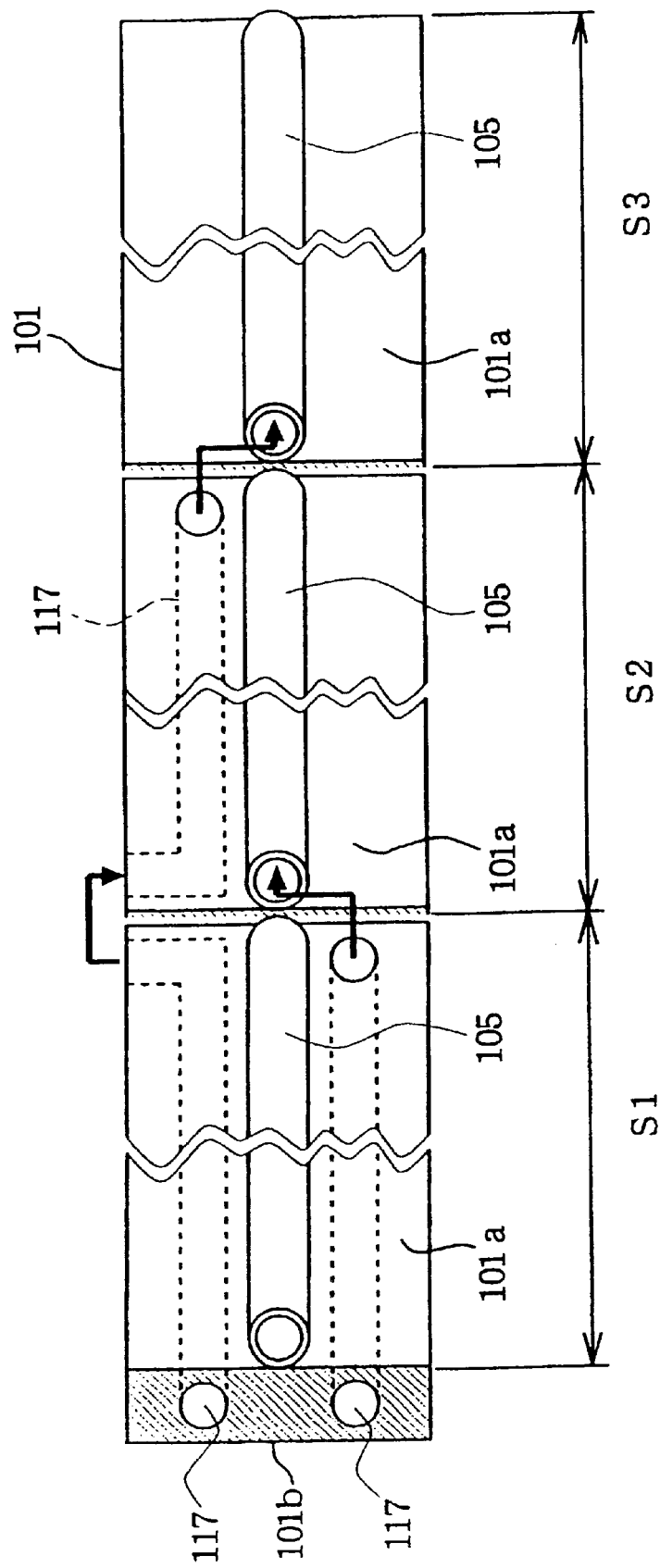
FIG. 24 is a schematic view showing an air supply system of a transport system according to the twelfth embodiment of the present invention.

Then, the twelfth embodiment of the present invention is explained in conjunction with FIG. 24. FIG. 24 is a schematic view showing an air supply system formed in a traveling rail. In the case that the transport route is elongated and a plurality of traveling rails 101 are connected, this twelfth embodiment supplies air to be supplied to drive tubes 105 on each traveling rail 101 from a hollow passage 117 in other traveling rail 101.

Two airtight hollow passages 117 are formed in the traveling rail 101 in the first section S1. Pressurized air is supplied to left ends of these hollow passages 117 from a pressurized air supply device. One hollow passage 117 has a right end thereof connected with the drive tube 105 on the traveling rail 101 in the second section S2 and the other hollow passage 117 has a right end thereof connected with the hollow passage 117 of the traveling rail 101 in the second section 2S. The bore diameter of the hollow passage 117 is determined based on the length of the traveling rail 101, the air pressure, the power necessary for driving drive wheels and the like. Further, the number of hollow passages 117 can be selected in response to the number of the traveling rails 101 and the like.

Pressurized air is directly supplied to the drive tubes 105 on the traveling rail 101 of the first section S1 from the pressurized air supply device. On the other hand, a right end of the hollow passage 117 of the traveling rail 101 in the second section S2 is connected with the drive tubes 105 on the traveling rail 101 in the third section 3S. As a method for supplying pressurized air into both ends or one end of each drive tube 105, a constitutional example shown in FIG. 11A or the constitution which has been described as a modification of the constitution of FIG. 11B can be adopted, for example.

Due to the air supply system having such constitutions, it is unnecessary to separately install air supply pipes on the traveling rail 101. Further, although not shown in the drawing, pressurized air can be supplied to the transfer drive tubes 116 through the hollow passages 117 formed in the insides of the traveling rails 101.

Figure 25:
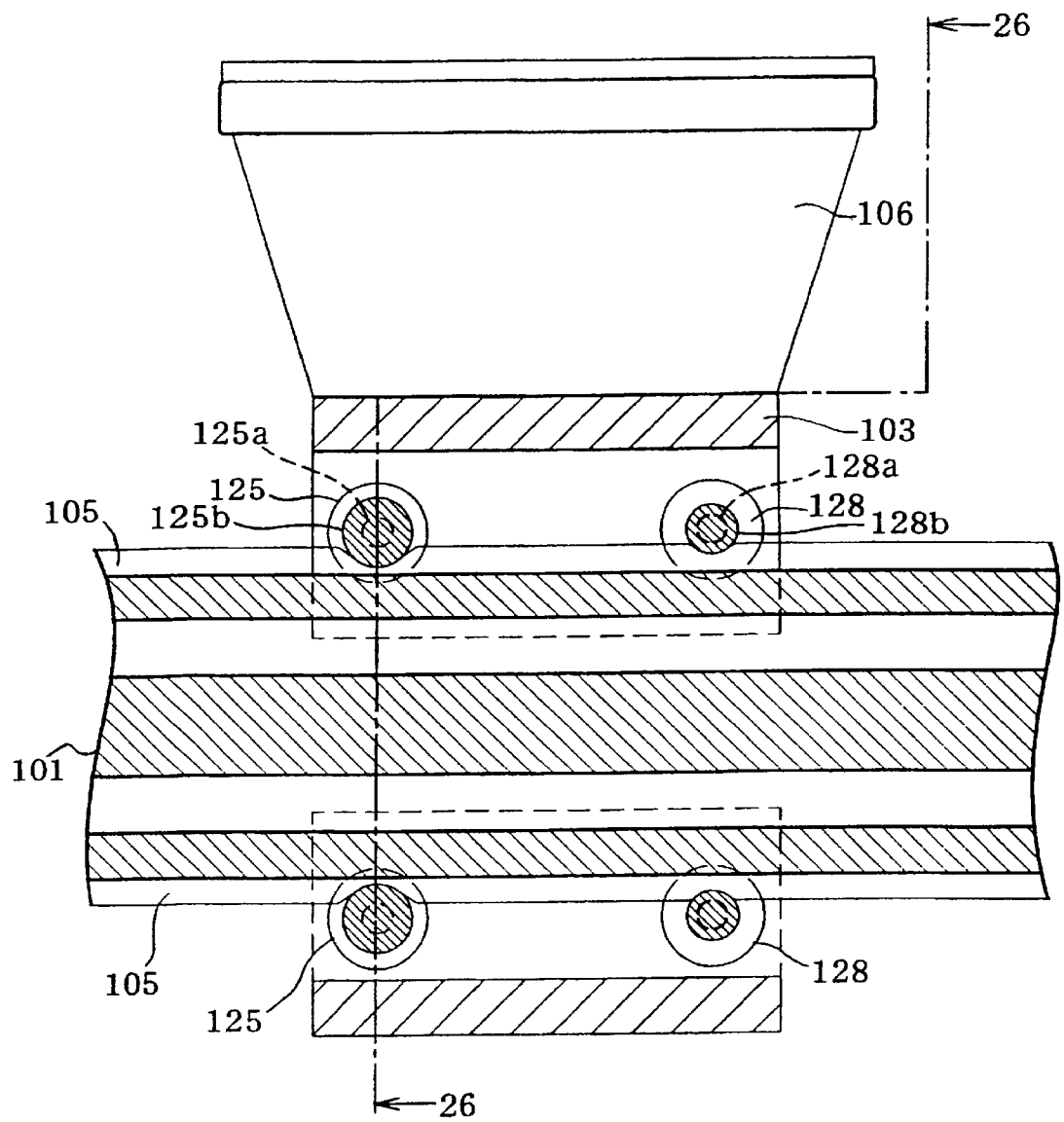
FIG. 25 is a cross-sectional view of a transport system of the thirteenth embodiment of the present invention taken along a line 25—25 of FIG. 26.

Subsequently, the thirteenth embodiment of the present invention is explained in conjunction with FIG. 25 and FIG. 26. FIG. 25 is a cross-sectional view taken along a line 25—25 of FIG. 26 showing the state that a transport body to which drive wheels having also a traveling guide function are connected and a container are mounted on the traveling rail, while FIG. 26 is a cross-sectional view of a transport system shown in FIG. 25 taken along a line 26—26 of FIG. 25.

Figure 26:
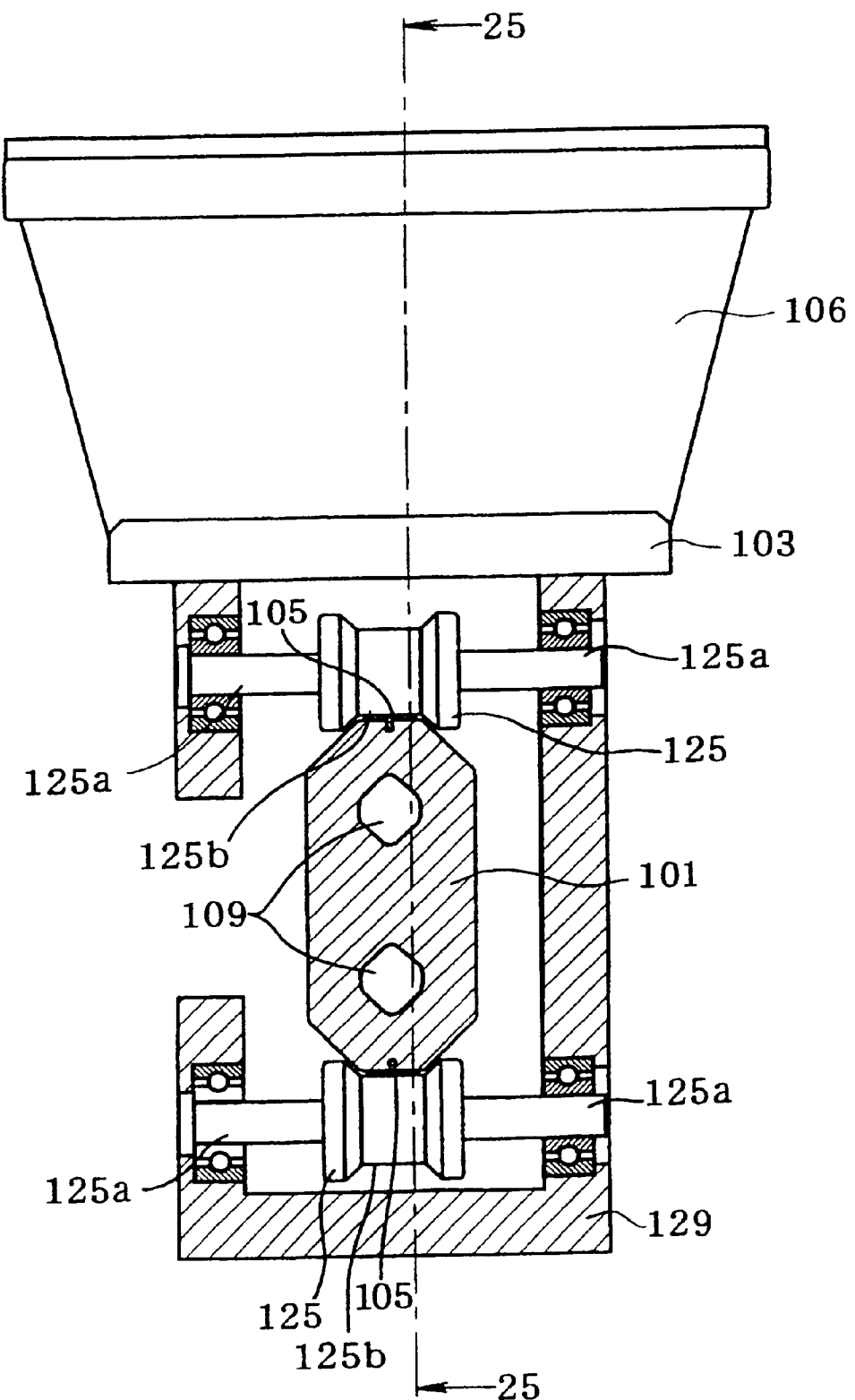
FIG. 26 is a cross-sectional view of the transport system shown in FIG. 25 taken along a line 26—26 of FIG. 25.

In FIG. 25 and FIG. 26, a traveling rail 101 is installed in a hospital, a tower building, a warehouse, a plant or the like and forms a transport route. On upper and lower main wall surfaces 101*a*, 101*b* of the traveling rail 101, convex surface portions having an approximately trapezoidal shape are respectively formed and one drive tube 105 is mounted on each convex surface portion along the longitudinal direction of the traveling rail 101. Then, corresponding to the upper and lower main wall surfaces 101*a*, 101*b* of the traveling rail 101, drive wheels 125 which are engaged with the convex surface portions formed on the main wall surfaces 101*a*, 101*b* of the traveling rail 101 are rotatably mounted on a transport body 103 such that one drive wheel is provided to each convex surface portion. Each drive wheel 125 has a hand-drum shape so as to depress the drive tube 105 on the convex surface portion and is provided with a recessed portion 125*b* on an outer periphery thereof.

The drive wheels 125 have tapered portions of the recessed portions 125*b* come into contact with tapered portions of the convex surface portions of the traveling rail 101 so as to travel while being guided. Traveling wheels 128 have the similar shape as the drive wheels 125. A recessed portion 128*b* of one traveling wheel 128 is engaged with the convex surface portion formed on each upper and lower main wall surface 101*a*, 101*b* of the traveling rail 101. The depth dimension of the recessed portions 128*b* of the traveling wheels 128 is increased to a level that the traveling wheels 128 do not depress the drive tubes 105 or do not affect the traveling of a transport body 103. Shaft bodies 125a of the drive wheels 125 and shaft bodies 128a of the travel wheels 128 are pivotally mounted on a frame 129 of the transport body 103 by means of bearings. A container 106 which accommodates a material to be transported is fixedly secured onto the transport body 103. Accordingly, the transport body 103 is supported by the shaft bodies 125a of the drive wheel 125 and the shaft bodies 128a of the traveling wheels 128 by way of a frame 129 so that the weight of the material to be transported is also supported at portions of these drive wheels 125 and the traveling wheel 128.

The traveling rail 101 has the vertically elongated rectangular cross section and has convex surface portions on the main wall surfaces (wall surfaces extending horizontally in a horizontal transport) 101a, 101b and is formed of aluminum or the like by a die casting.

Figure 27:
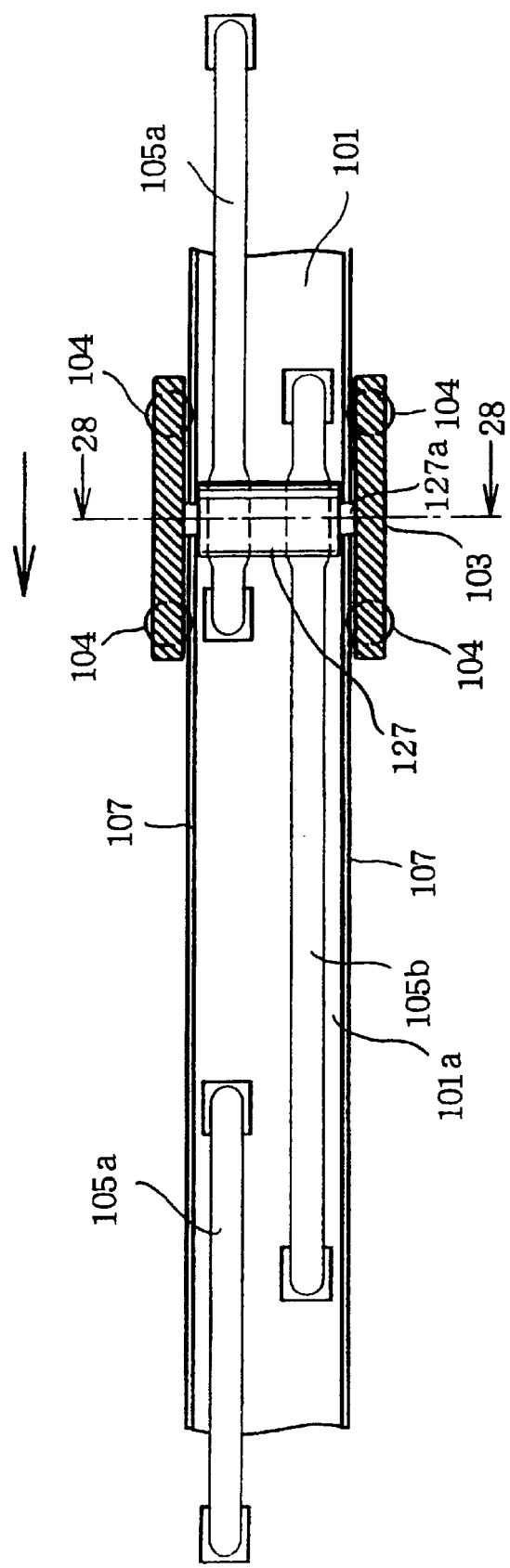
FIG. 27 is a plan view with a part in cross section of a transport system according to the fourteenth embodiment of the present invention showing the relationship among a traveling rail, a transport body and a container.
Figure 28:
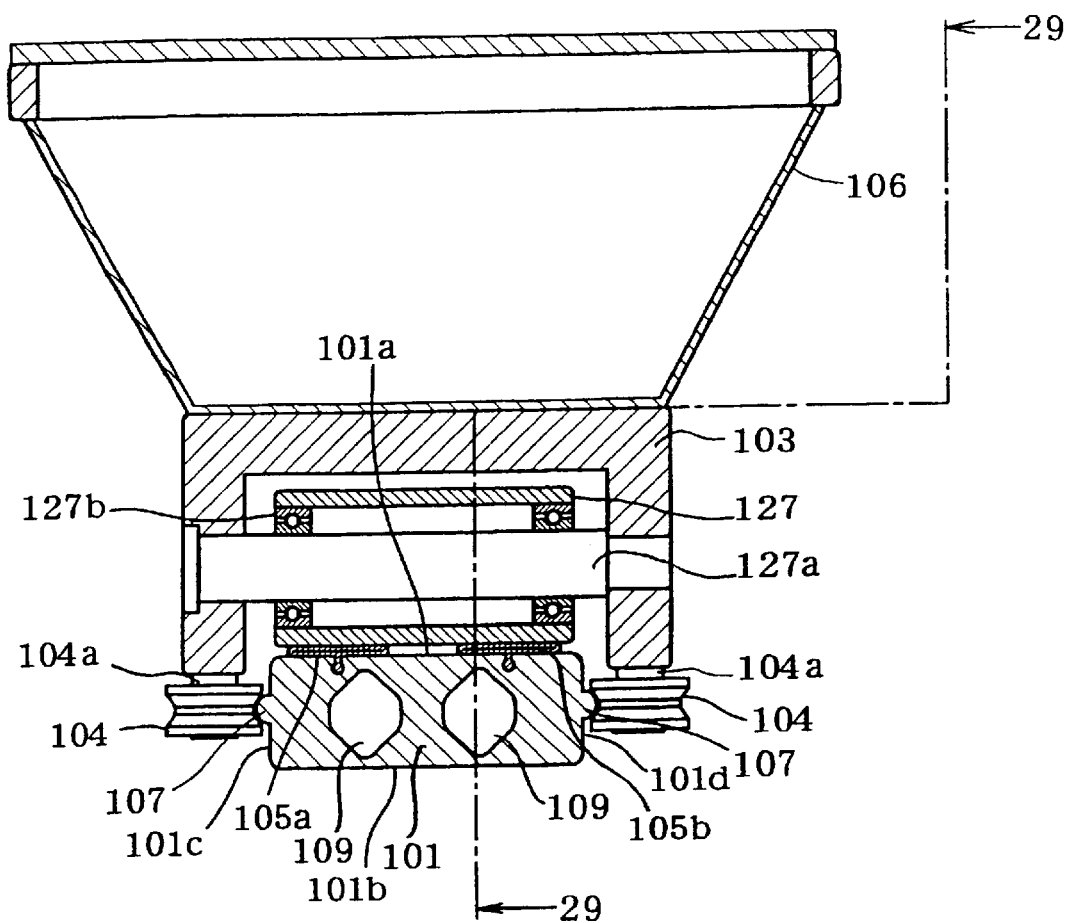
FIG. 28 is a cross-sectional view of the transport system shown in FIG. 27 taken along a line 28—28 of FIG. 27.
Figure 29:
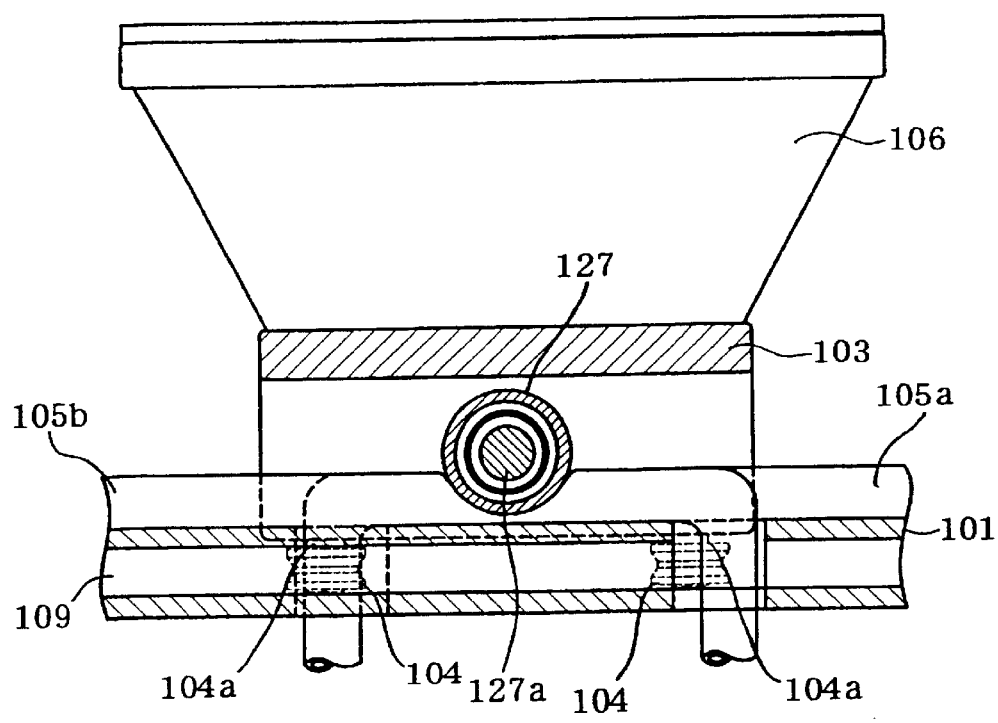
FIG. 29 is across-sectional view of the transport system shown in FIG. 27 taken along a line 29—29 of FIG. 28.

The fourteenth embodiment of the present invention is explained in conjunction with FIG. 27 to FIG. 29. FIG. 27 is a plan view with a part in cross section of a transport system which alternatively arranges drive tubes on a traveling rail in a staggered manner. FIG. 28 is a cross-sectional view of the transport system shown in FIG. 27 taken along a line 28—28 of FIG. 27. FIG. 29 is a cross-sectional view of the transport system shown in FIG. 27 taken along a line 29—29 of FIG. 28.

In the fourteenth embodiment, the drive tubes 105a, 105b are alternately mounted on an upper surface 101a which constitutes a main surface wall (horizontally extending wall surfaces in a horizontal transport) of a traveling rail 101 at left and right with transfer margins. Elongated drive wheels 127 are arranged on the traveling rail 101 such that the drive wheels 127 depress the drive tubes 105a, 105b. The drive wheels 127 are rotatably mounted on shaft bodies 127a fixedly secured to a transport body 103 by way of bearings 127b.

FIG. 27 shows the state that the drive wheels 2 obtain power from the drive tubes 105a on the traveling rail 101 and are rotated and moved together with the transport body 103 in the left direction in the drawing. When the elongated drive wheel 127 of the transport body 103 reaches the transfer margin of the drive tubes 105a, 105b, the drive wheels 127 receive the power from both of the drive tubes 105a, 105b. The transport body 103 is moved continuously in the left direction and thereafter the drive wheels 127 which have passed the transfer margin obtain the power only from the drive tube 105b and are continuously moved in the left direction while being rotated.

In the above-mentioned fourteenth embodiment, although a plurality of drive tubes 105a, 105b are alternately mounted in a staggered manner only on the upper surface 101a of the traveling rail 101, the drive tubes 105a, 105b may be alternately mounted in a staggered manner only on a lower surface 101b of the traveling rail 101. Further, the drive tubes 105a, 105b maybe alternately mounted on the upper surface 101a and the lower surface 101b of the traveling rail 101 in sequence. Further, in the fourteenth embodiment, although convex portions 107 are formed on side surfaces 101c, 101d of the traveling rail 101 and hand-drum shaped traveling wheels 104 which travel while being engaged with these convex portions 107 are mounted on the transport body 103, the convex portions 107 maybe formed on the main wall surfaces 101a of the traveling rail 101.

Figure 30:
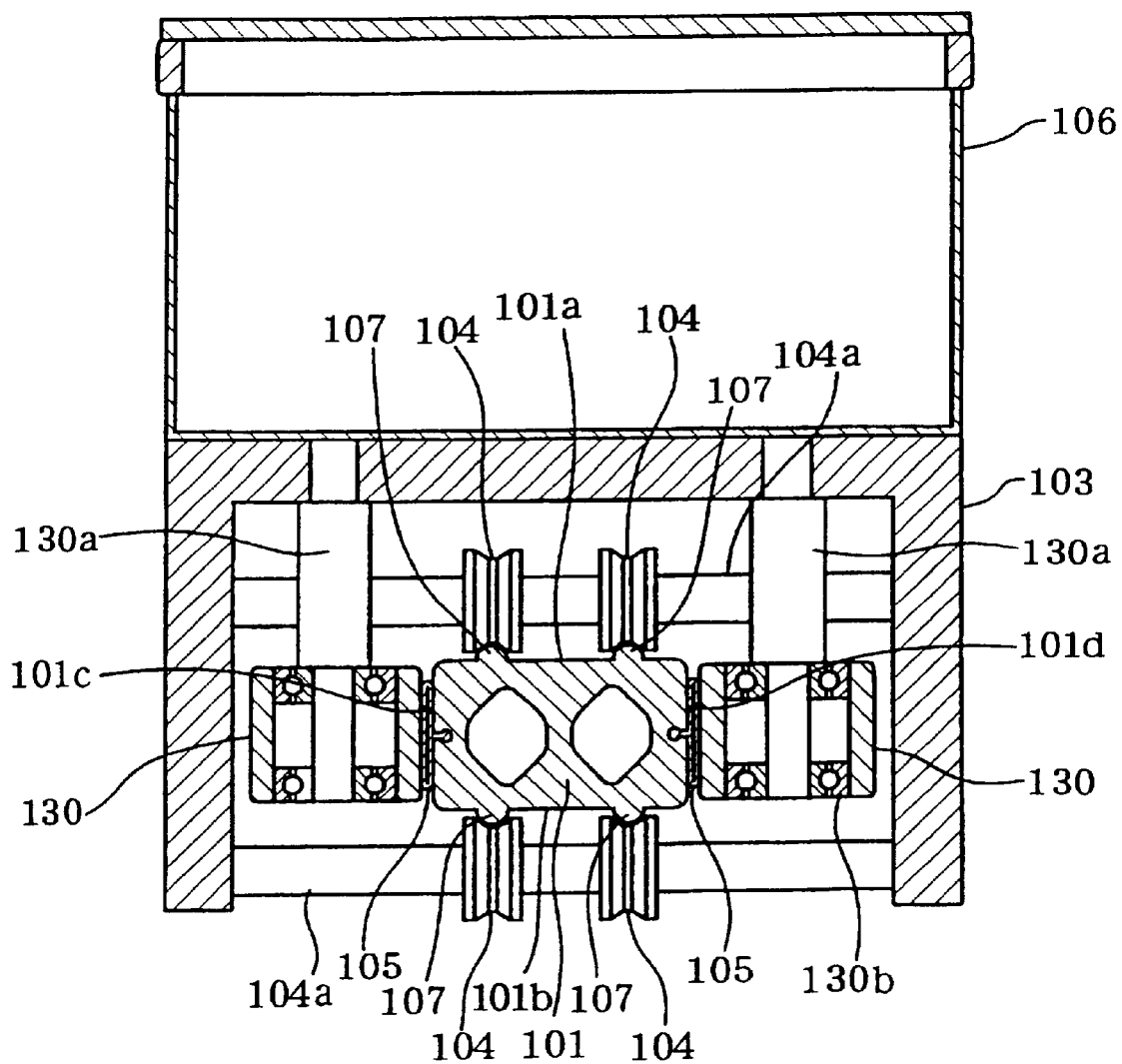
FIG. 30 is a longitudinal cross-sectional view of a transport system of the fifteenth embodiment of the present invention.

FIG. 30 is a longitudinal cross-sectional view of a transport system showing the fifteenth embodiment of the present invention. A traveling rail 101 of the fifteenth embodiment is shown in the state that a transport body 103 is transported horizontally. In this horizontal transport state, the traveling rail 101 has an upper surface 101a and a lower surface 101b which constitute main wall surfaces extending horizontally and side surfaces 101c, 101d. In this embodiment, two drive tubes 105 are mounted on the side surfaces 101c, 101d of the traveling rail 101. On both sides of the traveling rail 101, two drive wheels 130 are respectively arranged such that they depress the drive tubes 105. Each drive wheel 130 is rotatably mounted on a shaft body 130a fixedly secured to the transport body 103 by way of a bearing 130b. Convex portions 107 are formed on the upper surface 101a and the lower surface 101b which constitute the main wall surfaces of the traveling rail 101. Traveling wheels 104 which are rotatably mounted on the transport body 103 by way of shaft bodies 104a are respectively arranged above and below the traveling rail 101 and are engaged with the convex portions 107.

Also, in the transport system of this fifteenth embodiment, the drive wheels 130 can be moved on the traveling rail 101 while being rotated due to the pressure of a pressurized fluid (for example, pressurized air) supplied to the drive tubes 105 and hence, the transport body 103 and a container 106 fixedly secured to the transport body 103 can be moved.

FIG. 31 to FIG. 34 respectively show modifications of the drive-tube depressing structure of the transport system of the present invention. In any one of the modifications, a traveling rail 101 and drive wheels 2 are formed such that bent end portions of the drive tube are respectively pushed out from both sides of the depressed section of the drive tube due to the drive wheel.

Figure 31:
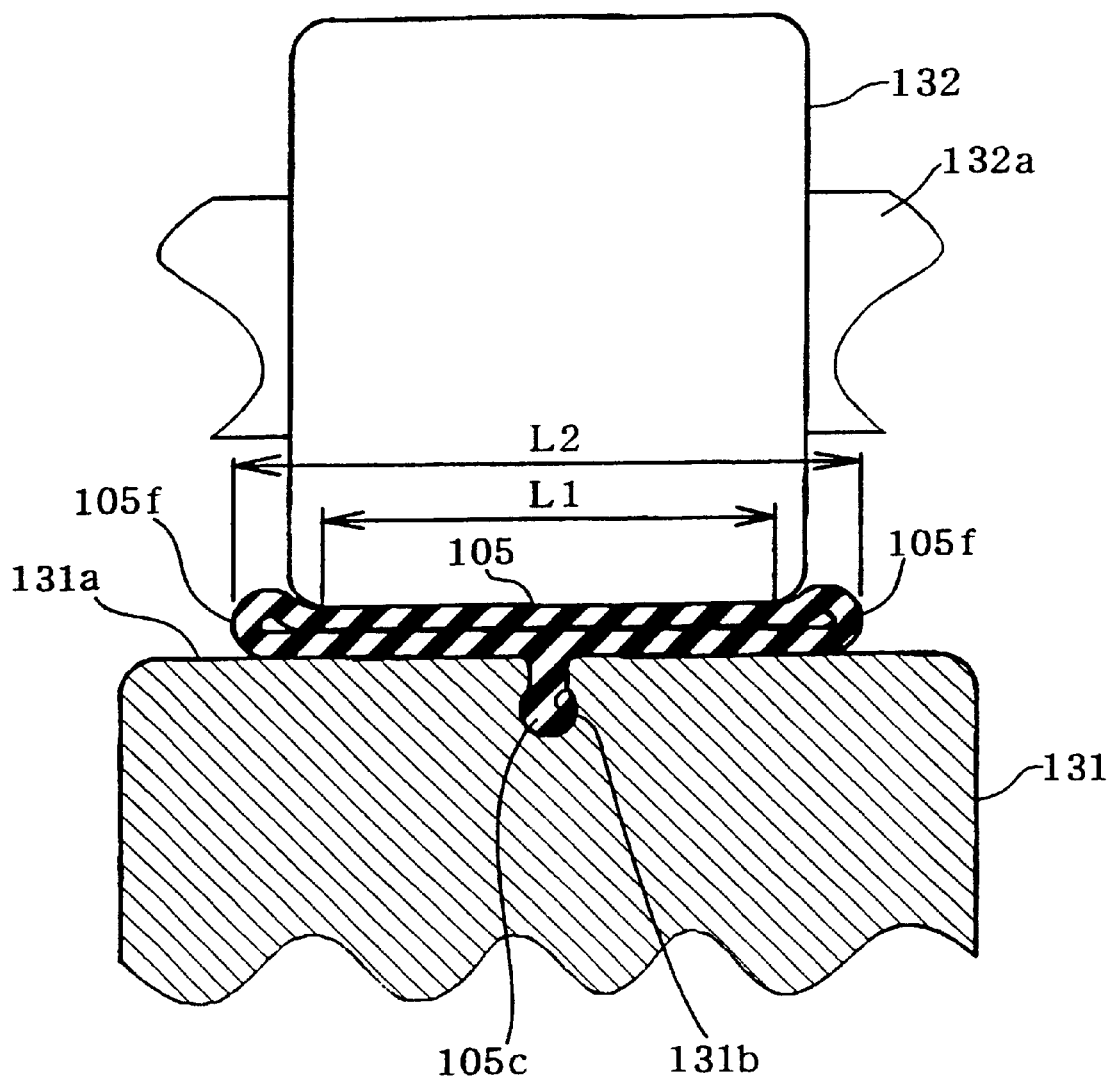
FIG. 31 is a cross-sectional view of an essential part showing a modification of a drive tube depressing structure according to the transfer system of the present invention.

To explain in more detail, in the modification shown in FIG. 31, a drive tube 105 having a flexibility is arranged along the longitudinal direction of a traveling rail 131. In a wall surface 131a of the traveling rail 131, a concave groove 131b which extends in the longitudinal direction is formed. The drive tube 105 is provided with a convex ridge portion 105c which is fitted into this concave groove 131b. By fitting the convex ridge portion 105c into the concave groove 131b, the drive tube 105 can be mounted on the wall surface of the traveling rail 131. A drive wheel 132 is rotatably mounted on a transport body not shown in the drawing by way of a shaft body 132a such that the drive wheel 132 depresses the drive tube 105. An outer periphery of the drive wheel 132 is formed in a cylindrical shape and corner portions at both ends thereof are rounded. The length L1 of a cylindrical portion of the drive wheel 132 is set to a dimension which is shorter than the length L2 of the drive tube 105 at the time the drive tube 105 is depressed by the drive wheel 132. Accordingly, the drive tube 105 is depressed over a section of the approximate length L1 by the cylindrical portion of the drive wheel 132. Then, at both sides of the depressed section of the drive tube 105 by the drive wheel 132, bent end portions 105f of the drive tube 105 are formed such that they are pushed out. In this manner, since it becomes possible to prevent the bent end portions 105f of the drive tube 105 from being depressed by the drive wheel 132 and the traveling rail 131, the durability of the drive tube 105 can be enhanced.

Figure 32:
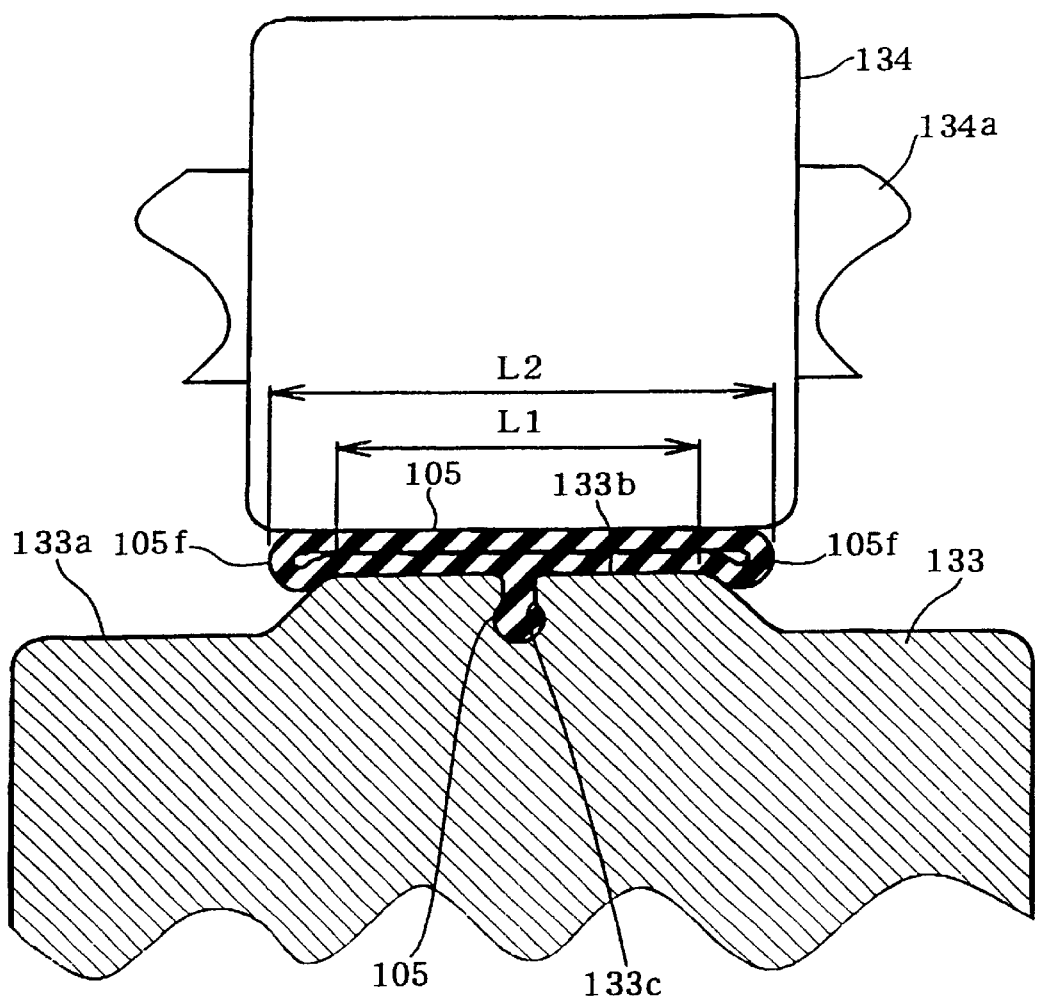
FIG. 32 is a cross-sectional view of an essential part showing another modification of a drive tube depressing structure according to the transfer system of the present invention.

In the modification shown in FIG. 32, a drive tube 105 having a flexibility is arranged along the longitudinal direction of a traveling rail 133. On a wall surface 133a of the traveling rail 133, a convex portion 133b having an approximately trapezoidal cross section which extends in the longitudinal direction of the traveling rail 133 is formed. On a top surface of this convex portion 133b, a concave groove 133c is formed. The drive tube 105 is provided with a convex ridge portion 105c which is fitted into this concave groove 133c. By fitting the convex ridge portion 105c into the concave groove 133c, the drive tube 105 can be mounted on the traveling rail 133. A drive wheel 134 is rotatably mounted on a transport body not shown in the drawing by way of a shaft body 132a such that the drive wheel 134 depresses the drive tube 105. An outer periphery of the drive wheel 134 is formed in a cylindrical shape and the length L1 of the top surface of the convex portion 133b of the traveling rail 133 is set to a dimension which is shorter than the length L2 of the drive tube 105 at the time the drive tube 105 is depressed by the drive wheel 134. Accordingly, the drive tube 105 is depressed over a section of the approximate length L1 by the drive wheel 134. Then, at both sides of the depressed section of the drive tube 105 by the drive wheel 134, bent end portions 105f of the drive tube 105 are formed such that they are respectively pushed out. In this manner, since it becomes possible to prevent the bent end portions 105f of the drive tube 105 from being depressed by the drive wheel 134 and the traveling rail 133, the durability of the drive tube 105 can be enhanced.

Figure 33:
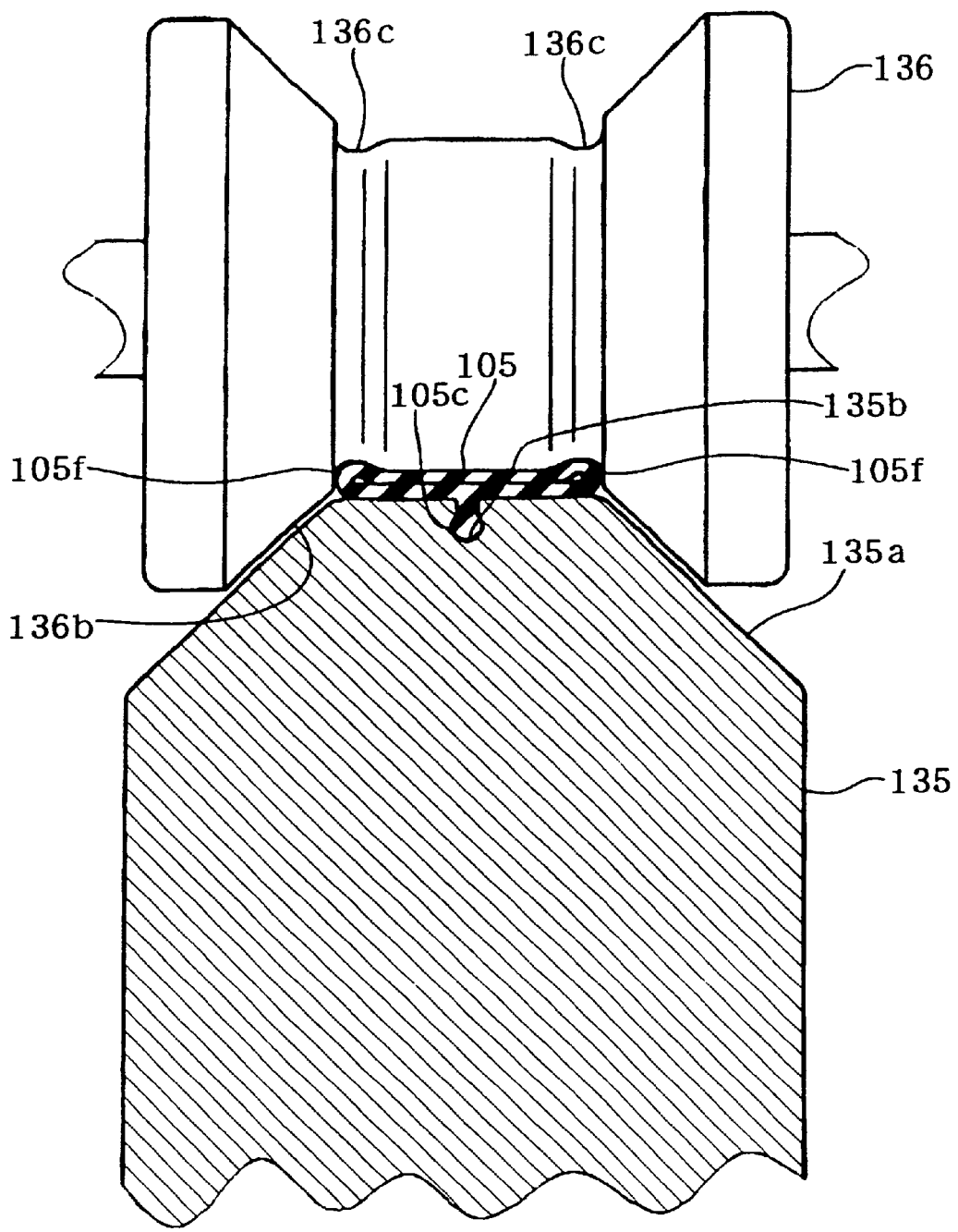
FIG. 33 is a cross-sectional view of an essential part showing still another modification of a drive tube depressing structure according to the transfer system of the present invention.

In the modification shown in FIG. 33, a traveling rail 135 has a convex portion 135a of an approximately trapezoidal cross section. On an outer periphery of a drive wheel 136, a concave portion 136b which is engaged with the convex portion 135a is formed. The drive wheel 136 also works as a traveling wheel which travels while being engaged with the convex portion 135a of the traveling rail 135.

A drive tube 105 having flexibility is disposed on a top surface of the convex portion 135a of the traveling rail 135 along the longitudinal direction of the traveling rail 135. In the top surface of the convex portion 135a, a concave groove 135b is formed, while on a drive tube 105, a convex ridge portion 105c which is fitted into the concave groove 135b is formed. Here, due to the fitting engagement of the convex ridge portion 105c into the concave groove 135b, the drive tube 105 is mounted on the traveling rail 135. Accordingly, the drive tube 105 is depressed between the top surface of the convex portion 135a of the traveling rail 135 and a bottom surface portion of the concave portion 136b of the drive wheel 136.

The length of the bottom surface portion of the concave portion 136b of the drive wheel 136 is set to approximately equal to the length of the top surface of the convex portion 135a and is approximately equal to the length of the drive tube 105 at the time that the drive tube 105 is depressed by the drive wheel 136. However, since annular convex grooves 136c are respectively formed in both ends of the bottom surface portion of the concave portion 136b of the drive wheel 136, bent end portions 105f disposed at both sides of the depressed section of the drive tube 105 are respectively formed such that they are pushed out into the concave grooves 136c formed at both ends of the bottom surface portion of the concave portion 136b of the drive wheel 136. Accordingly, it becomes possible to prevent the bent end portions 105f of the drive tube 105 from being depressed by the drive wheel 136 and the traveling rail 135 and hence, the durability of the drive tube 105 can be enhanced.

Figure 34:
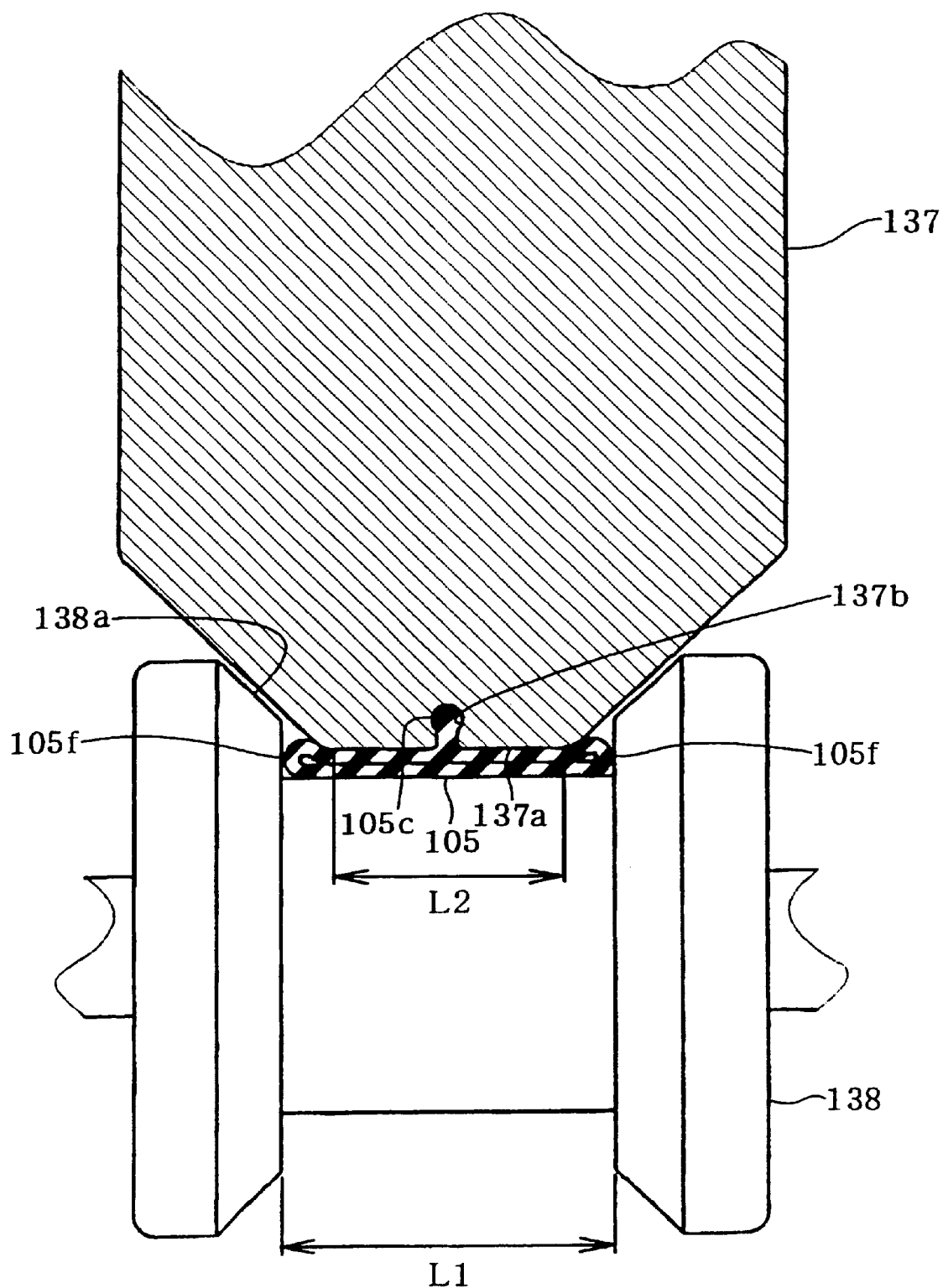
FIG. 34 is a cross-sectional view of an essential part showing still another modification of a drive tube depressing structure according to the transfer system of the present invention.

In the modification shown in FIG. 34, a traveling rail 137 has a convex portion 137a of an approximately trapezoidal cross section. On an outer periphery of a drive wheel 138, a concave portion 138a which is engaged with the convex portion 137a is formed. The drive wheel 138 also works as a traveling wheel which travels while being engaged with the convex portion 137a of the traveling rail 137.

A drive tube 105 having flexibility is disposed on a top surface of the convex portion 137a of the traveling rail 137 along the longitudinal direction of the traveling rail 137. In the top surface of the convex portion 137a, a concave groove 137b is formed, while on a drive tube 105, a convex ridge portion 105c which is fitted into the concave groove 137b is formed. Here, due to the fitting engagement of the convex ridge portion 105c into the concave groove 137b, the drive tube 105 is mounted on the traveling rail 137. Accordingly, the drive tube 105 is depressed between the top surface of the convex portion 137a of the traveling rail 137 and a bottom surface portion of the concave portion 138a of the drive wheel 138.

The length L1 of a bottom surface portion of the concave portion 138a of the drive wheel 138 is set to approximately equal to the length of the drive tube 105 at the time that the drive tube 105 is depressed by the drive wheel .138. However, the length L2 of the top surface of the convex portion 137a of the traveling rail 137 is set to a dimension shorter than the length L1 of the bottom surface portion of the concave portion 138a of the drive wheel 138. Accordingly, bent end portions 105f disposed at both sides of the depressed section of the drive tube 105 are respectively formed such that they are pushed out from both ends of the top surface of the convex portion 137a of the traveling rail 137. Accordingly, it becomes possible to prevent the bent end portions 105f of the drive tube 105 from being depressed by the drive wheel 138 and the traveling rail 137 and hence, the durability of the drive tube 105 can be enhanced.

In the transport system of the above-mentioned fifth to fifteenth embodiments, the transport body which moves while placing a document or an article to be transported thereon is provided outside the drive tube and moves on the traveling rail. Accordingly, the document or the article to be transported can be transported without imposing any restriction on the shape of the document or the article to be transported. Further, since the drive wheels, the traveling wheels and the transport body are integrally constituted and hence, there is no possibility that the transport body does not follow the drive wheels or the traveling wheels so that the document or the article can be transported a long distance at a high speed.

Figure 35:
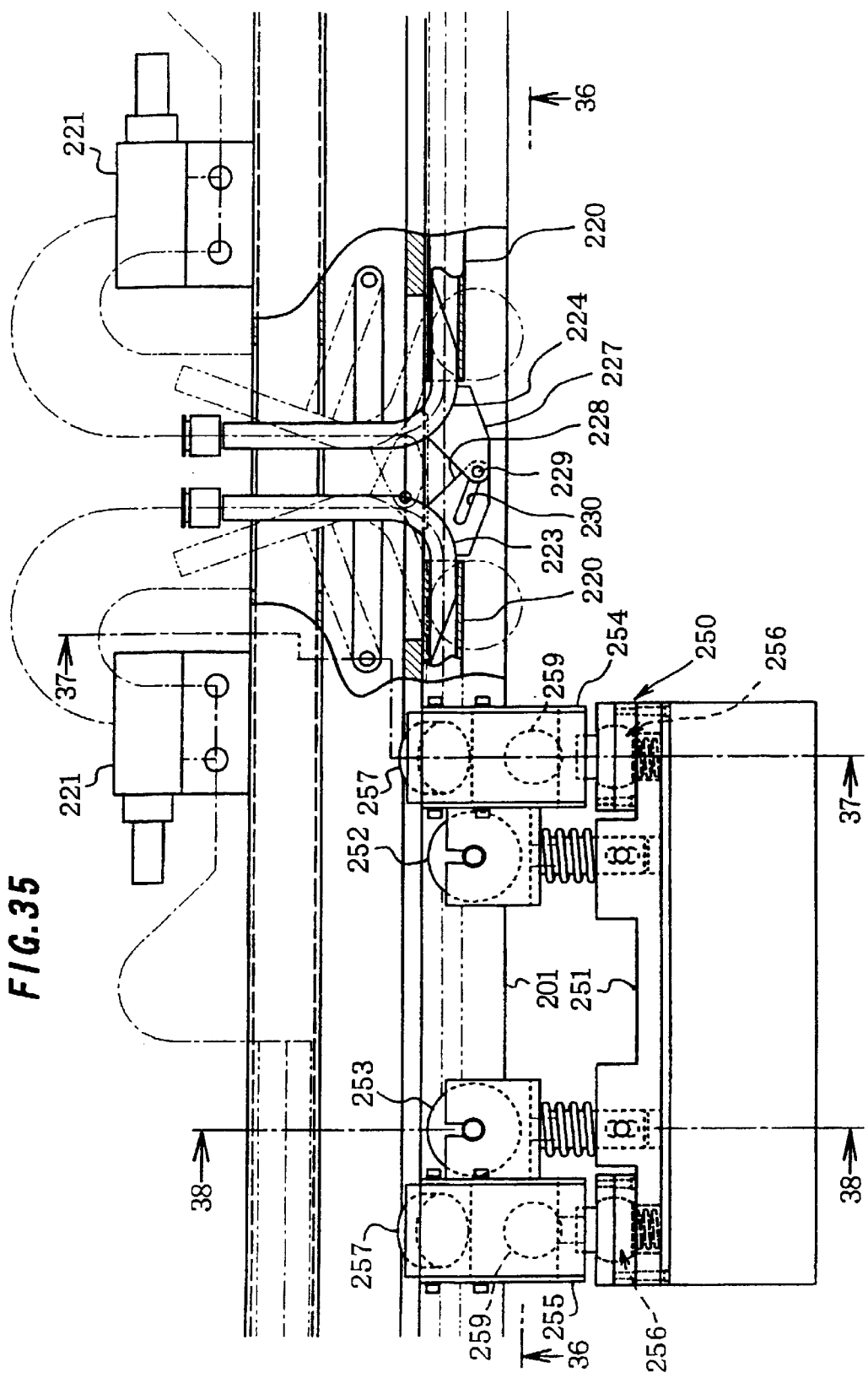
FIG. 35 is a side view of an essential part with a part broken away of a transport system according to the sixteenth embodiment of the present invention in the vicinity of a tube transfer portion.
Figure 36:
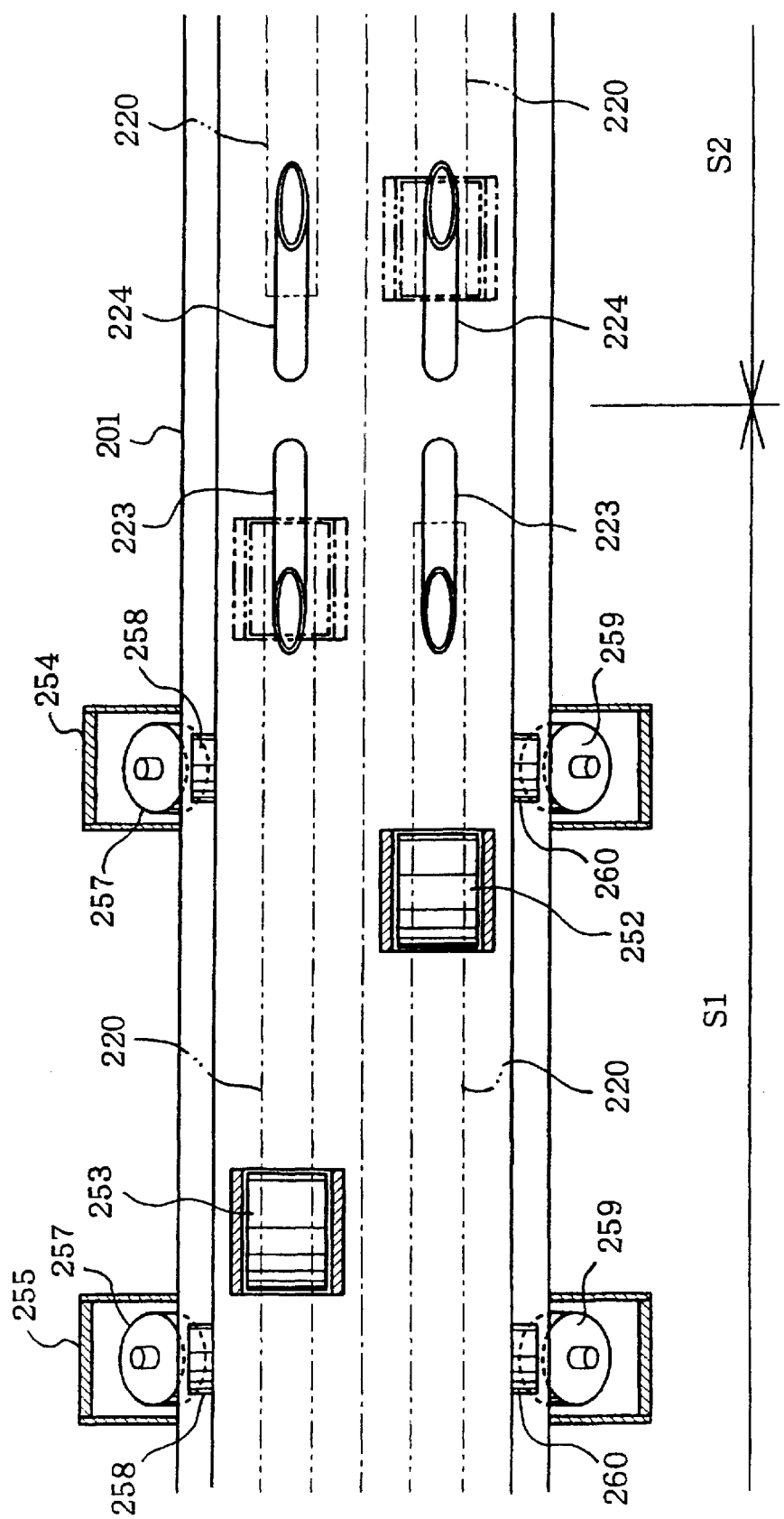
FIG. 36 is a schematic cross-sectional view taken along a line 36—36 of FIG. 35 of the transport system shown in FIG. 35 in the vicinity of the tube transfer portion.
Figure 37:
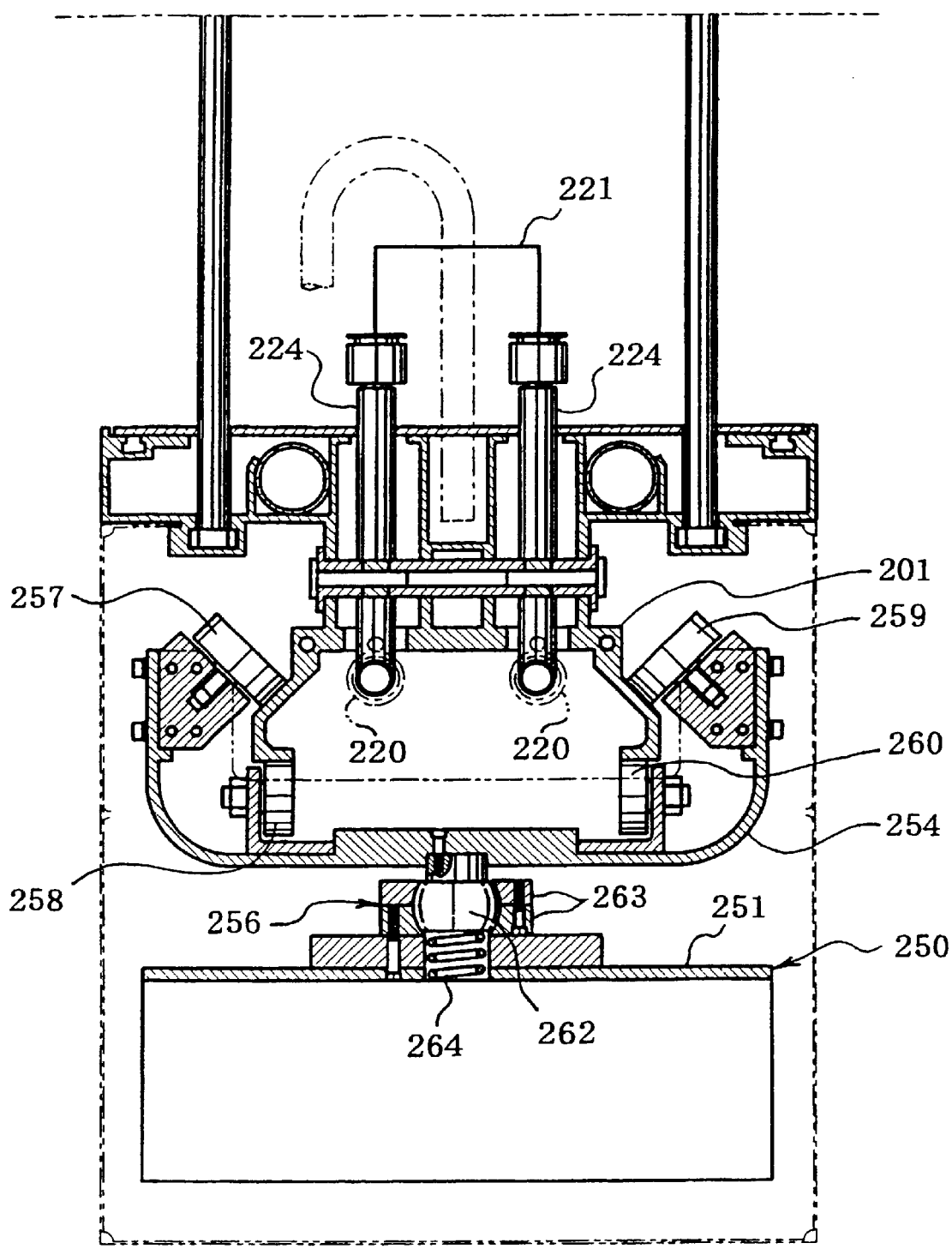
FIG. 37 is across-sectional view of the transport system shown in FIG. 35 taken along a line 37—37 of FIG. 35.
Figure 38:
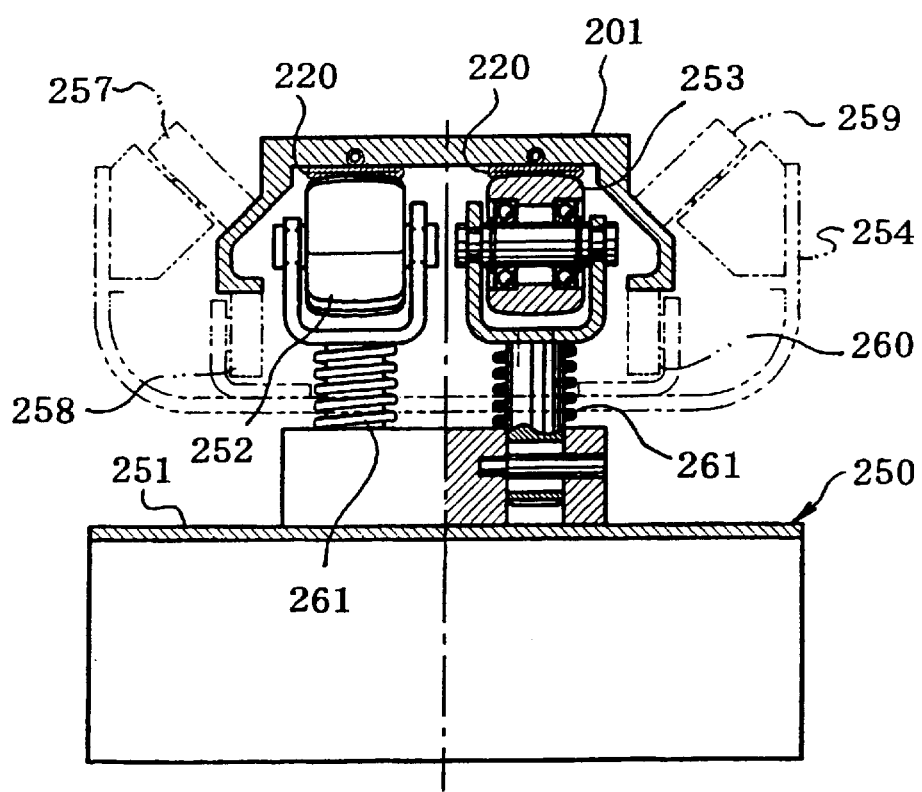
FIG. 38 is a cross-sectional view of the transport system shown in FIG. 35 taken along a line 38—38 of FIG. 35.
Figure 39:
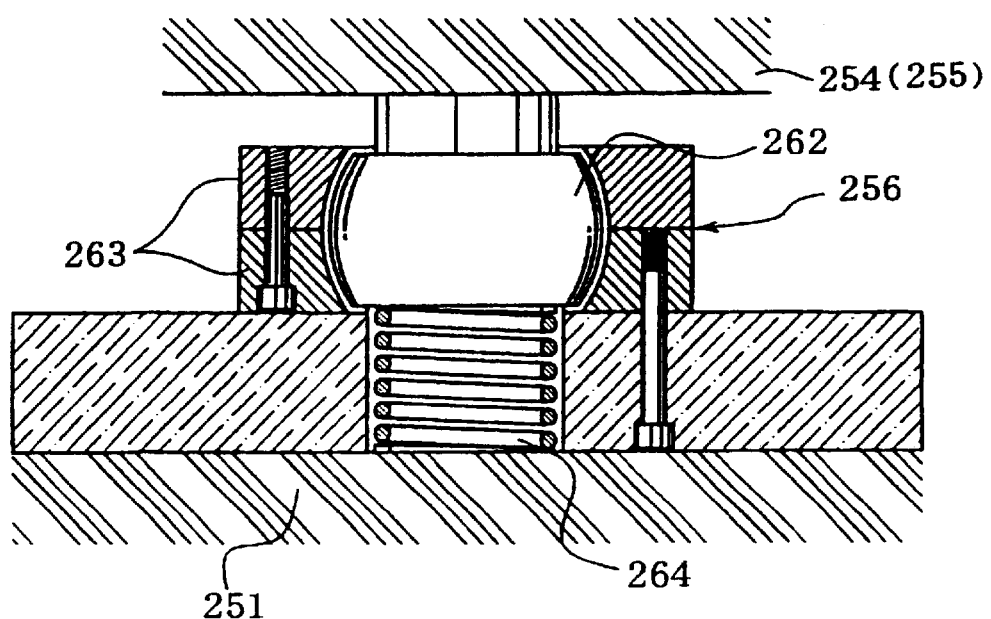
FIG. 39 is an enlarged cross-sectional view of an essential part of a transport body of the transport system shown in FIG. 35.
Figure 40:
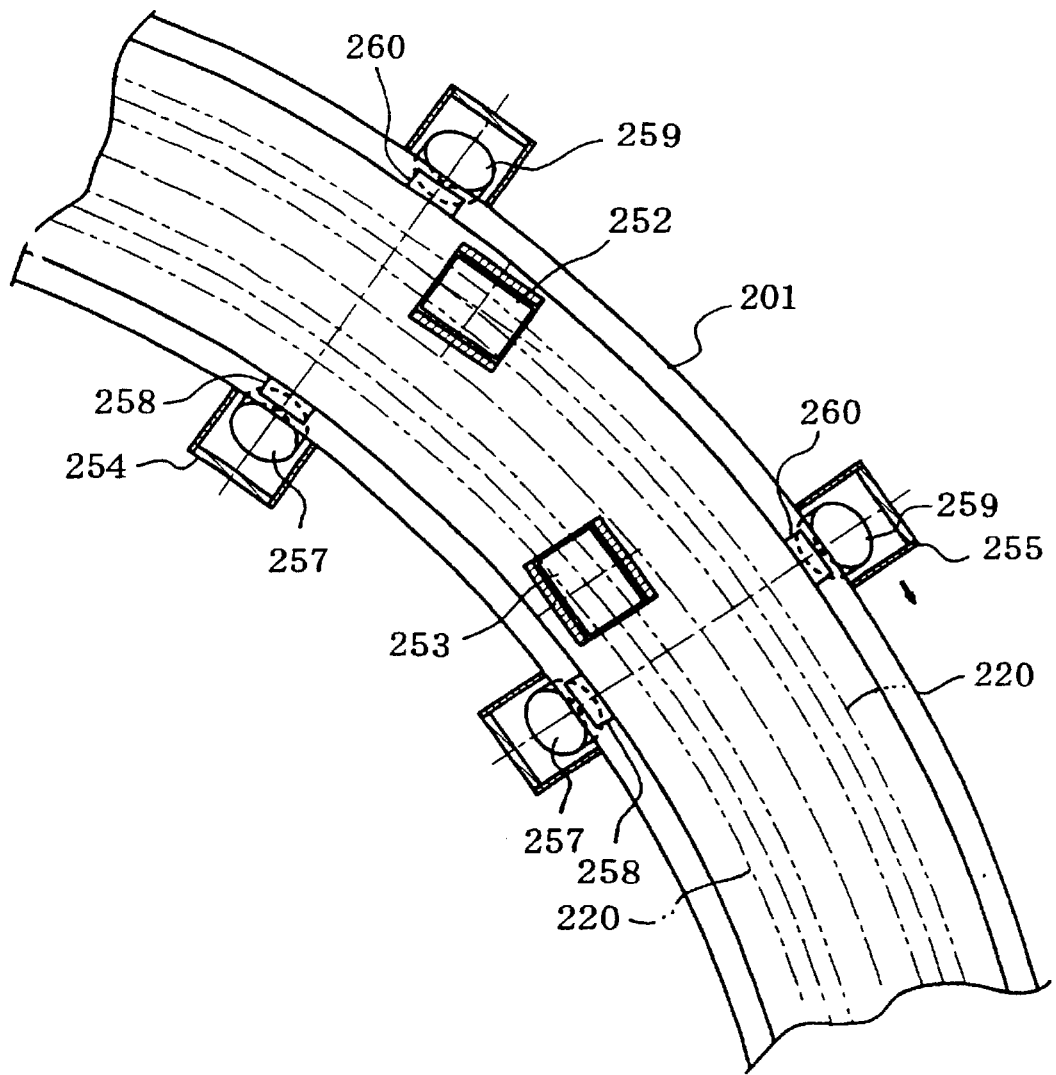
FIG. 40 is a plan view showing the state in which the transport body of the transport system shown in FIG. 35 travels on a traveling rail curved horizontally.
Figure 41:
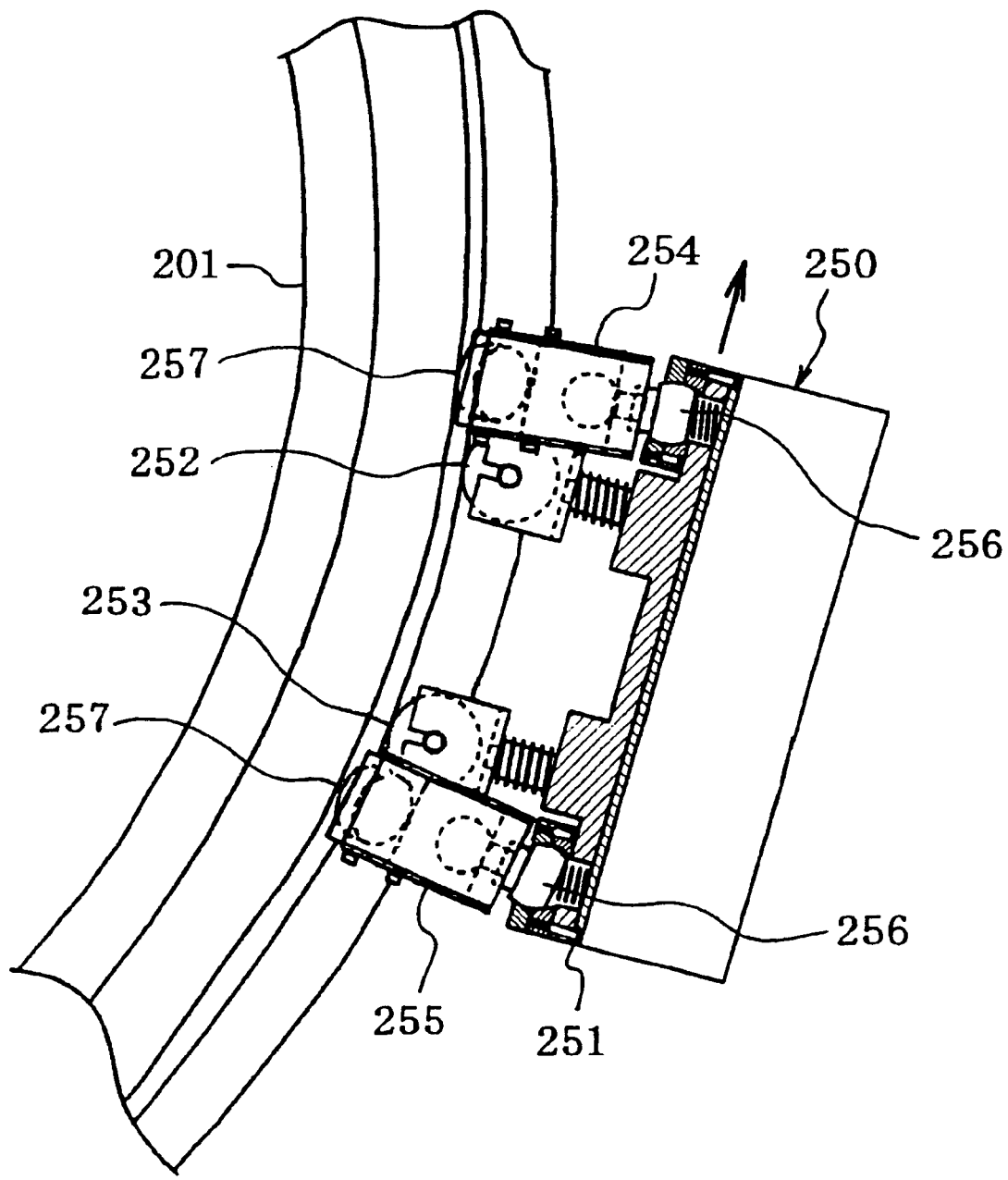
FIG. 41 is a side view showing the state in which the transport body of the transport system shown in FIG. 35 travels on a traveling rail bent in the vertical direction.

FIG. 35 to FIG. 42 show the sixteenth embodiment of the present invention. FIG. 35 is a side view of an essential part with a part broken away of a transport system in the vicinity of a tube transfer portion. FIG. 36 is a schematic cross-sectional view taken along a line 36—36 of FIG. 35 of the transport system shown in FIG. 35 in the vicinity of the tube transfer portion. FIG. 37 is a cross-sectional view of the transport system shown in FIG. 35 taken along a line 37—37 of FIG. 35. FIG. 38 is a cross-sectional view of the transport system shown in FIG. 35 taken along a line 38—38 of FIG. 35. FIG. 39 is an enlarged cross-sectional view of an essential part of a transport body of the transport system shown in FIG. 35. FIG. 40 is a plan view showing the state in which the transport body of the transport system shown in FIG. 35 travels along a traveling rail curved horizontally. FIG. 41 is a side view showing the state in which the transport body of the transport system shown in FIG. 35 travels on a traveling rail bent in the upward direction. FIG. 42A and FIG. 42B are cross-sectional views respectively showing a preferable structure of a drive tube used in the transport system of FIG. 35 and the manner of mounting the drive tube.

First of all, referring to FIG. 35 to FIG. 38, a transport system 200 of this embodiment includes a traveling rail 201 having a plurality of travel sections S1, S2 . . . and a transport body 250 which travels on this traveling rail 201.

A pair of left and right drive tubes 220 having a resiliency are arranged in each travel section of the traveling rail 201 in the longitudinal direction of the traveling rail 201 and parallel to each other. As will be explained later, the drive tubes 220 in each travel section of the traveling rail 201 are constituted such that a pressure medium in a gaseous or liquid form is selectively supplied into or discharged from one ends or the other ends of the drive tubes 220.

The traveling rail 201 has a transport reference surface 201a and this transfer reference surface 201a is arranged horizontally when the traveling rail 201 is set horizontally and is arranged vertically when the traveling rail 201 is set vertically.

Further, the traveling rail 201 has tube mounting surfaces 202 for mounting drive tubes 220. In this embodiment, tube mounting surfaces 202 are formed parallel to the transport reference surface 201a of the traveling rail 201.

On the other hand, the transport body 250 is constituted as follows. That is, the transport body 250 has a chassis 251 and a pair of drive wheels 252, 253 mounted on the chassis 251. A pair of drive wheels 252, 253 are respectively capable of rolling in the longitudinal direction of the traveling rail 201 while depressing drive tubes 220 arranged on the traveling rail 201 and the drive wheels 252, 253 receive the rotational drive force from the pressure medium supplied to the inside of the drive tubes 220, whereby the transport body 250 is capable of traveling on the traveling rail 201.

In front of and behind the drive wheels 252, 253, a pair of traveling wheel support frames 254, 255 are respectively mounted on the chassis 251 by way of universal joints 256. Four traveling wheels 257, 258, 259, 260 which roll on the traveling rail 201 are mounted on respective traveling wheel support frames 254, 255 such that four traveling wheels 257–260 surround the traveling rail 201.

As shown in FIG. 37, in this embodiment, four traveling wheels 257–260 are arranged in two pairs at both sides of the traveling rail 201 making an acute angle, particularly approximately 45 degrees relative to each other. Accordingly, four traveling wheels 257–260 are capable of rolling on the traveling rail 201 in the state that they sandwich the both side portions of the traveling rail 201 while making an acute angle relative to each other.

The transport body 250 having the above-mentioned constitution is capable of traveling on the traveling rail 201 in the state that the traveling rail 201 is sandwiched by the traveling wheels 257–260 which are arranged in front of and behind the drive wheels 252, 253 four in number respectively and hence, the transport body 250 is capable of performing not only the horizontal traveling but also the vertical traveling, the up-side-down inverted traveling or the like. Further, in front of and behind the drive wheels 252, 253, a pair of traveling wheel support frames 254, 255 are mounted on the chassis 251 by way of the universal joints 256 and the traveling wheels 257–260 which are capable of rolling on the traveling rail 201 are mounted on these front and rear traveling wheel support frames 254, 255. Accordingly, when the traveling rail 201 is curved in the horizontal direction (see FIG. 40) or is bent in the vertical direction (see FIG. 41), during a period that the chassis 251 passes the curved section or the bent section, the direction of the both traveling wheel support frames 254, 255 can be aligned with the curving direction or the bending direction of the traveling rail 201. Accordingly, the direction of the traveling wheels 257–260 can be also aligned with the curving direction or the bending direction of the traveling rail 201 and hence, it becomes possible to make the transport body 250 pass smoothly the curved section or the bent section of the traveling rail 201 while minimizing the frictional resistance between the traveling wheels 257–260 and the traveling rail 201 and without any play between them. Accordingly, the lifetime of the traveling wheels 257–260 can be prolonged and the stall of the transport body 250 at the curved section or the bent section of the traveling rail 201 can be prevented thus ensuring the stable traveling.

Further, in this embodiment, four traveling wheels 257–260 are mounted on each traveling wheel support frame 254, 255 in front of and behind the drive wheel 252, 253 and these traveling wheels 257–260 are capable of traveling on the traveling rail 201 in the state that both sides of the traveling rail 201 are sandwiched by these four traveling wheels 257–260 with an acute angle relative to each other. Accordingly, with the provision of least number of traveling wheels 257–260 on the front and rear traveling wheel support frames 254, 255, the horizontal traveling, the vertical traveling and the up-side-down inverted traveling of the transport body 250 can be obtained.

Further, as shown in FIG. 38, the drive wheels 252, 253 of this embodiment are provided such that they are displaceable relative to the chassis 251 and are respectively biased in the direction to depress the drive tubes 220 by means of springs 261. Accordingly, during a period that the transport body 250 travels on the traveling rail 201, even when there exist some irregularities on the traveling rail 201 or the drive tube 220, the pressing force of the drive wheels 252, 253 applied to the drive tubes 220 can be always maintained at an approximately fixed value due to the spring force of the spring 261 and hence, the rotational drive force given to the drive wheels 252, 253 due to the pressure medium supplied to the drive tubes 220, that is, the thrust given to the transport body 250 can be maintained at an approximately fixed value.

Further, with respect to the transport body 250 of this embodiment, as shown in detail in FIG. 39, each universal joint 256 includes a spherical shaft 262 which is mounted on the traveling wheel support frame 254 (or 255) chassis 251 and a spherical seat 263 which is mounted on the chassis 251 and slidably embraces a spherical portion of the spherical shaft 262. The is further provided with a spring 264 which presses a distal end surface of the spherical shaft 262. Accordingly, the universal joints 256 interposed between the chassis 251 and the traveling wheel support frames 254, 255 can be respectively constituted by the least number of parts. Further, after the transport body 250 passes the curved section or the bent section of the traveling rail 201, the traveling wheel support frames 254, 255 can be automatically restored to the original neutral position due to the biasing force of the springs 264 with respect to chassis 251.

Further, in the above-mentioned embodiment, into end portions of two drive tubes 220 which are positioned in front of and behind a boundary portion between the transport sections S1, S2 . . . of the traveling rail 201, one ends of transfer pipes 223, 224 are inserted and the pressure medium is selectively supplied into or discharged from the inside of the drive tubes 220 by way of these transfer pipes 223, 224. That is, in this embodiment, one ends or the other ends of the drive tubes 220 are respectively connected to solenoid valves 221 by way of the transfer pipes 223, 224 and the solenoid valves 221 are connected to an air compressor not shown in the drawings. Further the operation of these two solenoid valves 221 can be controlled by a controller not shown in the drawings such that when one solenoid valve 221 connects one end of the drive tube 220 to the air compressor, the other solenoid valve 221 opens the other end of the drive tube 220 to the atmosphere and when the other solenoid valve 221 connects one end of the drive tube 220 to the air compressor, one solenoid valve 221 opens the other end of the drive tube 220 to the atmosphere.

Further, a sensor (not shown in the drawing) which detects the transport body 250 is disposed in the vicinity of the boundary portion between the transport sections of the traveling rail 201 and the controller is constituted such that it performs a sequential control of the solenoid valves 221 in response to detection signals from the sensor. Due to such a constitution, pressurized air as the pressure medium can be supplied into the drive tubes 220 which are arranged in the longitudinal direction of the traveling rail 201 in sequence so that the transport body 250 can be made to travel continuously.

A pair of front and rear transfer pipes 223, 224 are rotatably mounted on the traveling rail 201 by way of pivot shafts 225, 226 such that one ends of the transfer pipes 223, 224 can sink into the inside of the traveling rail 201 at the time that the transport body 250 passes. Further, the transfer pipes 223, 224 have one ends thereof cut at a gentle inclination angle such that the drive wheels 252, 253 can smoothly get over the transfer pipes 223, 224.

Further, a pair of front and rear transfer pipes 223, 224 are connected with each other by a pair of front and rear links 227, 228 which are connected by way of a pin 229 and an elongated hole 230 such that when one pipe sinks into the inside of the traveling rail 201, the other pipe sinks into the inside of the traveling rail 201 together with one pipe.

Further, as shown by an imaginary line in FIG. 35, both links 227, 228 are formed such that when a pair of front and rear transfer pipes 223, 224 sink into the inside of the traveling rail 201, the drive wheels 252, 253 can be respectively guided between the front and rear drive tubes 220. That is, when a pair of front and rear transfer pipes 223, 224 sink into the inside of the traveling rail 201, the links 227, 228 form a guide surface having a substantially same height as that of the depressed drive tube 220 which are depressed by the drive wheels 252, 253 and hence, it becomes possible to make the drive wheel 250 smoothly pass between a pair of front and rear drive tubes 220.

As can be understood from FIG. 36, a pair of left and right drive wheels 252, 253 are mounted on the chassis 251 with their positions displaced from each other in the front and back direction. Accordingly, when one of a pair of drive wheels 252, 253 passes the boundary portion between the transport sections, the driving force from the drive tube 220 can be surely given to the other drive wheel and hence, it becomes possible to prevent the interruption of the drive force from the drive tube 220 when the transport body 250 passes the boundary portion between the transport sections.

As has been explained above, in the transport system of this embodiment, the pressure medium can be individually supplied into or discharged from a plurality of drive tubes 220 arranged for every transport sections S1, S2, . . . of the traveling rail 201 and hence, the thrust for traveling the transport body can be effectively obtained for each transport section of the transport rail 201. Accordingly, the transport system of this embodiment can easily cope with the long transport and can make a plurality of transport bodies 250 travel if necessary.

Figure 42A:
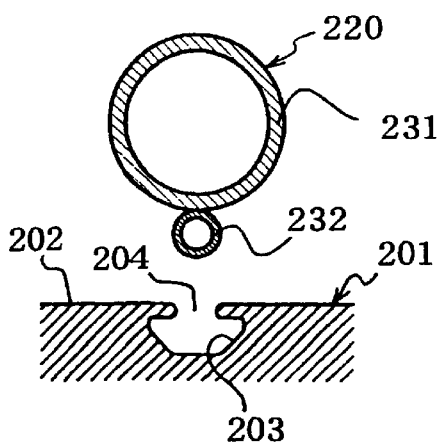
FIG. 42A and FIG. 42B are cross-sectional views respectively showing a preferable structure of a drive tube used in the transport system of FIG. 35 and the manner of mounting the drive tube.
Figure 42B:
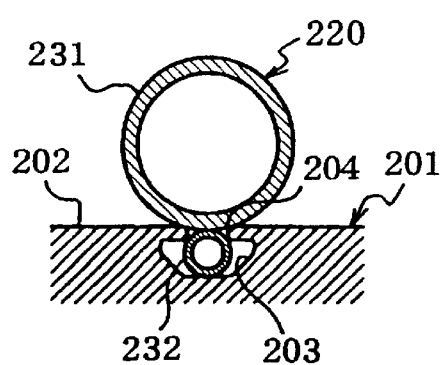

Further, as shown in FIG. 42A and FIG. 42B, in the transport system of this embodiment, a tube mounting groove 203 is formed in a tube mounting surface 202 of the traveling rail 201. In this tube mounting groove 203, the width of an opening portion 204 which opens at the tube mounting surface 202 is formed smaller than the inner groove width. On the other hand, the drive tube 220 is formed by adhering a main tube 231 which gives power to the drive wheels 252, 253 of the transport body 250 and a mounting tube 232 which is mounted in the inside of the groove 203 by embedding through the opening 204 of the tube mounting groove 203 to each other by means of an adhesive agent, heat fusing or the like.

With respect to the drive tube having the above-mentioned constitution and the mounting structure, the main tube 231 and the mounting tube 232 can be manufactured individually so as to satisfy their respective required performance. That is, the main tube 231 may be manufactured such that the main tube 231 has the hardness suitable for performing the travel drive of the transport body 250, while the mounting tube 232 may be manufactured such that the mounting tube 232 has the hardness suitable for facilitating the mounting of the mounting tube 232 into the inside of the tube mounting groove 203 and for preventing the easy removal of the mounting tube 232 from the groove 203. In this case, it is preferable that the main tube 231 and the mounting tube 232 are formed of resilient materials which have approximately equal thermal coefficients. Since the drive tube 220 is formed by adhering the main tube 231 and the mounting tube 232 having different hardness, the drive tube 220 which satisfies the required performances of respective parts can be easily manufactured. Further, the main tube 231 and the mounting tube 232 can be easily peeled off by pulling if necessary and hence, an end-portion processing of the drive tube 220, for example, the processing to cut a part of the mounting tube 232 can be performed easily.

Figure 43:
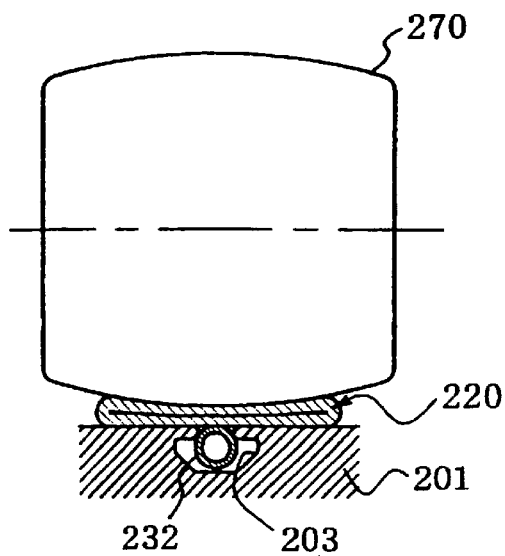
FIG. 43 is an explanatory view showing a modification of the drive wheel.
Figure 44:
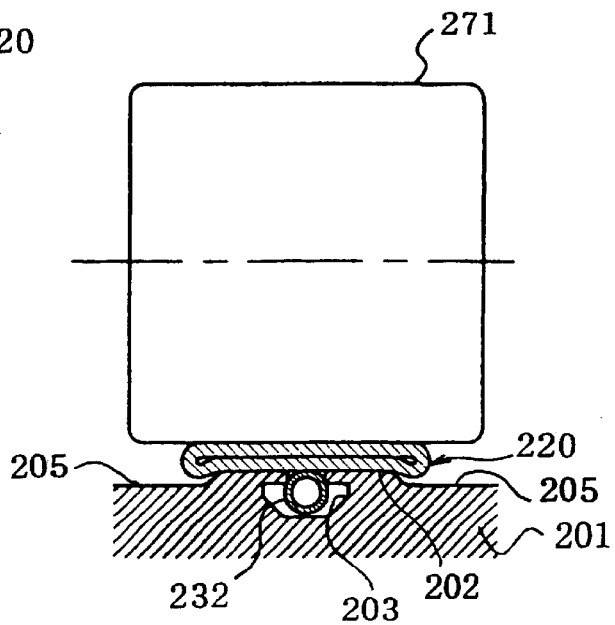
FIG. 44 is an explanatory view showing a modification of the traveling rail.

FIG. 43 and FIG. 44 respectively show the preferred modes for prolonging the lifetime of the drive tube 220.

A drive wheel 270 shown in FIG. 43 has a barrel shape whose center portion is bulged. With the use of the drive wheel 270 having such a shape, the stress generated at bent portions at both left and right side ends of the drive tube 220 can be reduced while strongly depressing the center portion of the drive tube 220 by pressing so that the fatigue lifetime of the drive tube 220 can be prolonged.

Although a drive wheel 271 shown in FIG. 44 has a cylindrical shape as in the case of the drive wheels 252, 253 in the previously explained embodiment, on a tube mounting surface 202 of a traveling rail 201, concave portions 205 are respectively formed in the vicinity of bent portions at both side ends of the drive tube 220. With the use of the traveling rail 201 having such a shape, the stress generated at bent portions at both left and right side ends of the drive tube 220 can be reduced due to the concave portions 205 of the traveling rail 201 while strongly depressing the center portion of the drive tube 220 by the drive wheel 271 so that the fatigue lifetime of the drive tube 220 can be prolonged.

Subsequently, the method and device for mounting drive tubes on a traveling rail are explained hereinafter.

Figure 45:
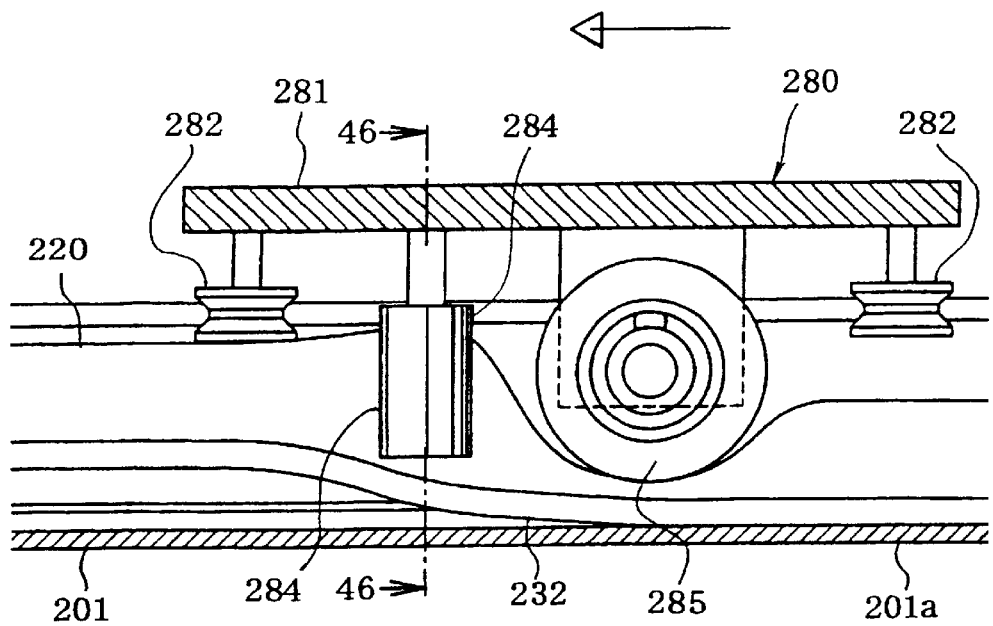
FIG. 45 is a longitudinal cross-sectional view showing one embodiment of a drive tube mounting device for mounting a drive tube on a traveling rail.
Figure 46:
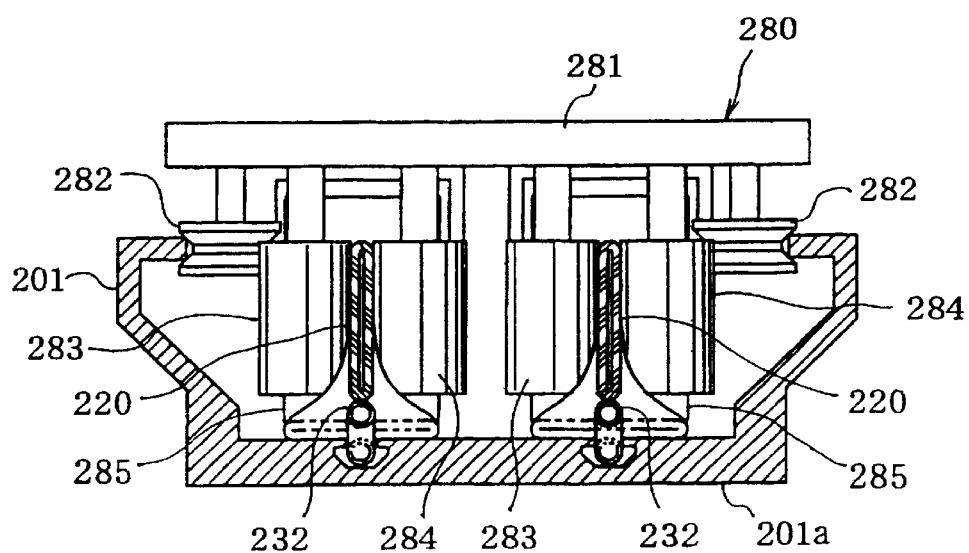
FIG. 46 is a cross-sectional view of the drive tube mounting device shown in FIG. 45 taken along a line 46—46 of FIG. 45.

FIG. 45 and FIG. 46 show a drive tube mounting device applicable to the traveling rail 201 of the above-mentioned sixteenth embodiment. FIG. 45 is a cross-sectional view of the drive tube mounting device and FIG. 46 is a cross-sectional view of the tube mounting device shown in FIG. 45 taken along a line 46—46 of FIG. 45.

Referring to these drawings, a drive tube mounting device 280 includes a truck 281, a plurality of traveling wheels 282 which are rotatably mounted on the truck 281 and are capable of rolling on the traveling rail 201 by being engaged with the traveling rail 201, a pair of guide rollers 283, 284 which are mounted on the truck 281 and sandwich respective drive tubes 220 from left and right above the groove of the traveling rail 201, and mounting rollers 285 which are mounted on the truck 281 behind the guide rollers 283, 284 and press respective drive tubes 220 toward the tube mounting grooves 204.

The drive tube mounting device having the above-mentioned constitution is capable of moving on the traveling rail 201 while embedding by pushing the mounting tube 232 of the drive tube 220 into the tube mounting groove 204 of the traveling rail 201. Accordingly, by supplying the pressure medium into the inside of the drive tube 220 from behind the drive tube mounting device 280, the mounting operation of the drive tube 220 can be automatically performed while making the drive tube mounting device 280 travel with the pressure of the pressure medium.

Figure 47:
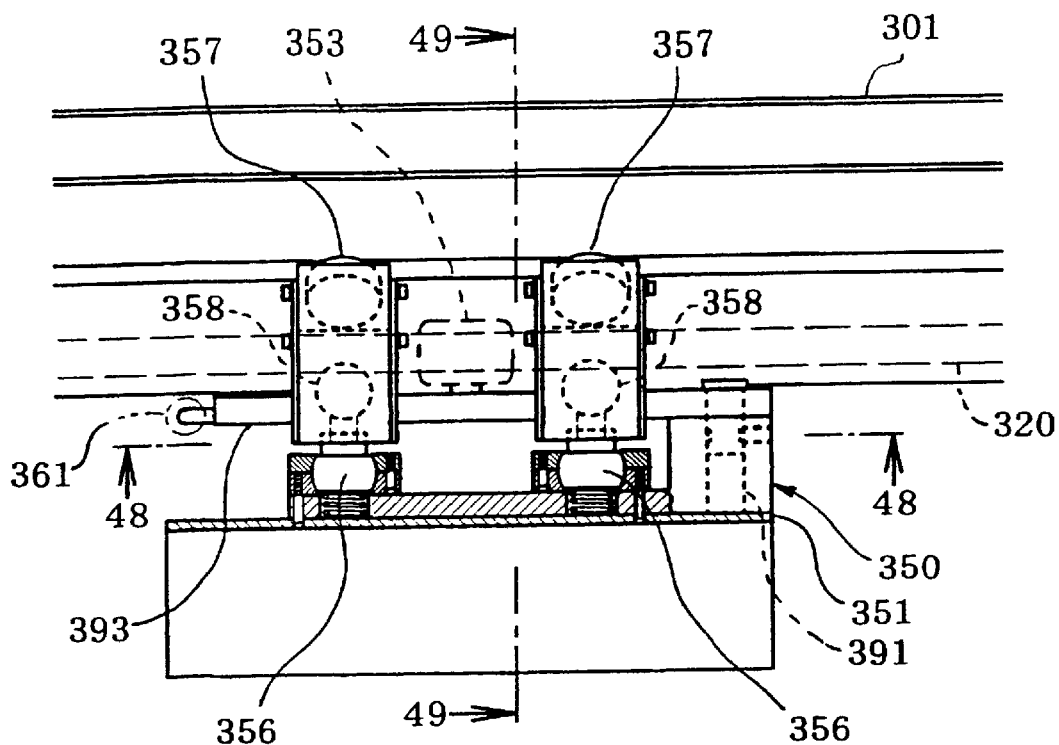
FIG. 47 is a side view of an essential part of a transport system showing the seventeenth embodiment of the present invention.
Figure 48:
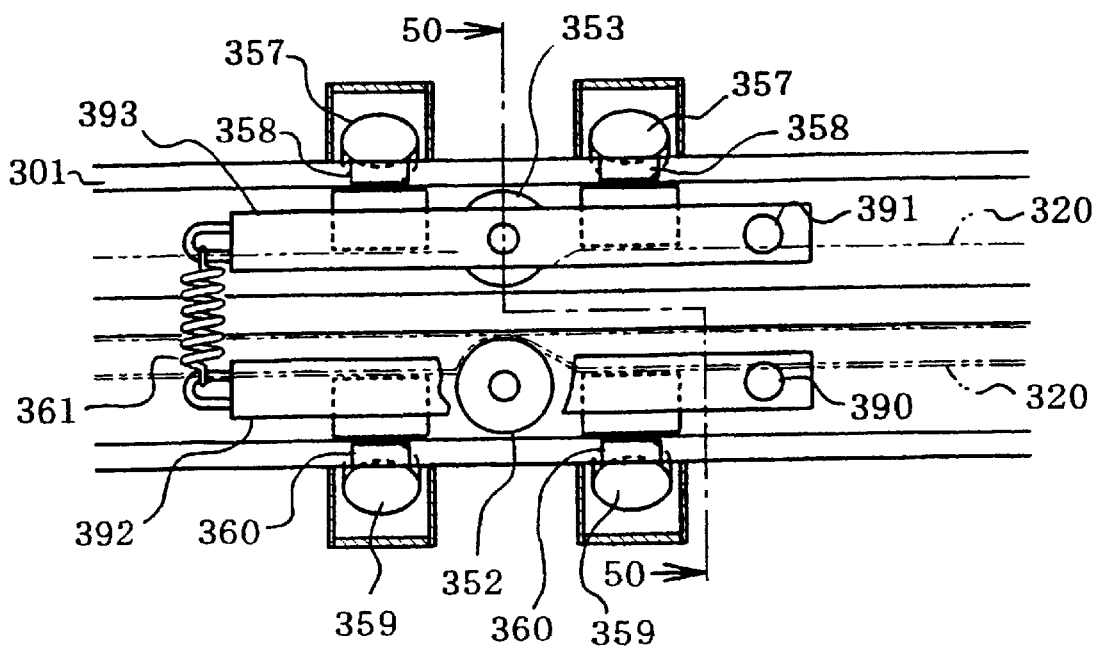
FIG. 48 is a bottom view with a part in cross section of the transport system shown in FIG. 47 taken along a line 48—48 of FIG. 47.
Figure 49:
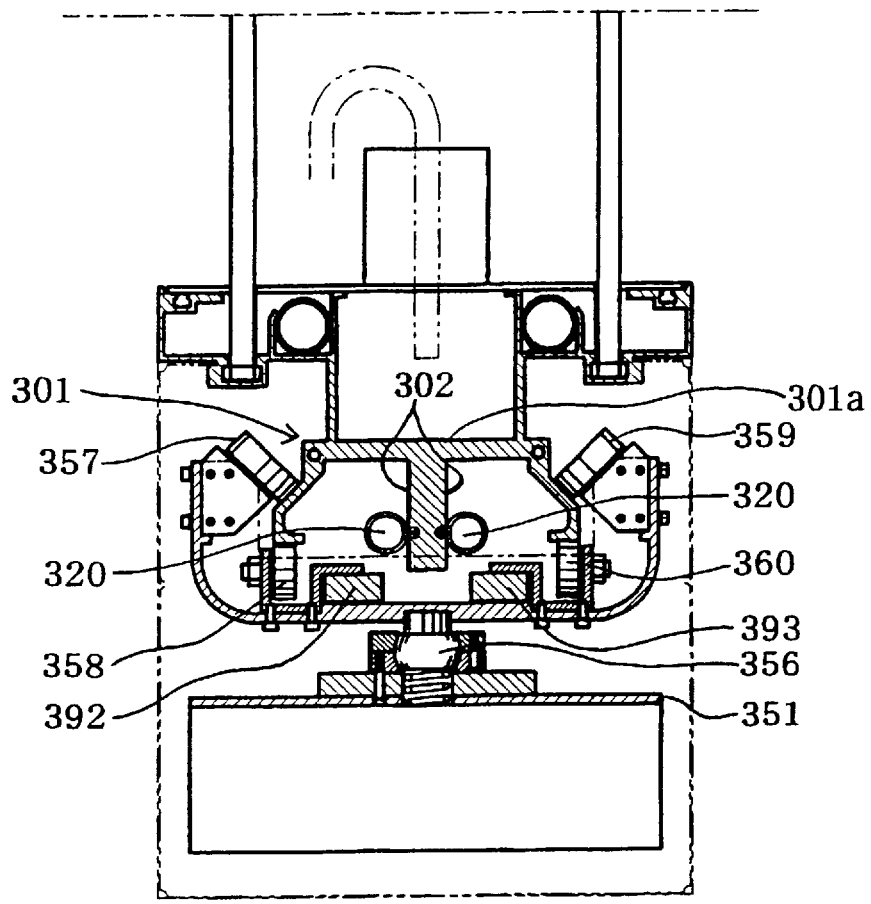
FIG. 49 is a cross-sectional view of the transport system shown in FIG. 47 taken along a line 49—49 of FIG. 47.
Figure 50:
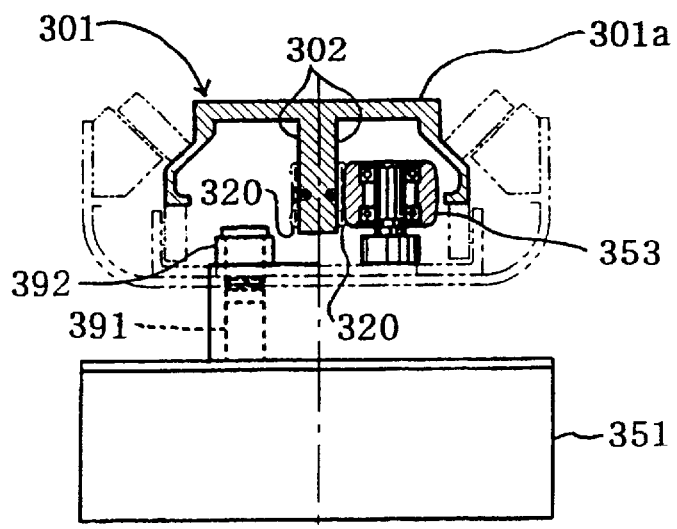
FIG. 50 is a bottom view with a part in cross section of the transport system shown in FIG. 47 taken along a line 50—50 of FIG. 48.

FIG. 47 to FIG. 50 show the seventeenth embodiment of the present invention. FIG. 47 is a side view of an essential part of a transport system. FIG. 48 is a bottom view with a part in cross section of the transport system shown in FIG. 47 taken along a line 48—48 of FIG. 48. FIG. 49 is a cross-sectional view of the transport system shown in FIG. 47 taken along a line 49—49 of FIG. 47. FIG. 50 is a bottom view with a part in cross section of the transport system shown in FIG. 47 taken along a line 50—50 of FIG. 48.

Referring to these drawings, a transport system 300 of the seventeenth embodiment includes a traveling rail 301 and a transport body 350 which travels on this traveling rail 301. A pair of left and right drive tubes 320 having a resiliency are arranged on the traveling rail 301 parallel to each other along the longitudinal direction of the traveling rail 301. The drive tubes 320 are connected with a pressure medium supply system not shown in the drawing which selectively supplies the pressure medium in a gaseous or liquid form into the inside of the drive tubes 320 or discharges such a pressure medium from the drive tubes 320 through one ends or the other ends of the drive tubes 320.

The traveling rail 301 has a transport reference surface 301a and this transport reference surface 301a is arranged horizontally when the traveling rail 301 is set horizontally and is arranged vertically when the traveling rail 301 is set vertically.

Further, the traveling rail 301 has tube mounting surfaces 302 for mounting drive tubes 320. In this embodiment, tube mounting surfaces 302 are formed perpendicular to the transport reference surface 301a of the traveling rail 301.

On the other hand, the transport body 350 is constituted as follows. That is, the transport body 350 has a chassis 351 and a pair of drive wheels 352, 353 mounted on the chassis 351. A pair of drive wheels 352, 353 are respectively capable of rolling in the longitudinal direction of the traveling rail 301 while depressing drive tubes 320 arranged on the tube mounting surface 302 of the traveling rail 301 and the drive wheels 352, 353 receive the rotational drive force from the pressure medium supplied to the inside of the drive tubes 320, whereby the transport body 350 is capable of traveling on the traveling rail 301.

In front of and behind the drive wheels 352, 353, a pair of traveling wheel support frames 354, 355 are respectively mounted on the chassis 351 by way of universal joints 356. Four traveling wheels 357, 358, 359, 360 which roll on the traveling rail 301 are mounted on respective traveling wheel support frames 354, 355 such that four traveling wheels 357–360 surround the traveling rail 301.

Since the constitutions of the traveling wheel support frames 354, 355 and the traveling wheels 357–360 of the transport body 350 of this seventeenth embodiment are substantially identical to those of the above-mentioned sixteenth embodiment, the detailed explanation is omitted.

In the transport body 350 of this seventeenth embodiment, a pair of left and right drive wheels 352, 353 are rotatably mounted on support arms 392, 393 which are pivotally mounted on the chassis 351 by way of pivot axes 390, 391. Further, the drive wheels 352, 353 are respectively mounted such that they are biased by springs 361 in the direction to depress drive tubes 320 on the tube mounting surface 302. Accordingly, during a period that the transport body 350 travels on the traveling rail 301, even when there exist some irregularities on the traveling rail 301 or the drive tube 320, the pressing force of the drive wheels 352, 353 applied to the drive tubes 320 can be always maintained at an approximately fixed value due to the spring force of the springs 361 and hence, the rotational drive force given to the drive wheels 352, 353 due to the pressure medium supplied to the drive tubes 320, that is, the thrust given to the transport body 350 can be maintained at an approximately fixed value.

FIG. 51 to FIG. 53 show other examples of the pressure medium supply structure for drive tubes which is applicable to the transport system. FIG. 51 is a cross-sectional view in the vicinity of end portions of drive tubes. FIG. 52 is a side view of a connecting tube mounted on an end portion of the drive tube. FIG. 53 is a cross-sectional view of the connecting tube shown in FIG. 52 taken along a line 53—53 of FIG. 52.

Referring to these drawings, in this embodiment, the end portions of the drive tubes 420 are sealed by means of heat welding, an adhesive agent or the like in the state that the end portions are depressed. In the side surface portions of the drive tubes 420 in the vicinity of the end portions thereof, mounting holes 421 are formed. Connecting tubes 430 are mounted on the side surfaces of the end portions of the drive tubes 420. The connecting tube 430 includes a shaft portion 431 and a flange 432 formed at an end portion of the shaft portion 431. This connecting tube 430 is inserted into the drive tube 420 from the end portions of the drive tube 420 before sealing the end portions of the drive tubes 420. Subsequently, by inserting the shaft portion 431 into the mounting hole 421 of the drive tube 420 from the inside of the drive tube 420, the shaft portion 431 is protruded to the outside of the drive tube 420. At an exterior portion of the drive tube 420, a washer 433, a sealing O-ring 434, a retainer ring 435 and the like are mounted on a shaft portion 431 of the connecting tube 430. By engaging and fastening a nut tube 440 with a thread portion formed on an outer periphery of the shaft portion 431 of the connecting tube 430, a gap between the mounting hole 421 of the drive tube 420 and the connecting tube 430 can be sealed hermetically. If necessary, the gap between the mounting hole 421 of the drive tube 420 and the connecting tube 430 may be sealed by an adhesive agent or the like. Although omitted from the drawing, the nut tube 440 can be connected to a solenoid valve by way of a connecting hose.

With the use of the drive tube 420 having the above-mentioned constitution, it is unnecessary to use the transfer pipes which have been explained with respect to the sixteenth embodiment. As shown in FIG. 51, by merely arranging two drive tubes 420 in parallel along the longitudinal direction of the traveling rail 201, the transport system which can drive the transport body at every section can be realized.

Figure 54:
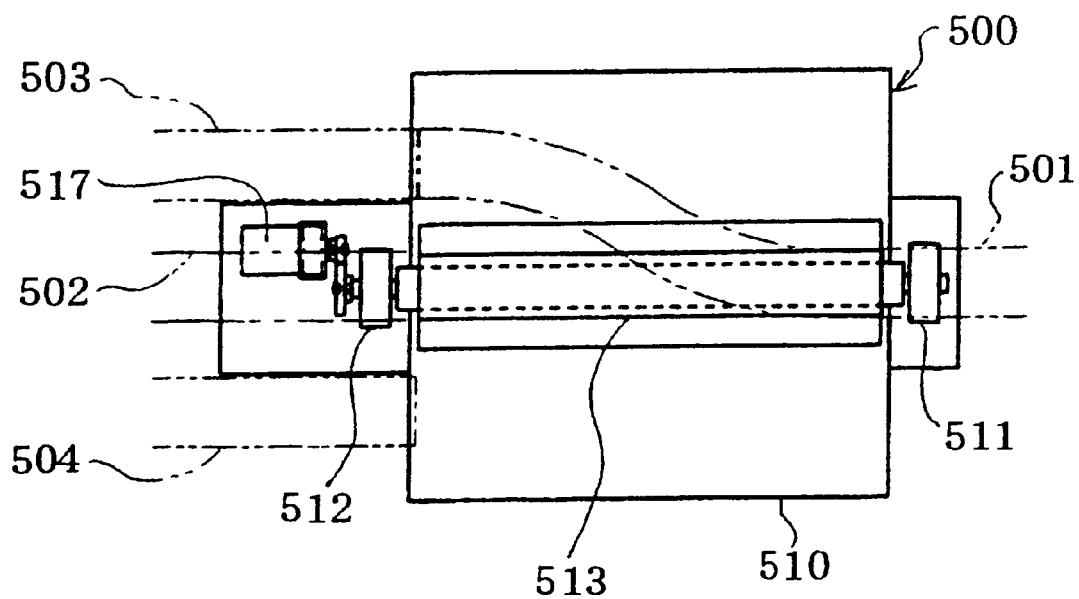
FIG. 54 is a schematic horizontal cross-sectional plan view of an inner structure of a transport route changeover switch showing one embodiment of the transport route changeover switch used in a transport system.
Figure 55:
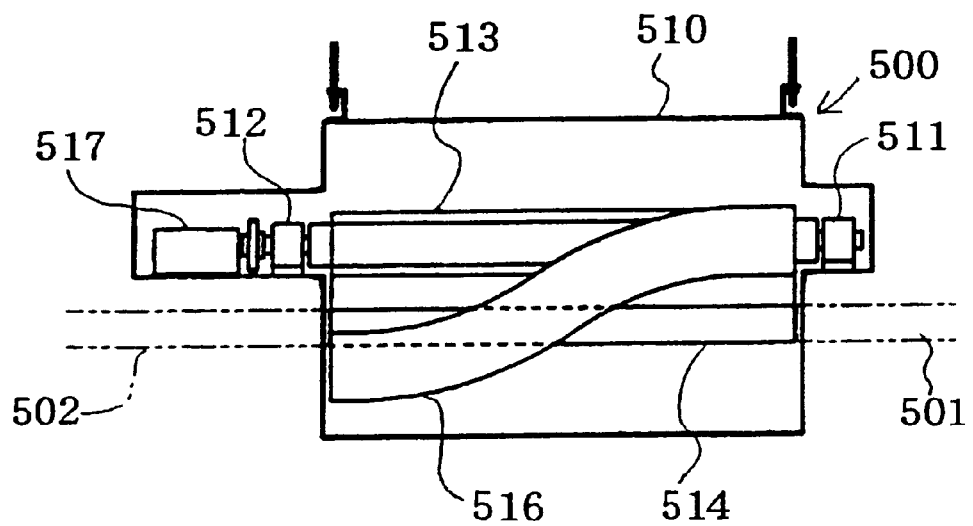
FIG. 55 is a schematic longitudinal cross-sectional side view of the inner structure of the transport route changeover switch shown in FIG. 54.
Figure 56:
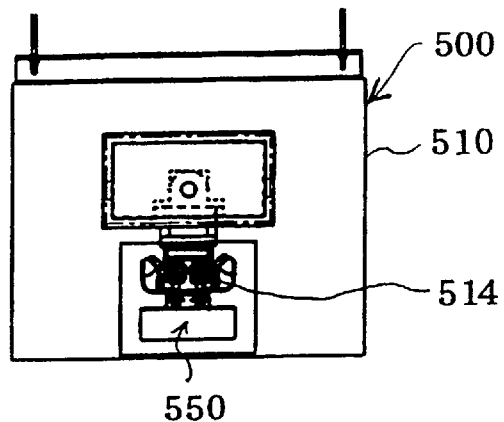
FIG. 56 is a right end view of the transport route changeover switch shown in FIG. 54.
Figure 57:
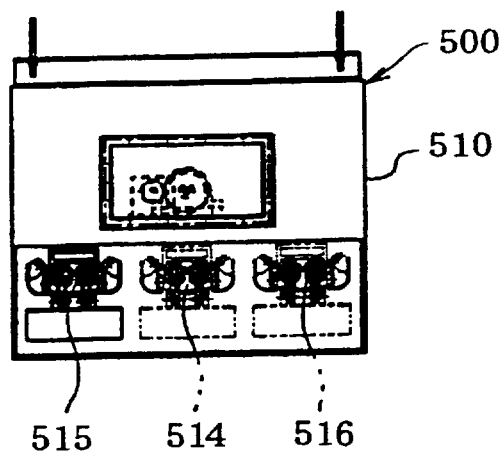
FIG. 57 is a left end view of the transport route changeover switch shown in FIG. 54.
Figure 58:
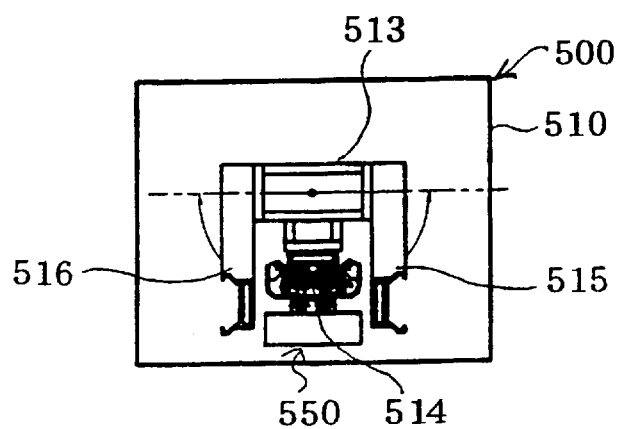
FIG. 58 is a schematic cross-sectional view showing the inner structure of the transport route changeover switch shown in FIG. 54.
Figure 59:
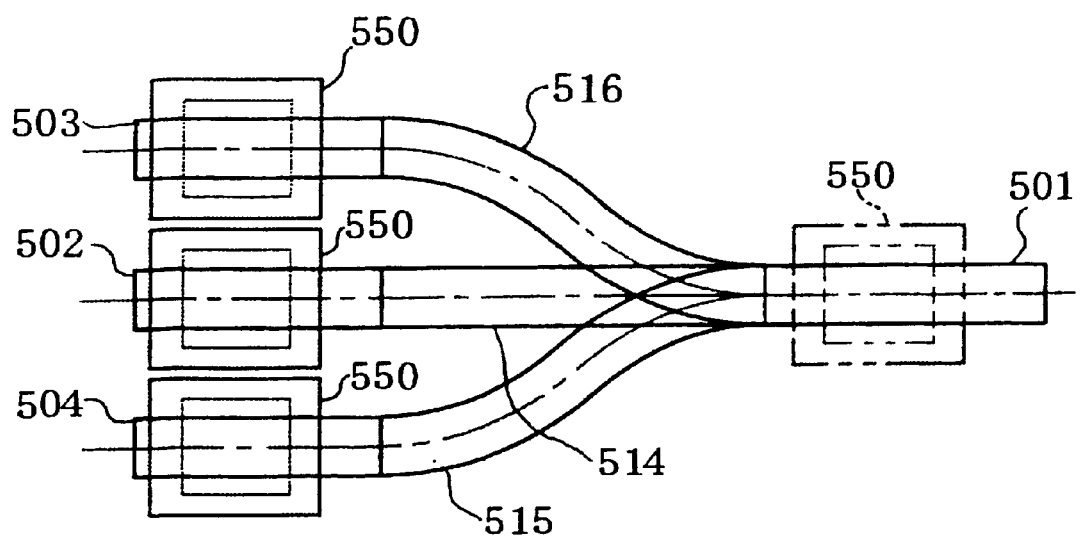
FIG. 59 is an explanatory view for explaining the advancing direction switching operation of the transport route changeover switch shown in FIG. 54.

FIG. 54 to FIG. 58 show one example of a transport route changeover switch which is applicable to the above-mentioned transport system. FIG. 54 is a schematic horizontal cross-sectional plan view of an inner structure of a transport route changeover switch. FIG. 55 is a schematic vertical cross-sectional side view of the inner structure of the transport route changeover switch shown in FIG. 54. FIG. 56 is a right end view of the transport route changeover switch shown in FIG. 54. FIG. 57 is a left end view of the transport route changeover switch shown in FIG. 54. FIG. 58 is a schematic cross-sectional view showing the inner structure of the transport route changeover switch shown in FIG. 54. FIG. 59 is an explanatory view for explaining the operation of the transport route changeover switch shown in FIG. 54.

Referring to these drawings, a transport route changeover switch 500 of this embodiment is provided for selectively connecting one traveling rail 501 at one side (right side in FIG. 54) with three traveling rails 502, 503, 504 at the other side (left side in the drawing) Among three traveling rails 502–504 at the other side, the center traveling rail 502 is arranged on the same axis as the traveling line 501 at one side and remaining traveling rails 503, 504 at the other side are arranged parallel to the center traveling rail 502.

The transport route changeover switch 500 includes a casing 510, a rotary body 513 which has both ends thereof rotatably supported in the casing 510 by way of bearings 511, 512, a plurality (here, three) of connecting traveling rails 514, 515, 516 mounted on the rotary body 513 and a drive motor 517 which rotatably drives the rotary body 513. The number of connecting traveling rails 514–516 corresponds to the number of the traveling rails 502–504 at the other side. The connecting traveling rails 514–516 can have one ends thereof respectively connected to the traveling rail 501 at one side along with the rotation of the rotary body 513. Further, among three connecting traveling rails 514–516, the center connecting traveling rail 514 is arranged and constituted such that when one end thereof is connected to the traveling rail 501 at one side, the other end thereof is connected to the center traveling rail 502. Further, remaining two connecting traveling rails 515, 516 are arranged and constituted such that when respective one ends thereof are connected to the traveling rail 501 at one side, the respective other ends thereof are connected to two remaining traveling rails 502.

Accordingly, due to the traveling route changeover switch 500 having the above-mentioned constitution, by rotating the rotary body 513 with the drive motor 517, the traveling rail 501 at one side can be selectively connected with three traveling rails 502–504 at the other side by way of the connecting traveling rails 514–5161 and hence, it is unnecessary to stop the transport body 550 on the connecting traveling rails 514–516 and it becomes possible to make the transport body 550 continuously travel on the traveling rail 501 at the one side and one of three traveling rails 502–504 at the other side while passing one rail selected from the connecting traveling rails 514–516 (see FIG. 59).

The traveling rails 501–504 in the above-mentioned embodiment may have the same constitution as the traveling rails used in the above-mentioned respective transport system. Further, the connecting traveling rails 514–516 may be provided with drive tubes as in the case of the traveling rails 501–504, the drive tubes may be omitted and the transport body 550 is made to pass the connecting traveling rails 514–516 making use of the momentum.

Figure 60:
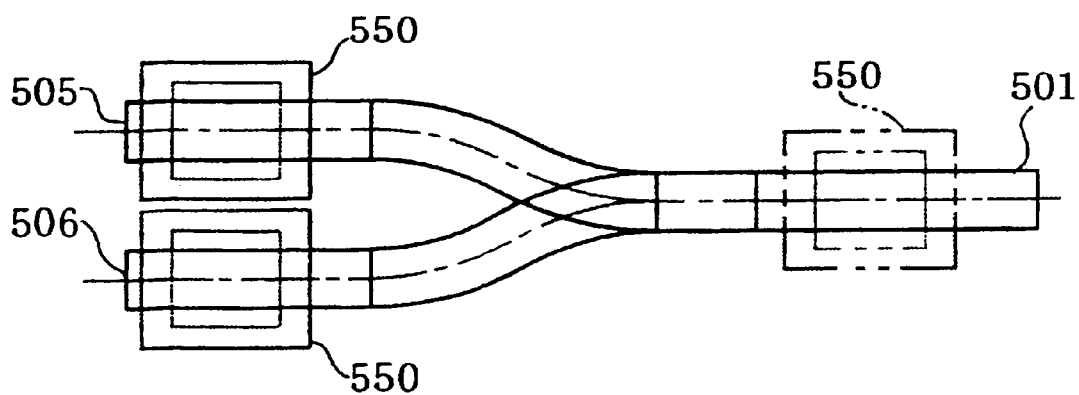
FIG. 60 is a view analogous to FIG. 59 which shows a modification of the transport route changeover switch shown in FIG. 51.

As described above, although the transport route changeover switch 500 of the above-mentioned embodiment is constituted for dispersion or conversion between one traveling rail 501 at one side and three traveling rails 502–504 at the other side, as shown in FIG. 60, the transport route changeover switch may be constituted for diversion or conversion between one traveling rail 501 at one side and two traveling rails 505, 506 at the other side. Further, even when the number of traveling rails at the other side is equal to or more than four, this embodiment can cope with the case by increasing the number of connecting traveling rails. Further, since the transport route changeover switch 500 is of a rotary type and the space necessary for the mounting of the connecting traveling rails can be accommodated within the radius of rotation of these connecting traveling rails, the casing 510 can be minimized.

Figure 61:
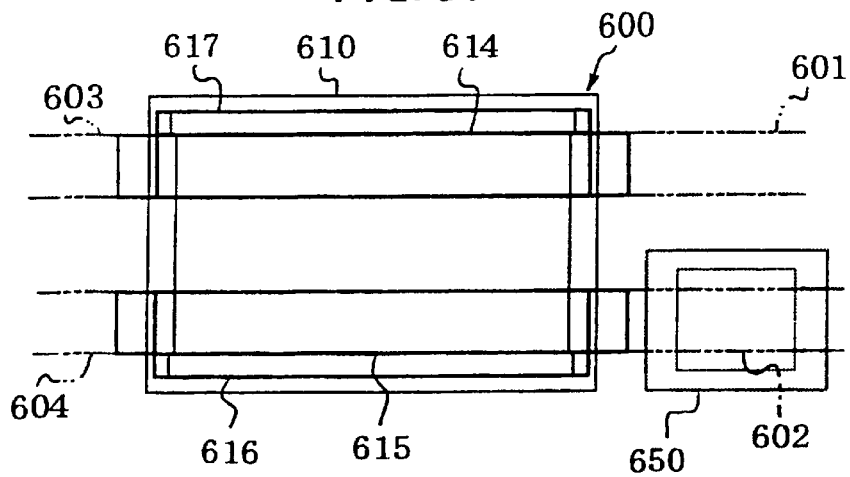
FIG. 61 is a schematic plan view of the inner structure showing another embodiment of the transport route changeover switch.
Figure 62:
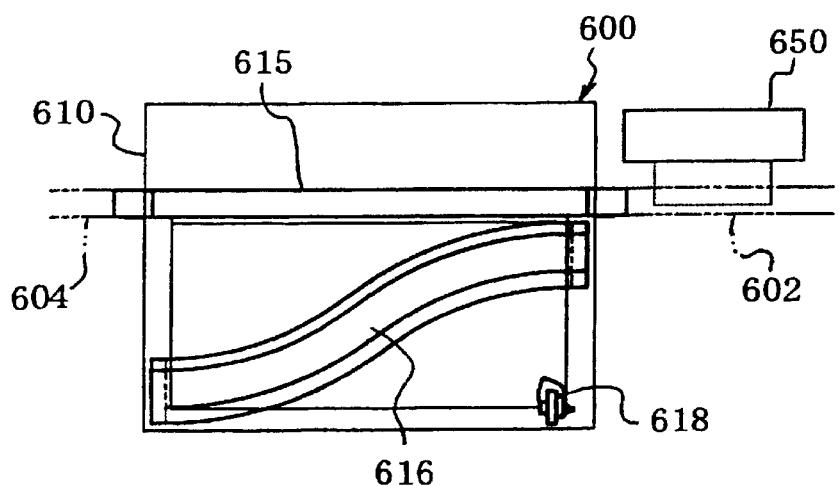
FIG. 62 is a side view showing the inner structure of the transport route changeover switch shown in FIG. 60.
Figure 63:
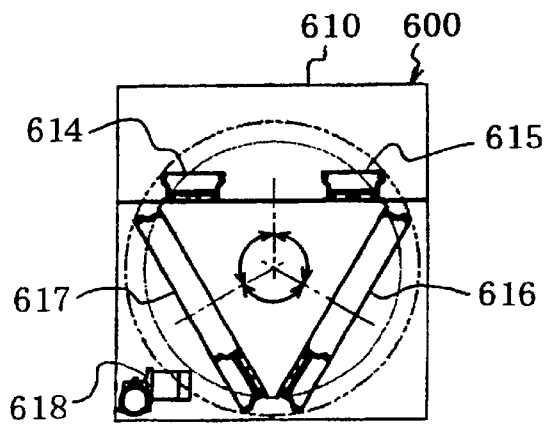
FIG. 63 is a schematic end view showing the inner structure of the transport route changeover switch shown in FIG. 60.
Figure 64:
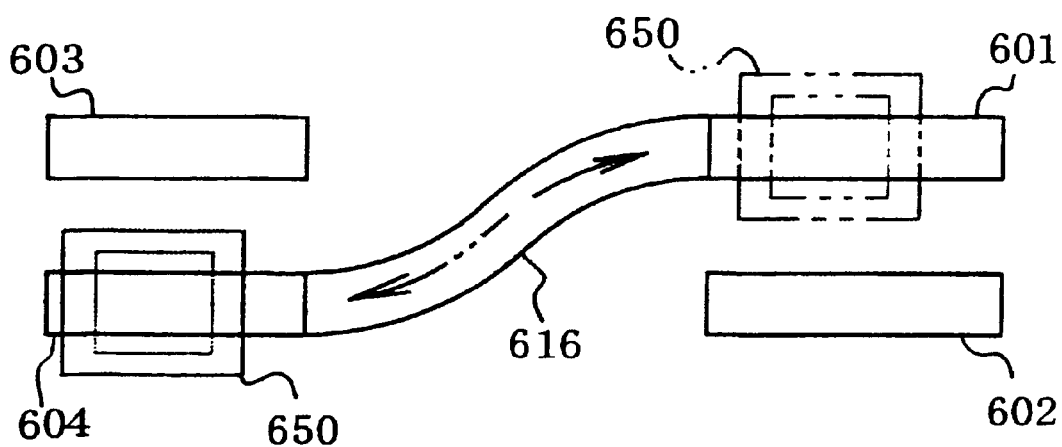
FIG. 64 is a schematic plan view showing the advancing direction switching operation of the transport route changeover switch shown in FIG. 60.
Figure 65:
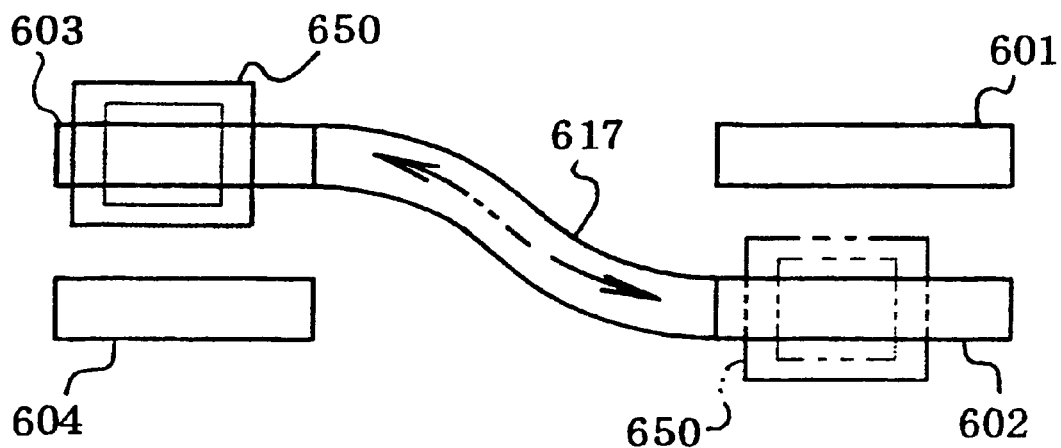
FIG. 65 is a schematic plan view showing another advancing direction switching operation of the transport route changeover switch shown in FIG. 60.

FIG. 61–FIG. 65 show another embodiment of the transport route changeover switch. FIG. 61 is a plan view showing the inner structure of the transport route changeover switch. FIG. 62 is a side view showing the inner structure of the transport route changeover switch shown in FIG. 61. FIG. 63 is a left end view showing the inner structure of the transport route changeover switch shown in FIG. 61. FIG. 64 and FIG. 65 are respectively schematic plan views showing another advancing direction switching operation of the transport route changeover switch shown in FIG. 61.

Referring first to FIG. 61, FIG. 64 and FIG. 65, a transport route changeover switch 600 of this embodiment is disposed between traveling rails 601, 602 arranged in two rows at one side (right side in FIG. 61) and traveling rails 603, 604 arranged in two rows at the other side (left side in the drawing). With such a provision, the traveling rails can be selectively connected as follows. That is, the traveling rails in two rows can be connected in parallel simultaneously, or the traveling rail 601 of the first row at one side and the traveling rail 604 of the second row at the other side can be connected (see FIG. 64), or the traveling rail 602 of the second row at one side and the traveling rail 603 of the first row at the other side can be selectively connected (see FIG. 65)

As shown in FIG. 61 to FIG. 63, the transport route changeover switch 600 includes a casing 610, a rotary body 613 which has both ends thereof rotatably supported in the casing 610 by way of bearings not shown in the drawings, a plurality (here, four in total) of connecting traveling rails 614, 615, 616, 617 which are mounted on the rotary body 613 and a drive motor 618 which rotatably drives the rotary body 613.

According to the traveling route changeover switch 600 having the above-mentioned constitution, by rotating. the rotary body 613 by means of the drive motor 618, the traveling rails 601, 602 of two rows at one side and the traveling rails 603, 604 of two rows at the other side can be selectively connected by way of the connecting traveling rails 614–617. Accordingly, it is unnecessary to stop the transport body 650 on the connecting traveling rails 614–617 and it becomes possible to make the transport body 650 pass one connecting traveling rail selected from the connecting traveling rails 614–617 thus realizing the continuous traveling.

The traveling rails 601–604 in the above-mentioned embodiment may have the same constitution as the traveling rails used in the above-mentioned respective transport system. Further, the connecting traveling rails 614–617 may be provided with drive tubes as in the case of the traveling rails 601–604, the drive tubes may be omitted and the transport body 650 is made to pass the connecting traveling rails 614–617 making use of the momentum.

Although the present invention has been explained based on the embodiments shown in the drawings, the present invention is not limited to the modes of the above-mentioned embodiments and various modifications can be added to respective constituent matters within the scope of the present invention.

INDUSTRIAL APPLICABILITY

The transport system, the transport body, the rail device and the transport route changeover switch according to the present invention are suitably applicable to the transporting of documents or articles in a hospital, a tower building, a warehouse, a plant or the like.

What is claimed is:

1. A transport body for a transport system comprising a chassis and drive wheels which are mounted on the chassis and are capable of rolling in the longitudinal direction of the traveling rails while depressing drive tubes arranged on the traveling rails, wherein the drive wheels receive a rotational drive force from a pressure medium in a gaseous or liquid form supplied to the drive tubes, the improvement being characterized in that a pair of traveling wheel support frames are respectively mounted on the chassis by way of universal joints in front of and behind the drive wheels, and a plurality of traveling wheels which roll on the traveling rails while sandwiching the traveling rails are mounted on respective traveling wheel support frames.

2. A transport body according to claim 1, wherein the traveling wheels are arranged on both sides of respective traveling wheel support frames such that the traveling wheels are capable of rolling on the traveling rails while sandwiching the both sides of the traveling rails with an acute angle.

3. A transport body according to claim 1, wherein the drive wheels are provided such that the drive wheels are displaceable relative to the chassis and are biased in the direction to depress the drive tubes by means of a spring.

4. A transport body according to claim 1, wherein the universal joint includes a spherical shaft which is mounted on one of the chassis and the traveling wheel support frame and has a spherical side surface, a spherical seat which is mounted on the other one of the chassis and the traveling wheel support frame and slidably embraces the spherical portion of the spherical shaft, and a spring which is mounted on the other one of the chassis and the traveling wheel support frame and presses the distal end surface of the spherical shaft.

5. A transport system which includes a traveling rail having a plurality of transport sections, a plurality of drive tubes arranged at respective transport sections of the traveling rail, and a pressure medium supply device which is capable of selectively supplying a pressure medium in a gaseous or liquid form into the inside of respective drive tubes or discharging the pressure medium from the inside of respective drive tubes through one ends or the other ends of the drive tubes, wherein drive wheels which are mounted on a transport body capable of traveling on the traveling rail receive the thrust from the pressure medium supplied to the inside of the drive tubes and roll on the drive tubes while depressing the drive tubes, the improvement is characterized in that into the end portions of the drive tubes which are positioned in front of and behind each boundary portion of the transport sections, one ends of transfer pipes are respectively inserted, the pressure medium is selectively supplied into or discharged from the inside of the drive tubes by way of the transfer pipes, the transfer pipes are rotatably mounted on the traveling rail such that one ends thereof are capable of sinking in the inside of the traveling rail, the transfer pipes are connected to each other by way of links in an interlocking manner, and the links are formed such that the links are capable of guiding the drive wheels between the drive tubes in front of and behind a boundary portion of the transport sections when a pair of transfer pipes sink into the traveling rail.

6. A transport system including a traveling rail having a plurality of transport sections, a plurality of drive tubes arranged on an outer surface of the traveling rail for every transport sections of the traveling rail and a pressure medium supply device capable of selectively supplying a pressure medium in a gaseous or liquid form into or discharging the pressure medium from one ends or the other ends of respective drive tubes, wherein drive wheels mounted on a transport body capable of traveling on the traveling rail are constituted such that the transport body is capable of rolling while depressing the drive tubes upon receiving a thrust from the pressure medium supplied to the inside of the drive tubes, wherein the drive tubes are depressed and sealed at opposite ends thereof and connection pipes are attached to the drive tubes at positions near the opposite ends thereof and are inserted into holes formed in the outer surface of the traveling rail so as to be connected to the pressure medium supply device.

7. A rail device for a transport system comprising a traveling rail provided for making a transport body having drive wheels travel thereon and drive tubes being mounted on a drive tube mounting surface of the traveling rail and being depressed by the drive wheels of the transport body and giving a rotational drive force to the drive wheels due to pressure of a pressure medium supplied to the inside thereof, the improvement being characterized in that grooves are formed in the traveling rail wherein the width of an opening portions of the grooves which opens at the drive tube mounting surface is smaller than the width of the inside of the grooves, and the drive tubes are formed by joining main tubes for giving power to the drive wheels of the transport body and mounting tubes for mounting the drive tubes by embedding the mounting tubes in the inside of the grooves through the opening portions of the grooves.

8. A drive tube mounting device for mounting a drive tube on a traveling rail by inserting a projection projected from an outer surface of the drive tube into a groove formed in an outer surface of the traveling rail, said device comprising:

a truck movable on the traveling rail in a longitudinal direction of the traveling rail;

a pair of guide rollers mounted on the truck and capable of sandwiching the drive tube in lateral direction with respect to the projection at a position outside of the groove of the traveling rail; and a mounting roller mounted on the truck behind the guide rollers in a moving direction of the truck and capable of pressing the drive tube toward the outer surface of the traveling rail so as to insert the projection of the drive tube into the groove when the truck is moved on the traveling rail.

9. A traveling route changeover switch for selectively connecting a first rail having an end portion for connection to a plurality of second rails each having an end portion for connection, said switch comprising:

a rotary body disposed between the end portion of the first rail and the end portions of the second rails and capable of rotating around an axis which is disposed in parallel to both the end portion of the first rail and the end portions of the second rails; and a plurality of connecting rails mounted on the rotary body and having one ends thereof which are selectively connected to the end portion of the first rail due to the rotation of the rotary body and the other ends thereof which are able to be connected to the end portions of the second rails when the one ends thereof are connected to the end portion of the first rail.

10. A transport system comprising:

a transport body;

a rail forming a transport route for said transport body and having an outer surface extending along said transport route;

first flexible tubes arranged on said outer surface of said rail along said transport route and spaced from each other in a direction along said transport route;

second flexible tubes arranged on said outer surface of said rail in the vicinity of an end of said first flexible tubes and extending in parallel to said first flexible tubes;

first drive wheels mounted on said transport body and capable of depressing said first flexible tubes while traveling on said first flexible tubes by the pressure of a pressure medium supplied to said first flexible tubes; and second drive wheels mounted on said transport body and spaced from said first drive wheels in a direction along said transport route, said second drive wheels being capable of depressing said second flexible tubes while running on said second flexible tubes by the pressure of a pressure medium supplied to said second flexible tubes while said first drive wheels change to another side from one side of said first flexible tubes which are adjacent mutually.

11. A transport system according to claim 10, wherein said rail has a plurality of rail bodies which are contiguously connected in a direction along said transport route, said first flexible tubes being separated from each other at connecting positions of said rail bodies, said rail bodies having outer surfaces and openings formed on said outer surfaces for receiving opposite ends of said first and second flexible tubes.

12. A transport system according to claim 11, wherein said rail bodies have hollow passages for supplying a pressure medium into said first or second flexible tubes, said hollow passages being formed in said rail bodies and extending in a direction of a longitudinal direction of said rail bodies.

13. A transport system according to claim 11, wherein said outer surfaces of said rail bodies have side wall surfaces which extend vertically when said rail bodies are disposed to extend horizontally, and said first and second flexible tubes are mounted on said side wall surfaces of said rail bodies.

14. A transport system according to claim 11, wherein said outer surfaces of said rail bodies have main wall surfaces which extend vertically when said rail bodies are disposed to extend horizontally, and said first and second flexible tubes are mounted on said main wall surfaces of said rail bodies.

15. A transport system according to claim 10, wherein said first and second flexible tubes are individually controllable so that supply of a pressure medium into said flexible tubes and discharge of a pressure medium from said flexible tubes are performed individually.

16. A transport system according to claim 10, wherein each of said rail means has protruding portions formed on said outer surface and extending in a direction along said transport route, and said transport body has traveling wheels which are engaged with said protruding portions and capable of running thereon in a direction along said transport route.

17. A transport system according to claim 10, wherein each of said first and second flexible tubes has a resilient protrusion extending in a direction along said transport route and having a root portion and a head portion which is larger in width than said root portion, and wherein said rail has grooves each having an interior and an opening which opens in said outer surface and is smaller in width than said interior so that said head portion of said resilient protrusion can be fitted into said corresponding groove through the opening thereof due to its resiliency.

18. A transport system according to claim 10, wherein said rail and said first and second drive wheels are formed in such a manner that said first and second flexible tubes can be clamped between said rail and one of said first and second drive wheels within a region which is smaller in width than said first and second flexible tubes when one of said first and second flexible tubes are depressed by said one of said first and second drive wheels.

19. A transport system comprising:

a transport body;

a rail forming a transport route for said transport body and having an outer surface extending along said transport route;

flexible tubes arranged on said outer surface of said rail means along said transport route; and a drive wheel mounted on said transport body and capable of depressing said flexible tubes while running on said flexible tubes by the pressure of a pressure medium supplied to said flexible tubes;

wherein said flexible tubes are arranged alternately in a staggered pattern along two lines which are parallel to a longitudinal direction of said rail, said flexible tubes having end portions which overlap with each other in said longitudinal direction between adjacent flexible tubes so that said drive wheel can run simultaneously on said end portions of said adjacent flexible tubes.

20. A transport system according to claim 19, wherein said rail has a plurality of rail bodies which are contiguously connected in a direction along said transport route, said rail bodies have hollow passages for supplying a pressure medium into said flexible tubes, said hollow passages being formed in said rail bodies and extending in a direction of a longitudinal direction of said rail bodies.

21. A transport system according to claim 19, wherein said flexible tubes are individually controllable so that supply of a pressure medium into said flexible tubes and discharge of a pressure medium from said flexible tubes are performed individually.

22. A transport system according to claim 19, wherein each of said flexible tubes has a resilient protrusion extending in a direction along said transport route and having a root portion and a head portion which is larger in width than said root portion, and wherein said rail has grooves each having an interior and an opening which opens in said outer surface and is smaller in width than said interior so that said head portion of said resilient protrusion can be fitted into said corresponding groove through the opening thereof due to its resiliency.

* * * * *